US011398130B2

(12) United States Patent
Piazza et al.

(10) Patent No.: US 11,398,130 B2
(45) Date of Patent: Jul. 26, 2022

(54) ELECTRONIC DEVICE OPERATED TABLE GAME SYSTEMS INTEGRATING LIVE DEALER INTERACTION WITH TANGIBLE GAME PIECES

(71) Applicants: Edward Piazza, Boca Raton, FL (US); Kanwarjit Chahal, Boca Raton, FL (US)

(72) Inventors: Edward Piazza, Boca Raton, FL (US); Kanwarjit Chahal, Boca Raton, FL (US)

( * ) Notice: Subject to any disclaimer, the term of this patent is extended or adjusted under 35 U.S.C. 154(b) by 0 days.

(21) Appl. No.: 17/030,894

(22) Filed: Sep. 24, 2020

(65) Prior Publication Data

US 2022/0092923 A1 Mar. 24, 2022

Related U.S. Application Data

(63) Continuation of application No. 17/030,046, filed on Sep. 23, 2020.

(51) Int. Cl.
| | |
|---|---|
| *G07F 17/32* | (2006.01) |
| *G06N 20/00* | (2019.01) |
| *G06Q 20/10* | (2012.01) |

(52) U.S. Cl.
CPC ......... *G07F 17/3223* (2013.01); *G06N 20/00* (2019.01); *G06Q 20/10* (2013.01); *G07F 17/322* (2013.01); *G07F 17/3211* (2013.01); *G07F 17/3216* (2013.01); *G07F 17/3227* (2013.01); *G07F 17/3239* (2013.01);

(Continued)

(58) Field of Classification Search
None
See application file for complete search history.

(56) References Cited

U.S. PATENT DOCUMENTS

| | | | |
|---|---|---|---|
| 7,168,705 B2 * | 1/2007 | Schibetta | ............ A63F 3/00157 273/274 |
| 8,262,475 B2 | 9/2012 | Snow et al. | |

(Continued)

OTHER PUBLICATIONS

Non-Final Office Action received for U.S. Appl. No. 17/030,046 dated Sep. 14, 2021, 32 pages.

(Continued)

*Primary Examiner* — Ronald Laneau
(74) *Attorney, Agent, or Firm* — Amin, Turocy & Watson, LLP

(57) ABSTRACT

The disclosed subject matter provides device operate table game systems that integrate live dealer interaction with one or more tangible game pieces at the game table. In one embodiment, a system includes one or more player devices physically coupled to a game table, wherein the one or more player devices respectively provide a player user interface for playing a game at the game table. The system also includes a dealer device coupled to the game table that provides a dealer user interface for playing the game at the game table, wherein the one or more player devices and the dealer device are communicatively coupled. The system further comprises computer executable stored in memory, including a player control component that receives player input commands via the player user interface that control player game moves in association with playing the game, and a game management component that tracks the player game moves.

40 Claims, 25 Drawing Sheets

(52) U.S. Cl.
  CPC ...... *G07F 17/3241* (2013.01); *G07F 17/3244* (2013.01); *G07F 17/3293* (2013.01)

(56) References Cited

U.S. PATENT DOCUMENTS

| | | | |
|---|---|---|---|
| 8,727,892 B1 * | 5/2014 | Chun | G07F 17/3225 463/42 |
| 10,235,830 B2 | 3/2019 | Richardson | |
| 10,755,525 B2 | 8/2020 | Shigeta | |
| 10,867,470 B2 * | 12/2020 | Kovacs | G07F 17/3211 |
| 11,100,755 B2 * | 8/2021 | deWaal | G07F 17/3227 |
| 2009/0062008 A1 * | 3/2009 | Karmarkar | G07F 17/3218 463/42 |
| 2009/0291762 A1 * | 11/2009 | Walker | G07F 17/3241 463/42 |
| 2010/0016050 A1 | 1/2010 | Snow et al. | |
| 2015/0087397 A1 | 3/2015 | Snow | |

OTHER PUBLICATIONS

Non-Final Office Action received for U.S. Appl. No. 17/030,898 dated Nov. 18, 2021, 30 pages.

\* cited by examiner

ELECTRONIC DEVICE OPERATED TABLE GAME SYSTEMS INTEGRATING LIVE DEALER INTERACTION WITH TANGIBLE GAME PIECES

RELATED APPLICATION

This application is a continuation of and claims priority to U.S. patent application Ser. No. 17/030,046, filed Sep. 24, 2020 and titled "ELECTRONIC DEVICE OPERATED TABLE GAME SYSTEMS INTEGRATING LIVE DEALER INTERACTION WITH TANGIBLE GAME PIECES," the entirety of which application is incorporated herein by reference.

TECHNICAL FIELD

This application generally relates to table game systems and more particularly to electronic device operated table game systems integrating live dealer interaction with tangible game pieces.

SUMMARY

The following presents a summary to provide a basic understanding of one or more embodiments of the invention. This summary is not intended to identify key or critical elements or to delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products are described that relate to electronic device operated table game systems integrating live dealer interaction with tangible one or more game pieces in association with player a game at a game table. For example, in various embodiments, the game can be or correspond to one or more casino table games, such as but not limited to, Blackjack, craps, roulette, baccarat, and the like.

According to an embodiment, a system is provided that comprises one or more player devices physically coupled to a game table, wherein the one or more player devices respectively provide a player user interface for playing a game at the game table. The system further comprises a dealer device coupled to the game table that provides a dealer user interface for playing the game at the game table, wherein the one or more player devices and the dealer device are communicatively coupled. The system further comprises at least one memory that stores computer executable components and at least one processor that executes the computer executable components stored in the memory. The computer executable components comprise a player control component that receives player input commands via the player user interface that control player game moves in association with playing the game. The computer executable components further comprise a game management component that tracks the player game moves.

In some embodiments, the computer executable components further comprise a dealer control component that receives dealer input commands via the dealer user interface that control dealer game moves in association with the playing of the game. With these embodiments, the computer executable components can also comprise a player interface component that updates the player user interface based on the player game moves and the dealer game moves, and a dealer interface component that updates the dealer user interface based on the player game moves and the dealer game moves.

In various implementations, the game can involve a plurality of players that provide their respective player game moves, and wherein the game management component further controls when the players can provide their respective player game moves. The game further involves dealer interaction with one or more tangible game pieces on the game table, wherein game winners and losers are determined based on the results of the dealer interaction with the one or more tangible game pieces. For example, in some embodiments, the game comprises a card game such as Blackjack and the one or more tangible game pieces comprise cards.

In this regard, in some implementations, the game involves exchange of a reward between a player account for a player of the game and a dealer account for a dealer of the game in response to winning game events and losing game events that occur in association with the playing of the game. For example, the reward can have a monetary value and/or comprise virtual chips having the monetary value. The computer executable components can also comprise player interface component that generates the player user interface with a visual representation of an amount of the virtual chips included in the player account. For example, the player device can comprise a holographic display device and the player interface component generates the visual representation as hologram. Additionally, or alternatively, the player user interface can comprise a two dimensional (2D) graphical user interface.

In accordance with these implementations, the computer executable components can further comprise a reward management component that transfers the reward from the player account to the dealer account in response to a player game loss event and transfers the reward from the dealer account to the player account in response to a player game win event. In some embodiments, the player game moves comprise placing bets with the reward on a chance of occurrence of the player game win event.

In some implementations in which the game involves exchange of virtual chips between the player account and the dealer account, the computer executable components can further comprise an account access component that accesses the player account in a player account system based on reception of identification information that links the player to the player account, wherein the player account controls an amount of the virtual chips available to the player. In some embodiments, the system can further comprise a card reader device that receives at least a part of the identification information from a player card device. The computer executable components can also comprise a betting control component that controls usage of the amount of the virtual chips for the playing of the game based on reception of authorization information from the player via the player user interface.

According to another embodiment, a system is provided that comprises a game table system comprising one or more player devices physically coupled to a game table, wherein the one or more player devices respectively provide a player user interface for playing a game at the game table that involves live dealer interaction with one or more tangible game pieces at the game table. The system further comprises at least one memory that stores computer executable components and at least one processor that executes the computer executable components stored in the memory. The computer executable components comprise a remote access component that facilitates remotely accessing a player device of the one or more player devices by a remote player device via a network and presenting a remote player user interface at the remote player device for remotely playing the game at the game table by a remote player. The computer executable components further comprise a player control component that receives remote player input commands via the remote player user interface that control remote player game moves in association with remotely playing the game.

In various implementations, the game involves exchange of a reward between a player account for the remote player and a dealer account for the live dealer in response to winning game events and losing game events that occur in association with remotely playing the game. With these implementations, the computer executable components can further comprise a game management component that tracks the remote player game moves, and a reward management component that transfers the reward from the player account to the dealer account in response to a remote player game loss event and transfers the reward from the dealer account to the player account in response to a remote player game win event. For example, the remote player game moves can comprise placing bets with the reward on a chance of occurrence of the remote player game win event and wherein the remote player game win event is determined based on the live dealer interaction with the one or more tangible game pieces at the game table.

In some embodiments, the reward comprises a monetary reward or virtual chips having a monetary value. With these embodiments, the computer executable components can further comprise a finance linking component that facilitates linking a financial account associated with the remote player to the player account. The computer executable components can further comprise a withdrawal component that withdrawals a monetary amount from the financial account for transfer to the player account, and a reward conversion component that converts the monetary amount into an amount of virtual chips having a value corresponding to the monetary amount and adds the virtual chips to the player account. The reward conversion component can also convert an amount of the virtual chips transferred from the dealer account to the player account into a monetary amount corresponding to a value of the amount of virtual chips, and the computer executable components can further comprise a deposit component that transfers the monetary amount to the financial account. The reward conversion component can also convert an amount of the virtual chips transferred from the player account to the dealer account into a monetary amount corresponding to a value of the amount of virtual chips, and the deposit component can transfers the monetary amount to a financial account linked to the dealer account.

Additionally, or alternatively, the computer executable components can further comprise a table game system interface component that receives a request from the remote player device to remotely play the game at the game table, the request comprising player identifier information identifying the remote player, and an authorization component that authorizes the request based on determination that the remote player is authorized to remotely play the game at the game table, wherein based on authorization of the request, the table game system interface component activates the remote player user interface for remotely playing the game. In some implementations of these embodiments, the computer executable components can further comprise a game selection component that facilitates selecting the game table system from amongst a plurality of different game table systems respectively comprising game tables at which table games are played, and a live game tracking component that tracks usage of player devices physically coupled to the game tables and generates status information regarding availability status of the player devices, and wherein the table game system interface component receives the request in response to selection of the game table system and the player device based on the player device having an available status.

In various implementations, the remote player user interface can comprise live video of the live dealer interaction with the one or more tangible game pieces at the game table. The computer executable components can further comprise a live streaming gaming component that facilitates live streaming video and audio communication between the remote player and at least one of, the live dealer or an in-person player of the game table. Additionally, or alternatively, the remote player user interface can comprise a virtual reality environment of the game table system.

One or more additional embodiments are directed to a system comprising at least one memory that stores computer executable components and at least one processor that executes the computer executable components stored in the memory. The computer executable components comprise a withdrawal component that withdrawals a monetary amount from a financial account for a player and transfers the monetary amount to a player account for the player, and an account access component that accesses the player account in association with usage of a player device to play a table game by the player that involves live dealer interaction with one or more tangible game pieces at the game table. The computer executable components further comprise a reward transfer component that transfers the monetary amount or a portion of the monetary amount to a dealer account for the live dealer based on a player game loss event determined based on the live dealer interaction with the one or more tangible game pieces at the game table and one or more player game moves entered via a player user interface displayed at the player device.

In various implementations, the withdrawal component accesses the financial account at a financial account system via a network. In some embodiments, the withdrawal component can further withdrawal the monetary amount and transfer the monetary amount to the player account in response to reception of a withdrawal request from the player device in association with authorized access of the player account by the player using the device. Additionally, or alternatively, the withdrawal component can withdrawal the monetary amount and transfers the monetary amount to the player account in response to a determination that an available balance in the player account has dropped below a threshold balance amount. In another embodiment, wherein the one or more player game moves comprise placing a bet for the monetary amount or the portion of the monetary amount on a chance of occurrence of the player game loss event, the withdrawal component can withdrawals the monetary amount and transfers the monetary amount to the player account in response to a request to place the bet received via the player user interface.

In some embodiments, the table game is included amongst a plurality of different table games at which table games are played that involve live dealer interaction with one or more tangible game pieces at the game tables and the system restricts playing the table games using the player account accessed via respective player devices coupled to the game tables. In accordance with these embodiments, the computer executable can further components comprise a player tracking component that tracks player activity information in association with usage of the player account at one or more of the different game tables in real-time. The computer executable components can further comprise a player rating component that generates and update a player rating for the player in real-time based on the player activity information. The computer executable components can also comprise a reward component that determines a reward for the player based on the player activity information and issues the player reward to the player account in real-time. Additionally, or alternatively, the computer executable components can further comprise a suspicious activity component that identifies suspicious player activity (e.g., counting cards or the like) based on the tracked player activity information, a notification component that notifies a regulatory entity regarding the suspicious player activity based on the identification of the suspicious player activity. In some implementations, the suspicious activity component employs machine learning and artificial intelligence to identify the suspicious player activity. The account access component can further restrict usage of the player account to play the table games based on identification of the suspicious player activity.

In some embodiments, elements described in connection with the disclosed systems can be embodied in different forms such as a computer-implemented method, a computer program product, or another form.

DETAILED DESCRIPTION

Figure 1:
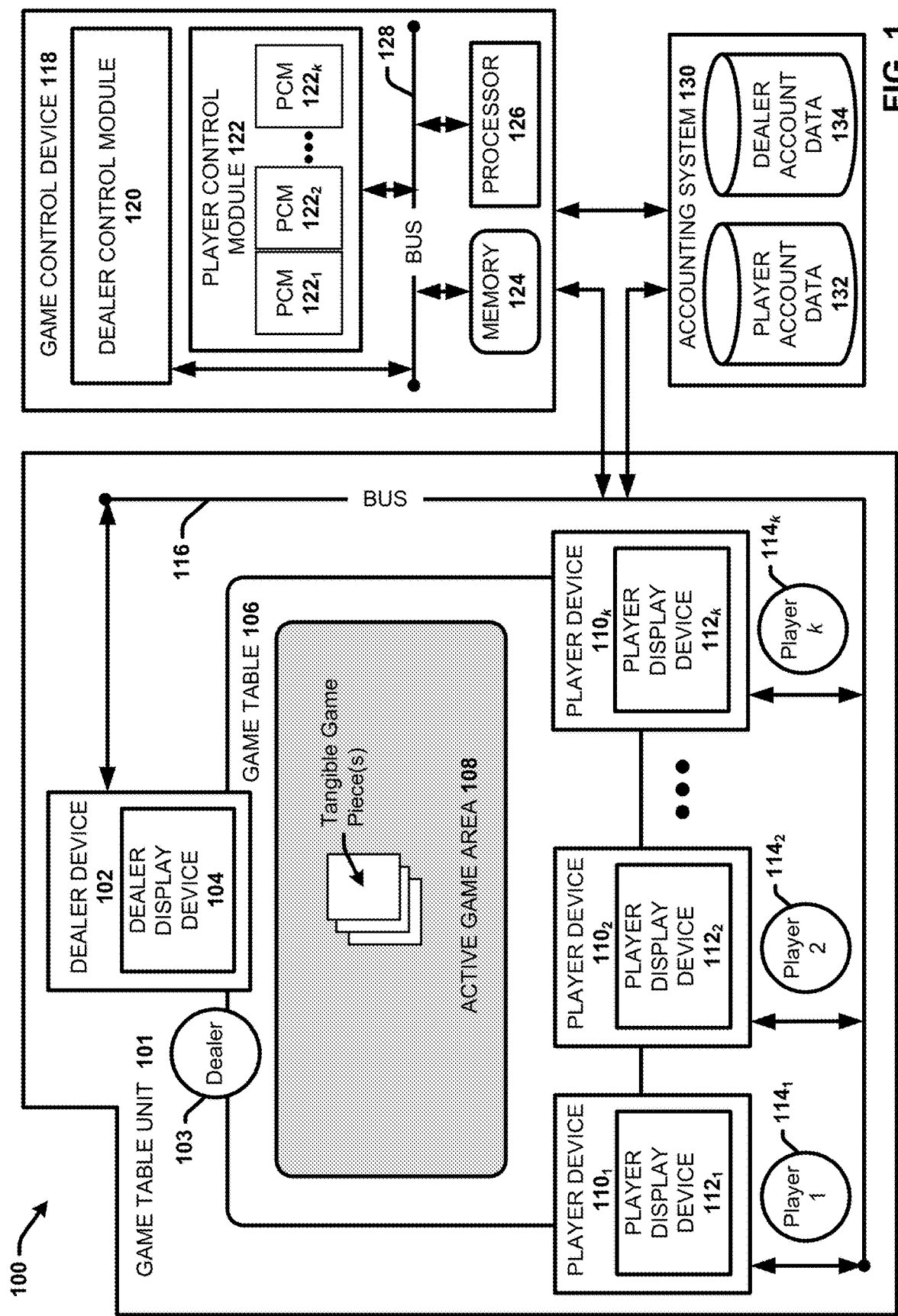
FIG. 1 illustrates a block diagram of an example, non-limiting, device operated table game system that integrates live dealer interaction with tangible game pieces in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments of the subject disclosure are directed to table game systems that minimize or eliminate physical contact of players with game pieces such as chips in association with playing a casino table game (or the like) in an in-person environment with a live dealer (e.g., at a casino or the like). To facilitate this end, the disclosed table game systems integrate one or more player devices that provide an interactive display at a game table for a game that involves a live dealer interacting with one or more tangible game pieces at the game table. In various embodiments, the game can involve a game of chance in which the players place bets against the dealer on the chance of occurrence of a defined winning game event. The player is further rewarded the amount/value of the bet if the defined winning event occurs (e.g., if the player wins) and the dealer is rewarded the amount/value of the bet if the defined winning event does not occur (e.g., if the dealer wins). For example, the game can be or correspond to Blackjack, craps, roulette, baccarat, and the like.

The interactive display can present a player user interface that provides one or more graphical controls that are used by a player to play the game based on dealer game moves performed at the game table using one or more tangible game pieces (e.g., cards, dice, a wheel, etc.). For example, in one or more embodiments in which the game is Blackjack (or a similar game), the table game can involve the dealer dealing tangible game cards (e.g., real paper cards) to the players on the game table in accordance with the game rules. With these embodiments, the player user interface can provide interactive graphical controls for performing player game moves, such as placing bets, requesting to stay, requesting to hit, requesting to split, requesting to double down and the like. In this regard, players can perform their desired game moves based on the live dealt cards presented on the game table using the player move input commands entered via the player user interface. In some implementations, the interactive display can comprise a touchless input display to further facilitate minimizing user contact with potentially contaminated surfaces, thus further minimizing the spread of surface borne pathogens. With these embodiments, the player can interact with the graphical controls to provide their desired game moves without touching the display screen. Additionally, or alternatively, the interactive displays can comprise a touchscreen for receiving user input commands for playing the table game via the displayed graphical controls. Other suitable user input device technology can also be used (e.g., voice input, gesture input, etc.).

The disclosed table game systems can further integrate a dealer device at the game table that is communicatively coupled to the one or more player devices. Player game moves entered by the respective players devices can be presented to the dealer via a dealer user interface displayed at the dealer device. For example, the dealer user interface can present information that identifies the respective players and tracks their game moves based on the player input commands entered using their respective player devices and player user interfaces. The dealer user interface can also facilitate managing and playing the game by the dealer. In some embodiments, this can include controlling the distribution of game winnings to players when they win and collecting game winnings from players when they lose. For example, in some embodiments, the game can involve monetary betting in accordance with conventional casino gaming systems. However, alternative to using tangible chips, the disclosed table game systems can electronically transfer virtual chips (or another form of currency) between user accounts established for the respective players and the dealer.

In particular, the disclosed table game systems can require players to register with an accounting system and establish personal player accounts that uniquely identify each player. In some embodiments, each dealer can also have a personal dealer account that uniquely identifies each dealer. For example, in various embodiments, the disclosed table game systems can include a plurality of device operated table games respectively controlled by different live dealers in casino environment. In some implementations of these embodiments, each dealer can have a separate dealer account that can be used to track their individual gaming activity and control different levels of game access and operation rights (e.g., based on their account privileges). Additionally, or alternatively, the dealer account can be or correspond to a house account that can be accessed and used by a plurality of dealers.

A player account can further include available balance information identifying or indicating a number of money/funds, virtual chips, points (or another form of currency for playing games) the player has available to use for playing games. In some embodiments, the player can purchase virtual chips for adding to their account. Additionally, or alternatively, the player can link one or more personal financial accounts to their player account (e.g., a bank account, a credit card account, a cryptocurrency account, etc.). The accounting system can further facilitate electronically withdrawing money from a linked financial account for loading onto their player account and/or depositing money to a linked account from their player account. In some embodiments, the player can set define personal accounting rules that control withdrawal amounts. For example, the player can authorize a maximum withdrawal amount per hour, per day, per week, per game, per financial account, etc. In other embodiments, the player can authorize unlimited withdrawals for a linked financial account.

In one or more embodiments, to begin playing a table game, a player first accesses and/or links their player account to the particular player device the player has selected to use to play the game. Various mechanisms can be used to securely accomplish this task. For example, in some embodiments, the player can login to their account at the player device via entry of an established username and password for their player account. One or more additional or alternative account access identification/authentication mechanisms can also be used. For example, in some implementations, one or more biometric identification mechanism can be used (e.g., facial recognition, iris recognition, fingerprint recognition, etc.) to uniquely identify a player in association with a request to load/access their account at a player device. Additionally, or alternatively, the disclosed gaming systems can provide players with physical player cards that electronically store player account information and/or information linking the player to the player's account in a manner similar to a credit card. With these embodiments, a card reader device can be operatively coupled to the player device for reading the player card and accessing and/or loading the player's account information at the player device for usage in playing the table game.

After a player has securely accessed their player account at the selected player device, the player can begin placing bets and playing the game using the virtual chips (and/or money or another currency) available in their player account. The game table system can further provide for electronically transferring virtual chips (and/or money or another currency) between a player account and the dealer account in real-time over the course of the playing of the game based on winning/losing game events and the betting amounts.

In some embodiments, the dealer can control these virtual chip transfers during the game using the dealer user interface based on the dealer's manual determination/observation of a winning game event or a losing game event and the game rules. In this regard, the dealer can manually determine whether a player wins, or loses based on the players moves entered via the player device and the dealer's moves performed on/at the table using the tangible game pieces. For example, with respect to the game of Blackjack, the dealer can manually lay down cards for each player on the table based on the player's selected game moves/plays as presented on the dealer user interface. The dealer can further lay the dealer's cards on the table and determine whether the player wins or loses based on the player's cards and the dealer's cards on the game table and the defined game rules. The dealer user interface can further include graphical controls that allow the dealer to manually control payouts to the players and collection from the players. For example, in one implementation, the dealer user interface can include graphical icon controls corresponding to "player wins" and "player loses," wherein selection of the "player win" icon by the dealer can result in transfer of the player's payout to the player's account and selection of the "player loses" icon can result in transfer of player's bet amount to the dealer's account. In some embodiments, the payout/collection amounts can be automatically determined/calculated by a game management component operatively coupled to the dealer device.

Additionally, or alternatively, the game table system can include one or more cameras configured to capture images of the game table (e.g., video and/or still images) during the game, including images of the tangible game pieces that are controlled by the live dealer. For example, with respect to the game of Blackjack, the image data can depict the player's cards and the dealer's cards. In another example with respect to roulette, the image data can depict the roulette wheel and the ball where it lands on the table on each turn. The game table system can further employ image processing technology configured to process the image data and automatically determine player wins and loses based on the image data and defined rules of the game. For example, with respect to Blackjack, the image processing technology can be configured to read the player's cards and the dealer's cards depicted in the image data and automatically determine whether the player's cards beat the dealers cards (e.g., whether the player/dealer busts, whether the player breaks, whether the player/dealer hits Blackjack, etc.). In some implementations of these embodiments, the game management component can further automatically control/issue payouts and collections between the player's account and dealer's account based on the game win/loss events determined by the image processing technology.

One or more additional embodiments are directed systems, methods and computer readable media for remotely accessing and playing a table game that involves live dealer interaction with tangible game pieces. One or more additional embodiments are directed systems, methods and computer readable media for tracking player and dealer activity in association with playing one or more table games. One or more additional embodiments are directed systems, methods and computer readable media that facilitate depositing tangible money into different financial accounts using an automatic deposit machine.

The term "table game" is used herein to refer to a game that is played between two or more people using a physical table and/or one or more tangible game pieces. In various embodiments, the game comprises a game chance in which one or more players place bets against the dealer on the chance of occurrence of a defined winning game event and/or a defined losing game event, wherein the defined winning game event and/or losing game event is determined based on the results of the live dealer interaction with the one or more tangible game pieces on the game able. In this regard, the table game can be or correspond to a casino game that is played between one or more players and a live dealer (also referred to a as croupier), wherein the live dealer manually interacts with (e.g., touches, handles, controls, etc.) one or more tangible game pieces at the physical game table. For example, table games described herein can include, but are not limited to, Blackjack, craps, roulette, baccarat, and the like. In some embodiments, the table game can also include the game of poker. In this regard, the tangible game pieces can include but are not limited to, cards, dice, a dice stick, a wheel (e.g., a roulette wheel), a paddle, a card machine (e.g., a speed dealer machine), chips, and the like. The terms "game table," "table," or the like are used herein to refer to a physical table or structure on or at which a table game is played.

One or more embodiments are now described with reference to the drawings, wherein like referenced numerals are used to refer to like elements throughout. It should be appreciated that the various structures depicted in the drawings (e.g., the respective layers, regions, electrodes, gates and other elements) are merely exemplary and are not drawn to scale. In the following description, for purposes of explanation, numerous specific details are set forth in order to provide a more thorough understanding of the one or more embodiments. It is evident, however, in various cases, that the one or more embodiments can be practiced without these specific details. In addition, certain elements may be left out of particular views for the sake of clarity and/or simplicity when explanations are not necessarily focused on the omitted elements. Moreover, the same or similar reference numbers used throughout the drawings are used to denote the same or similar features, elements, or structures, and thus, a detailed explanation of the same or similar features, elements, or structures will not be repeated for each of the drawings.

Turning now to the drawings, FIG. 1 illustrates a block diagram of an example, non-limiting, device operated, table game system 100 that integrates live dealer interaction with tangible game pieces in accordance with one or more embodiments of the disclosed subject matter. The table game system 100 includes a game table unit 101 that includes a game table 106, a dealer device 102 and one or more player devices $110_{1-k}$. The game table unit 101 further includes a system bus 116 that can operatively/communicatively couple the dealer device 102 and the one or more player devices $110_{1-k}$. The dealer device 102 and the one or more player devices $110_{1-k}$ can also or alternatively be communicatively coupled via one or more wireless communication technologies.

In one or more embodiments, the dealer device 102 can be or include a dealer display device 104 that generates and/or presents a dealer user interface to the dealer 103 that facilitates managing and controlling a table game played at/on the game table 106 that involves the dealer 103 (e.g., a live human dealer) interacting with one or more tangible game pieces (e.g., cards, dice, etc.) at/on the game table 106. The one or more player devices $110_{1-k}$ can be or include player display devices $112_{1-k}$ that generate and/or present a player user interface to the respective players $114_{1-k}$ that facilitates playing the table game by the respective players $114_{1-k}$.

In particular, the player user interface can provide one or more interactive controls that can be used by a player to play the table game based on dealer game moves performed at the game table 106 using one or more tangible game pieces (e.g., cards, dice, a wheel, etc.). For example, in one or more embodiments in which the game is Blackjack (or a similar game), the player user interface can provide interactive controls for performing player game moves, such as placing bets, requesting to stay, requesting to hit, requesting to split, requesting to double down and the like. In this regard, the players $114_{1-k}$ can perform their desired game moves based on the live dealt cards placed on the game table 106 using the player move input commands entered using the player user interface presented by their respective player display devices $112_{1-k}$.

In various embodiments, player game moves entered by the respective players $114_{1-k}$ using the player user interface rendered by their player display devices $112_{1-k}$ can be communicated to the dealer device 102 and presented to the dealer via the dealer user interface displayed by the dealer display device 104. For example, the dealer user interface can present information that identifies the respective players and tracks their game moves based on the player input commands entered using their respective player devices $110_{1-k}$ and player user interfaces. The dealer user interface can also facilitate managing and playing the game by the dealer 103. In some embodiments, this can include controlling one or more aspects of the game by the dealer using graphical controls provided by the dealer user interface. For example, the dealer user interface can provide graphical controls that allow the dealer to control player game turns, control issuing player winnings and collecting player loses (e.g., points, virtual chips, money, or another currency), and the like.

The dealer device 102 and the one or more player devices $114_{1-k}$ can further be operatively/communicatively coupled to a game control device 118 via the system bus 106. Additionally, or alternatively, the dealer device 102 and the one or more player devices $114_{1-k}$ can be operatively/communicatively coupled to the game control device 118 and/or one another via one or more wireless communication technologies. For example, the dealer device 102, the one or more player devices $114_{1-k}$ and the game control device 118 can be communicatively coupled via one or more short range radio communications such as Bluetooth™, near field communication (NFC), radio frequency identification (RFID) based communication, or the like. In another example, the dealer device 102, the one or more player devices $114_{1-k}$ and the game control device 118 can be communicatively coupled using virtually any desired wired or wireless technology, including, for example, cellular, wireless fidelity (Wi-Fi), Wi-Max, and etc.

In various embodiments, the game control device 118 can be or correspond to at least one computing device that provides information processing functionalities associated with the dealer device 102 and the dealer user interface and the one or more player devices $114_{1-k}$ and the player user interface. In this regard, embodiments of system 100 and other systems described herein can include one or more machine-executable components embodied within one or more machines (e.g., embodied in one or more computer readable storage media associated with one or more machines). Such components, when executed by the one or more machines (e.g., processors, computers, computing devices, virtual machines, etc.) can cause the one or more machines to perform the operations described.

For example, in accordance with system 100, the game control device 118 includes a dealer control module 120 and a player control module 122 which respectively correspond to machine-executable components. The dealer control module 120 can be operatively coupled to the dealer device 102 and provide various game management and control functions associated with the dealer device 102 and the dealer user interface including but not limited to, generating the dealer user interface, tracking player game moves entered using their respective player devices $110_{1-k}$, updating the dealer user interface based on the player game moves, controlling progression of the game based on player and dealer input, controlling/managing transfer of virtual chips/money between the player accounts and the dealer's account, and the like. The player control module 122 can similarly be operatively coupled to the respective player devices $110_{1-k}$ and provide various game management and control functions associated with the respective player devices $110_{1-k}$ and the player user interface, including but not limited to, generating and updating the player user interface, accessing and loading a player's account at a player device 110, controlling game moves and betting, controlling/managing transfer of virtual chips/money between the player's account and the dealer's account, and the like. In the embodiment shown, the player control module 122 can include sub-control modules or instances of the player control module 122 for each player device at the game table 106, respectively shown as player control module (PCM $122_1$), PCM $122_2$, and so on. Additional details of the various features and functionalities of the player control module 122 and the dealer control module 120 are discussed in greater detail infra with reference to FIGS. 6 and 9 respectively.

The game control device 118 can further include or be operatively coupled to at least one memory 124 and at least one processor 126. In various embodiments, the at least one memory 124 can store executable instructions (e.g., executable instructions provided by the dealer control module 120 and the player control module 122) that when executed by the at least one processor 126, facilitate performance of operations defined by the executable instructions. The game control device 118 can further include a device bus 128 that communicatively couples the various components of the game control device (e.g., the dealer control, the processor 118 and the memory 120). Examples of said and memory 124 and processor 126 can be found with reference to FIG. 25, as well as other suitable computer or computing-based elements that can be used in connection with implementing one or more of the systems or components shown and described in connection with FIG. 1 or other figures disclosed herein.

In the embodiment shown, at least some of the processing logic/software (e.g., the dealer control module 120 and the player control module 122) that provides various computing operations and/or functionalities associated with the dealer device 102 and the dealer user interface and the one or more player devices $114_{1-k}$ and the player user interface is centrally located at a game control device 118 that is communicatively coupled to the dealer device 102 and the respective player devices $110_{1-k}$. With these embodiments, the player control module 122 can serve as central control module that provides the player device control and management logic for all the player devices $110_{1-k}$ of the game table unit 101. For example, the player control module 122 can provide sub-player control modules and/or instances of the player control module 122 for each player device $110_{1-k}$. (e.g., (PCMs $122_{1-k}$). In some implementations of this embodiment, the dealer device 102 and the player devices $110_{1-k}$ can essentially be or correspond to display devices with input/output capabilities configured to render the user interfaces, receive user input, and communicate the user input to the game control device 118 for processing thereby. In this regard, at least some of the information processing functions associated with the dealer device 102 and the respective player device $110_{1-k}$ can be performed by the game control device 118.

Figure 2:
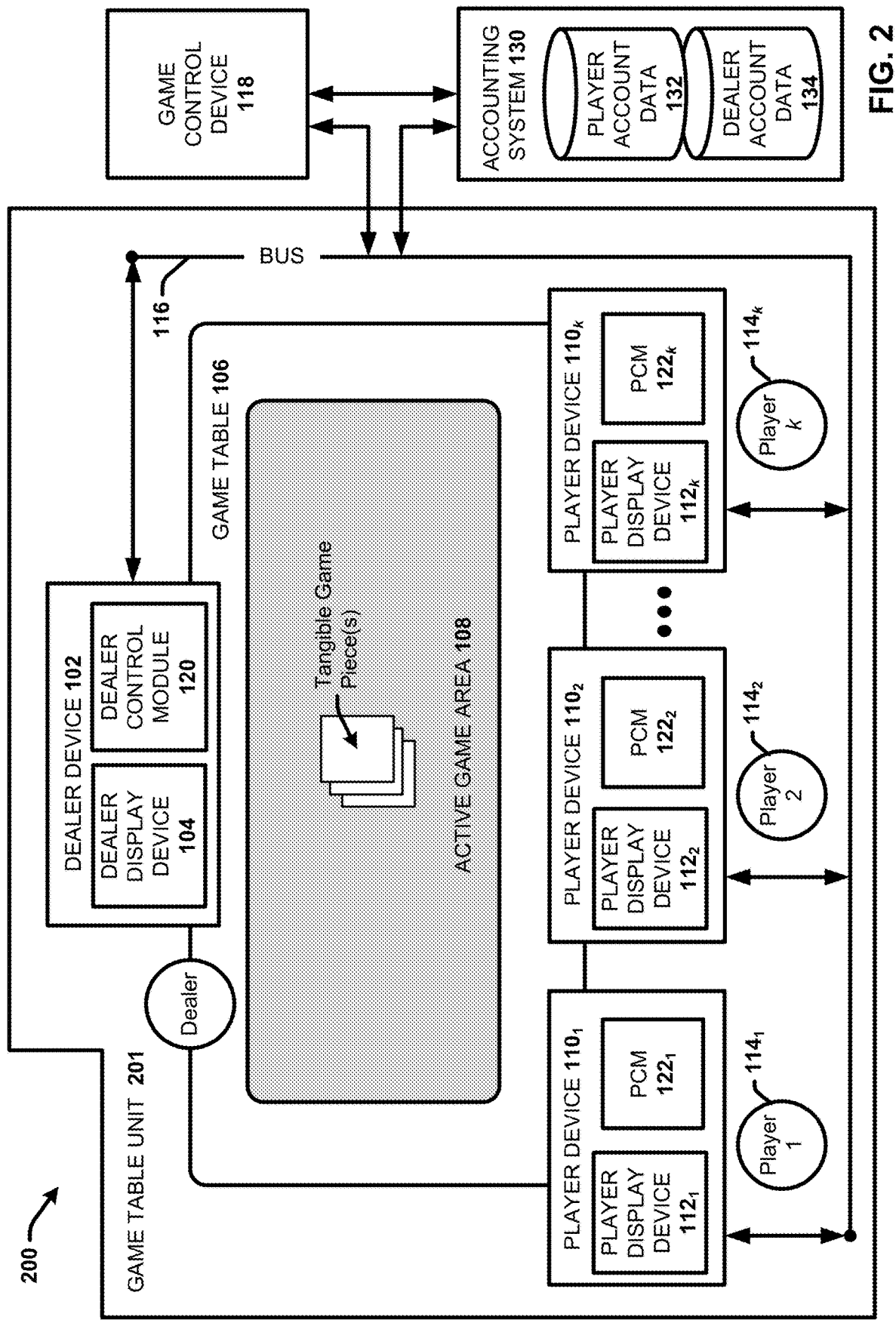
FIG. 2 illustrates a block diagram of another example, non-limiting, device operated table game system that integrates live dealer interaction with tangible game pieces in accordance with one or more embodiments of the disclosed subject matter.

Additionally, or alternatively, one or more features and functionalities of the dealer control module 120 can be executed by the dealer device 102 and/or one or more features and functionalities of the player control module 122 can be executed by the respective player devices $110_{1-k}$, as shown in FIG. 2.

In this regard, FIG. 2 illustrates a block diagram of another example, non-limiting, device operated table game system 200 that integrates live dealer interaction with tangible game pieces in accordance with one or more embodiments of the disclosed subject matter. Game table system 200 provides same or similar features and functionalities as game table system 100 with a different deployment architecture for the game table unit 201. Repetitive description of like elements employed in respective embodiments is omitted for sake of brevity In accordance with system 200 and game table unit 201, the dealer control module 120 (or one or more components of the dealer control module 120) can be located at and executed by the dealer device 102. With these embodiments, the dealer device 102 can include or be operatively to at least one memory (not shown) that stores the computer executable components provided by the dealer module 120 and at least one processor (not shown) that that executes the computer executable components stored in the memory. Likewise, each of the player devices $110_{1-k}$ can include and execute a local instance of the player control module 122 (e.g., PCMs $122_{1-k}$). With these embodiments, each of the player devices $110_{1-k}$ include or be operatively to at least one memory (not shown) that stores one or more of the computer executable components provided by their respective PCMs $122_{1-k}$ and at least one processor (not shown) that that executes the computer executable components stored in the memory. Additionally, or alternatively, one or more components of the dealer control module 120 and/or the PCMs $122_{1-k}$ can be distributed between the dealer device 102, player devices $110_{1-k}$ and the game control device 118. In this regard, the deployment architecture of the table game systems described herein can vary.

With reference to FIGS. 1 and 2, the number of player devices devices $110_{1-k}$ and players k can vary depending on the type of game played on/at the game table 106 and the number of players the game can involve at a time. For example, most Blackjack tables can accommodate six or seven players. Thus, in some embodiments in which the game is Blackjack, the number k of player devices $110_{1-k}$ can be six or seven. In some embodiments, the dealer device 102 and/or the player devices $110_{1-k}$ can be physically coupled/attached to the game table 106. For example, the game table 106 can include an active game area 108 where one or more tangible game pieces are located/placed that are interacted with by the dealer at the game table during the playing of the game. With these embodiments, the player devices $110_{1-k}$ can be physically/attached to a portion of the game table 106 outside the active area 108. For instance, in implementations in which the game is Blackjack, the active game area 108 can include a portion of the game table where the dealer 103 lays down the game cards and the player devices $110_{1-k}$ can be located at or near the perimeter of the game table in front of each player position/seat.

In another embodiment, the player devices $110_{1-k}$ can be positioned near the game table 106 yet physically separated from the game table 106. For example, the player devices $110_{1-k}$ can be located at fixed positions away from the game table (e.g., a few feet or so) with a view of the game table. In some embodiments, the player devices $110_{1-k}$ can comprise mobile devices that can be removably attached to the game table 106 and/or held or worn by the players $114_{1-k}$ (e.g., a mobile phone, a smartphone, a tablet personal computer (PC), or a personal digital assistant (PDA), a heads-up display (HUD), an augmented reality (AR) device, a virtual reality (VR) device, a wearable eyewear device, a wearable watch/wrist device, etc.). In this regard, the type of the player devices $110_{1-k}$ and/or the player display devices $112_{1-k}$ can vary so long as they are capable of generating and/or presenting the player user interface, receiving user input via user interaction with the player user interface, and communicating with the dealer device 102 and/or the game control device 118.

In one or more embodiments, the player user interface can comprise a graphical user interface (GUI) configured to be rendered on a two-dimensional (2D) display screen. With these embodiments, the player display devices $112_{1-k}$ can be or include a 2D display screen via which the player user interface is displayed. For example, the 2D display screen can include, but is not limited to, a liquid crystal display (LCD), a light emitting-diode (LED) display, an organic LED (OLED) display, an active-matrix OLED (AMOLED) display, and the like. With these embodiments, one or more graphical elements of the player user interface can be rendered on the 2D display and the player can interact with the graphical elements using touch input technology, touchless input technology, gesture input technology, voice input technology, or the like.

For example, in some embodiments, the player devices $110_{1-k}$ and/or the player display devices $112_{1-k}$ can be or include a touchscreen display device comprising suitable hardware that registers input events in response to touch (e.g., by a finger, stylus, gloved hand, pen, etc.). The type of the touchscreen can vary and can include but is not limited to, a resistive touchscreen, a surface capacitive touchscreen, a projected capacitive touchscreen, a surface acoustic wave touchscreen, and an infrared touchscreen. In other embodiments, the player devices $110_{1-k}$ and/or the player display devices $112_{1-k}$ can be or include a touchless input display device to further facilitate minimizing user contact with potentially contaminated surfaces, thus further minimizing the spread of surface borne pathogens. For example, the player display devices $112_{1-k}$ can comprise touchless displays devices configured to detect the position of an object (e.g., by a finger, stylus, gloved hand, pen, etc.) over the display screen within close proximity (e.g., a few centimeters) to the display screen without the object touching the screen. With these embodiments, the player can interact with the graphical controls to provide their desired game moves without touching the display screen. The player display devices $110_{1-k}$ and/or the player devices $112_{1-k}$ can also employ other suitable user input technology (e.g., voice input, gesture input, etc.) to receive user input commands in association with player interaction with the player user interface.

In other embodiments, the 2D display screen can comprise an augmented reality (AR) display screen that is positioned within a line of sight of the player's view of the active game area 108. For example, in some implementations, the 2D display screen can comprise a transparent display that is vertically positioned on/over the game table between the player 114 and the active game area 106. With these implementations, one or more graphical elements of the player user interface can be rendered the transparent display and the player can interact with the graphical elements using touch input technology, touchless input technology, gesture input technology, voice input technology, or the like. In another implementation, the 2D display screen can comprise a transparent AR display in the form of eyewear (e.g., glasses, goggles, etc.) that is worn by the player 114. With this implementation, the player 114 can interact with the graphical elements rendered via the AR eyewear display using one or more input buttons located on the eyewear display device, by touching or tapping the eyewear display device, using gesture input technology, using voice input technology, or the like.

In some implementations of these AR embodiments, at least some of the graphical elements can be spatially aligned with one or more elements of the active game area and interacted with by the player. For example, the graphical elements can include graphical game pieces that can be interacted with by the player and moved by the player 114 about the game table. For instance, in one or more embodiments in which the table game is roulette or a similar game, the player user interface can present the player with graphical chips that can be interacted with by the player and moved about the display to align them with selected positions on the roulette layout printed on or otherwise provided on the active game area 108. Similarly, in some embodiments in which the table game is Blackjack, the player user interface can present the player with graphical chips that can be interacted with by the player and moved by the player onto the active game area in association with placing bets.

Additionally, or alternatively, the player user interface can comprise a three-dimensional (3D) holographic display. With these embodiments, the player devices $110_{1-k}$ and/or the player display devices $112_{1-k}$ can be or include an interactive holographic display device comprising suitable hardware and/or software that generates touchable holograms corresponding to input controls. In some implementations these embodiments, the touchable holograms can include holographic game pieces that can be interacted with by the player and moved by the player 114 about the game table. For example, in one or more implementations in which the table game is roulette or a similar game, the player user interface can present the player with holographic chips that can be interacted with by the player and moved on/over the game table 106 to align them with selected positions on the roulette layout printed on or otherwise provided on the active game area 108. Similarly, in implementations in which the table game is Blackjack, the player user interface can present the player with holographic chips that can be interacted with by the player and moved by the player onto the active game area 108 in association with placing bets. For example, the player devices $110_{1-k}$ and/or the player display devices $112_{1-k}$ can employ touchable hologram technology that generates 3D touchable holograms corresponding to input controls, chips, and other game pieces/elements. The player devices $110_{1-k}$ and/or the player display devices $112_{1-k}$ can further detect the players touch with the holographic elements by sensing movements in the air. In some implementations, the player devices $110_{1-k}$ and/or the player display devices $112_{1-k}$ can also provide haptic feedback to player by sending an ultrasonic air blat in return.

The dealer device 102 and/or the dealer display device 104 can employ one or more of the display device and user input technologies for the dealer user interface described above with reference to the player devices $110_{1-k}$, the player display devices $112_{1-k}$ and the player user interface.

In accordance with table game system 100, and table game system 200 (and additional table game systems disclosed herein), the game table unit (game table unit 101 and game table unit 201) and/or the game control device 118 can further be communicatively coupled (e.g., via one or more wired or wireless connections) to an accounting system 130. The accounting system 130 can store player account data 132 and dealer account data 134 that can be used by the players $114_{1-k}$ and the dealer 103 to play the table game at the game table 106 in accordance with one or more embodiments of the disclosed subject matter.

In this regard, various embodiments of the disclosed table game systems (e.g., table game system 100, table game system 200 and the like) can involve table games that are played for rewards for defined winning game events. For example, in some implementations, the reward can be or correspond to a monetary reward, wherein the player and/or the dealer is rewarded with a monetary amount for a defined winning game event. In various embodiments, the reward can include virtual chips that correspond to traditional casino game chips with different monetary amounts. In some implementations of these embodiments, visual representations of the virtual chips can be rendered via the player user interface (e.g., as graphical elements, as holographic elements, etc.). In some embodiments, the virtual chips can be exchanged for their monetary value. In other embodiments, the reward can be a non-monetary reward (e.g., playing for points, playing for points exchangeable for prizes, etc.). The table games can also involve penalizing a player and/or the dealer for defined losing game events. For example, the player and/or the dealer's money, virtual chips, points, etc. can be taken away for defined losing game events. In various embodiments, the table games can involve a game of chance in which the players $114_{1-k}$ place bets against the dealer 103 on the chance of occurrence of a defined winning game event, wherein the respective players are $114_{1-k}$ rewarded the amount/value of their bet if the defined winning event occurs (e.g., if the player wins) and the dealer 103 is rewarded the amount/value of the bet if the defined winning event does not occur (e.g., if the dealer wins).

In some embodiments, the players $114_{1-k}$ can be provided with game winning rewards at their player device $110_{1-k}$ in association with playing the game. For example, the dealer control module 120 can be configured to issue a player with a point reward or the like in response to a winning game move/event that can be presented to the player at their player device in association with playing the game. Similarly, the dealer control module 120 dealer control module 120 can be configured to issue the dealer with a point reward or the like in response to a winning game move/event for the dealer 103 that can be presented to the dealer at the dealer device 102 in association with playing the game. In some implementations, when the player is finished playing the game, the point reward (or reward amount) received by the player can be cleared and information associating the player's identity to the reward earned is not tracked or stored. In other implementations, the players devices $110_{1-k}$ can include or be operatively coupled to a mechanical awarding device/machine (not shown) that prints or otherwise provide the player with a tangible reward based on the point reward amount. For example, in some implementations, the mechanical awarding device/machine can print a receipt, coupon or the like with the reward amount/value. With these implementations, the printed receipt, coupon, etc., can be exchanged for goods, services, prizes, money, etc.

In other embodiments, the disclosed table game systems (e.g., table game system 100, table game system 200 and the like) can issue game rewards/winnings received by players $114_{1-k}$ in association with playing the table game to personal player accounts established for the players $114_{1-k}$ with the accounting system 130. The disclosed table game systems can similarly issue game rewards/winnings received by the dealer 103 to a dealer account established for the dealer 103 with the accounting system 130. With these embodiments, information regarding player reward winnings and loses can be tracked and stored in their player account and information regarding dealer reward winnings and loses can be tracked and stored in the dealer account. In particular, the disclosed table game systems (e.g., table game system 100, table game system 200 and the like) can allow players to register with the accounting system 130 and establish personal player accounts that uniquely identifies each player $114_{1-k}$. The player account data 132 can include account information for each player's account and can be stored by the accounting system 130 in one or more databases accessible to the dealer control module 120 and/or the player control module 122.

In some embodiments, each dealer can also have a personal dealer account that uniquely identifies each dealer. For example, in various embodiments, the disclosed table game systems can include a plurality of device operated table game units such as table game unit 101 that are respectively controlled by different live dealers in casino environment. In some implementations of these embodiments, each dealer can have a separate dealer account that can be used to track their individual gaming activity and control different levels of game access and operation rights (e.g., based on their account privileges). Additionally, or alternatively, the dealer account can be or correspond to a house account that can be accessed and used by a plurality of dealers. In this regard, the dealer account data 134 can include information for each individual dealer account and/or the collective house dealer account.

In accordance with these embodiments, the dealer device 102 (and/or the dealer control module 120), the player devices $110_{1-k}$ (and/or the player control module 122), and/or the game control device 118 can be communicatively coupled to the accounting system 130 and configured to access a particular player's account stored in the player account data 132. The dealer device 102 (and/or the dealer control module 120), the player devices $110_{1-k}$ (and/or the player control module 122), and/or the game control device 118 can further issue the players' game rewards (e.g., money, virtual chips, points, etc.) to their personal player account in association with playing the table game at the game table 106. In some embodiments, the dealer control module 120 and/or the player control module 122 can also access a particular player's account stored in the player account data 132 and remove the player's rewards (e.g., money, virtual chips, points, etc.) from their personal player account based on their game losses in association with playing the table game at the game table 106.

Additionally, or alternatively, in some embodiments in which the table game involves the players $114_{1-k}$ placing bets against the dealer 103 on the chance of occurrence of a defined winning game event wherein the player is rewarded the amount/value of the bet if the defined winning event occurs (e.g., if the player wins) and the dealer is rewarded the amount/value of the bet if the defined winning event does not occur (e.g., if the dealer wins), the dealer control module 120 and/or the player control module 122 can automatically transfer game winnings and losses between the player's account and the dealer's account. For example, in some implementations, the betting can involve placing bets using virtual chips having a defined value (e.g., a monetary value, a point value, etc.). With these implementations, a player can purchase or otherwise receive virtual chips for playing table games and information regarding the amount of virtual coins available to the player can be stored in their player account (e.g., stored in the player account data 132). Information regarding the amount of virtual chips available to the dealer for playing the table games can also be provided in the dealer's account stored in the dealer account data 134. In various embodiment, the amount of virtual chips available to the dealer 103 can be unlimited. A player can further place bets using the virtual chips available in their player account. The system can further transfer an amount of virtual chips corresponding to the value of the bet from the dealer's account to the player's account if the player wins, and transfer an amount of virtual chips corresponding to the value of the bet from the the player's account to the dealer's account if the player loses.

In some implementations, these game reward and loss transfers can be controlled by the dealer 103 using the dealer user interface displayed at the dealer device 102 based on the dealer's manual determination of whether the player wins or loses. In this regard, the dealer 103 can determine whether the dealer wins or the player wins based on the dealer's observation of the results of the dealer's interaction with the tangible game pieces, the resulting game position of the dealer, and the player's game moves/position. For example, with respect to Blackjack, the dealer 103 can deal physical cards for the dealer and the respective players $114_{1-k}$ in the active area 108 in accordance with the game rules and the players' game moves (e.g., hit, stay, double down, etc.). The dealer 103 can further manually determine whether the player's cards beat the dealer's cards or vice versa for each hand based on observation of the physical cards dealt for the play and the dealer cards as displayed in the active game area 108. In other implementations discussed in greater detail infra with reference to FIGS. 9 and 11, the table game system can automatically determine whether a player or the dealer wins based on analysis of image data captured of the active game area and the tangible game pieces and automatically control game reward and loss transfers between the player account and the dealer account accordingly.

Additional features and functionalities of the accounting system 130 are described in greater detail with reference to FIG. 3.

Figure 3:
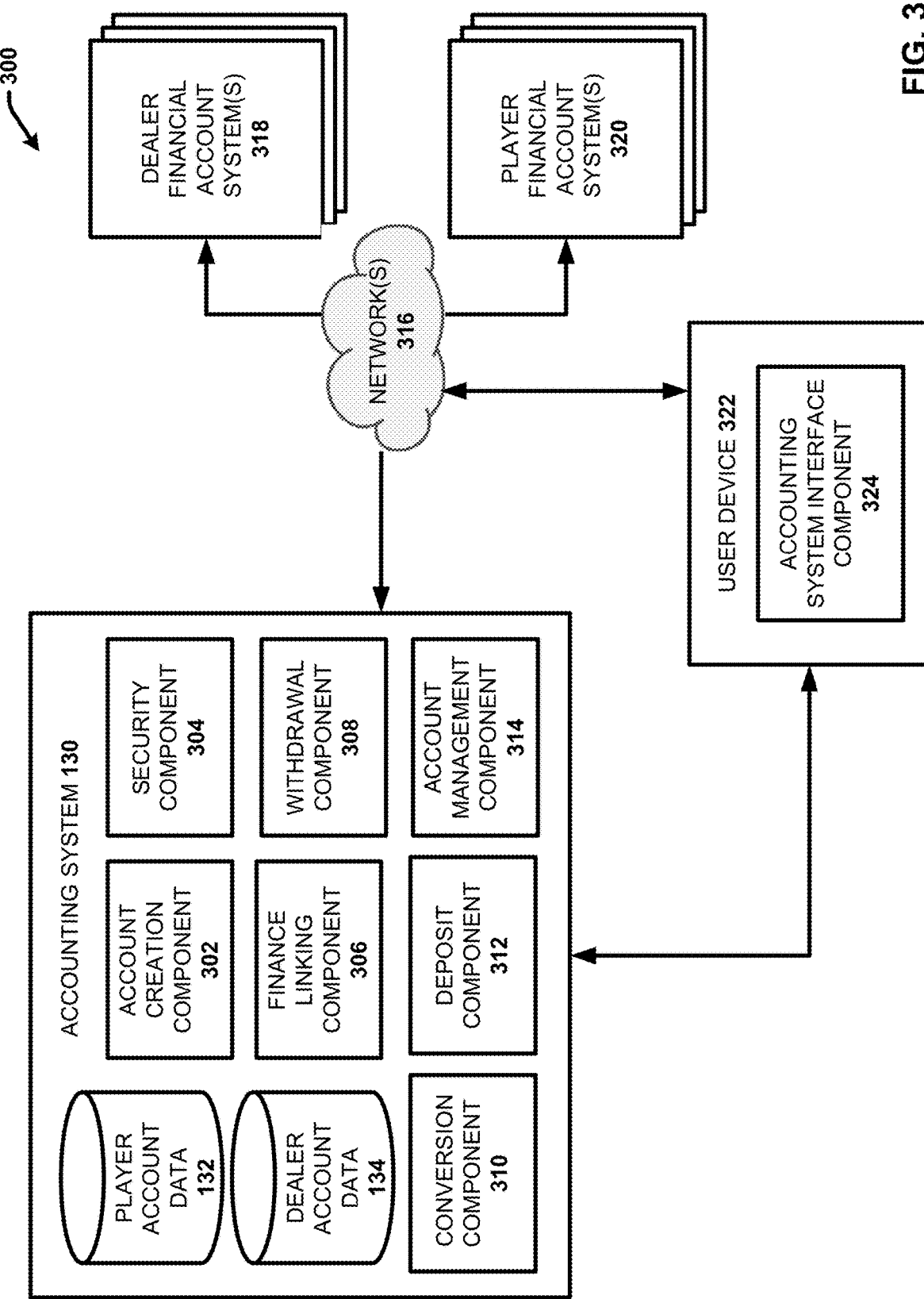
FIG. 3 illustrates a block diagram of an example, non-limiting system that facilitates electronic transfer of game winnings and loses between a player account and a dealer account in association with playing a table game in accordance with one or more embodiments of the disclosed subject matter.

FIG. 3 illustrates a block diagram of an example, non-limiting system 300 that facilitates electronic transfer of game winnings and loses between a player account and a dealer account in association with playing a table game in accordance with one or more embodiments of the disclosed subject matter. Repetitive description of like elements employed in respective embodiments is omitted for sake of brevity.

System 300 include accounting system 130 which includes the player account data 132 and the dealer account data 134. The accounting system 130 can further includes various computer executable components, including account creation component 302, security component 304, finance linking component 306, withdrawal component 308, conversion component 310, deposit component 312 and account management component 314. Although not shown, the accounting system 130 can include or be operatively coupled to at least one memory (e.g., system memory 2506) that stores the computer executable components and at least one processor (e.g., processing unit 2404) that executes the computer executable components.

The account creation component 302 can provide for creating a player account for a player with the accounting system 130 and storing the player account information with the player account data 132. In this regard, the account creation component 302 can receive information uniquely identifying a player and generate a player's account for the player that links the player's identity to a unique account name/number for the player's account. For example, in some embodiments, the account creation component 302 can assign players with a unique account name/number or the like that is linked to their identity via one or more unique identifiers for their identity. For instance, the one or more unique identifiers can include (but are not limited to), a chosen username, a legal name, a phone number, an email address, a social security number, a birth certificate number, a driver's license number, a passport number, etc.

The accounting system 130 can employ various mechanisms to receive player identifier information and generate player accounts. In various embodiments, the accounting system 130 can be accessed using a user device 322 that includes an account system interface component 324 that provides for interfacing with the accounting system 130 and generating a player's account. The user device 322 can be communicatively coupled to the accounting system 130 directly and/or via one or more networks 316. For example, the one or more networks 316 can include wired and wireless networks, including but not limited to, a cellular network, a wide area network (WAD, e.g., the Internet), a virtual private network (VPN), a local area network (LAN), or the like. The one or more networks 316 can enable communication between the accounting system 130 and the user device 322 (and other systems/devices such as the dealer financial account systems 318 and the player financial account systems 320) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), fourth generation partnership project (4GPP), fifth generation partnership project (4GPP), ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols.

The user device 322 and the accounting system 130 can thus include hardware (e.g., a central processing unit (CPU), a transceiver, a decoder), software (e.g., a set of threads, a set of processes, software in execution) or a combination of hardware and software that facilitates communicating information between the user device 322 and the accounting system 130 as well as other external systems, sources, devices, etc. (e.g., the one or more dealer financial account systems 318 and/or the one or more player financial account systems 320). The user device 322 can include any suitable computing device (or group of computing devices) configured to receive user input and interface with the accounting system 130 to employ the features and functionalities thereof. For example, the user device 322 can be or include a desktop computer, a laptop computer, a kiosk, a television, an Internet enabled television, a mobile phone, a smartphone, a tablet personal computer (PC), or a personal digital assistant (PDA), a heads-up display (HUD), an augmented reality (AR) device, a virtual reality (VR) device, a wearable device, and the like.

The deployment architecture of accounting system 130 and other systems described herein can vary. In some embodiments, the accounting system 130 can be deployed in a cloud architecture, a virtualized enterprise architecture, or an enterprise architecture wherein one or more features and functionalities of the accounting system 130 are accessed by the user device 322 using a server/client relationship. For example, one or more features and functionalities of the accounting system 130 can be deployed as a website, a web-application, a cloud-application, a thin client application, a thick client application, a native client application, a hybrid client application, or the like. With these embodiments, the account system interface component 324 can be or include a browser, a thin client application, or the like that, is configured to interface with the accounting system 130 to access/use the features and functionalities of the accounting system 130 at the user device 322. In this regard, the user device 322 can be used by a player (or another entity on behalf of the player) to access the accounting system 130 as a website, a web-application, a mobile application or the like and to provide input to create a player account, to link a financial account to their player account, to view and manage their player account, and the like. With these embodiments, the user device 322 can be or correspond to a personal computing device associated with the player (e.g., a personal mobile device, a personal desktop computer, etc.), a local public computing device accessible to multiple players, a remote computing accessible to multiple players, or the like.

In another embodiment, the accounting system 130 can be deployed on a single local device (e.g., a desktop computer, a kiosk, etc.), as a local web-based application or the like. For example, in one or more embodiments, the user device 322 can be or correspond to a kiosk located in a casino environment that includes many different game table units such as game table unit 101, game table unit 201 or the like, that are communicatively coupled to the accounting system 130. With these embodiments, a player can access the accounting system 130 using the kiosk to provide input to create a player account, to link a financial account to their player account, to view and manage their player account, and the like. In some implementations of these embodiments, the kiosk can further print/generate a physical player card that electronically stores player account information and/or information linking the player to the player's account in a manner similar to a credit card. In some embodiments (as described in greater detail infra) the player card can further be used as means for securely accessing a player's account.

In various embodiments, the disclosed table game systems (e.g., table game system 100, table game system 200, and additional systems described herein) can restrict playing of table games by players (and optionally other types of games such as slot machines or the like) based on usage of their player account. In this regard, with reference to FIGS. 1, 2 and 3, in one or more embodiments, to begin playing a table game at a game table 106, a player first accesses and/or links their established player account to the particular player device 110 the player has selected to use to play the table game. The security component 304 can employ various user authentication/verification mechanisms to securely accomplish this task. For example, in some embodiments, the player can log-in to their player account at the player device 110 via entry of an established username, account name, etc. and password for their player account (e.g., using the player user interface rendered at the player device 110). With these embodiments, in association with generating a player account, the account creation component 302 and/or the security component 304 can establish a secret password, passcode, personal identification number (PIN) or the like, for the player's account that links the player's identity to the player's account. The user's secret password or the like can further be stored with their account information in the player account data 132. The security component 304 can further require entry of the correct username, account name, etc., and secret password, passcode, PIN, etc. in association with a request to log-into and access their player's account at a player device 110. The security component 304 can further grant access to the player's account at the player device based on entry of the correct username/password. In some embodiments, after a player has established a player account, the player can also employ the player's account information (e.g., account number, username, etc.) and password to log-into and access the player's account using the user device 322 or another device (e.g., to view and manage their player account).

Additionally, or alternatively, the security component 304 can link a player's account to a physical player card that electronically stores the player's account information and/or information linking the player to the player's account in a manner similar to a credit card.

Figure 4:
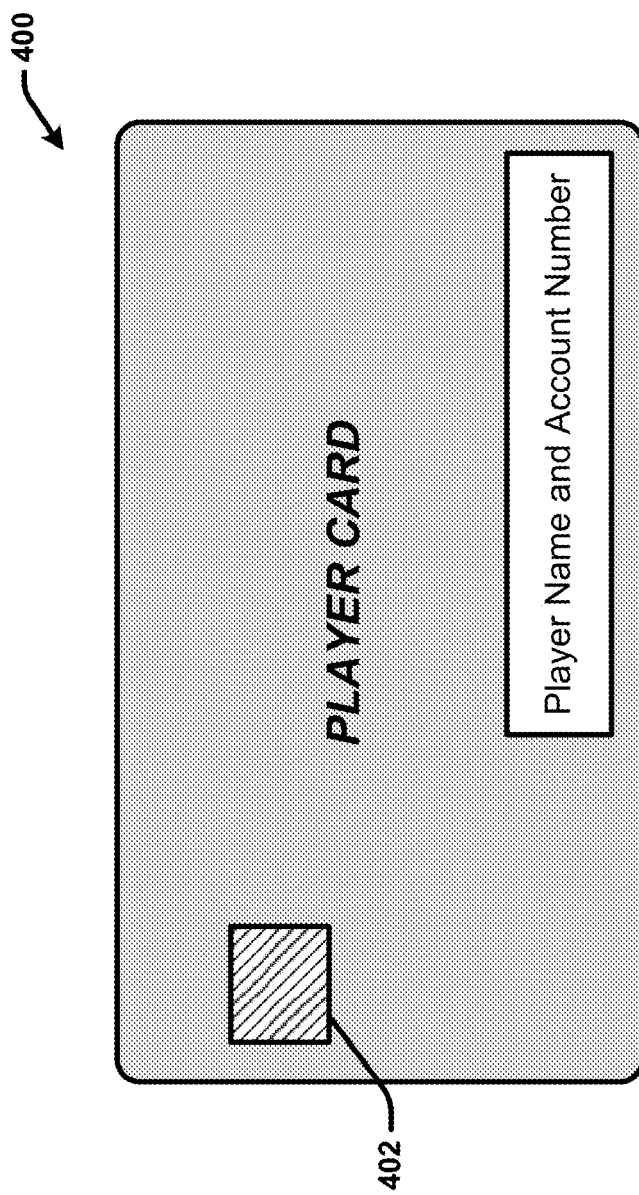
FIG. 4 presents an example player card in accordance with one or more embodiments of the disclosed subject matter.

For example, FIG. 4 presents an example player card 400 in accordance with one or more embodiments of the disclosed subject matter. In the embodiment shown, the player card 400 corresponds to a physical/tangible card resembling a credit card. In some embodiments, the player card 400 can include information identifying the player (e.g., the player's name) and/or identifying or indicating the player's account number. In the embodiment shown, the player card 400 includes a chip 402 that electronically stores the player's account information and/or account access information (e.g., account name, account number, password/passcode number, PIN). In some embodiments, the chip 402 can be or include a radio frequency identification device (RFID). In other embodiments, the chip 402 can be or correspond to a unique barcode (e.g., a quick response code) that contains the player's account information and/or account access information. Additionally, or alternatively, the player card 400 can include a magnetic stripe (e.g., located on the backside of the card) that contains the player's account information and/or account access information (e.g., name, account number, password/passcode number, PIN).

With these embodiments, a card reader device can be operatively coupled to the player device 110 (and/or the user device 322) for reading the player card and accessing and/or loading the player's account information at the player device 110 (and/or the user device 322) for usage in playing the table game.

Figure 5:
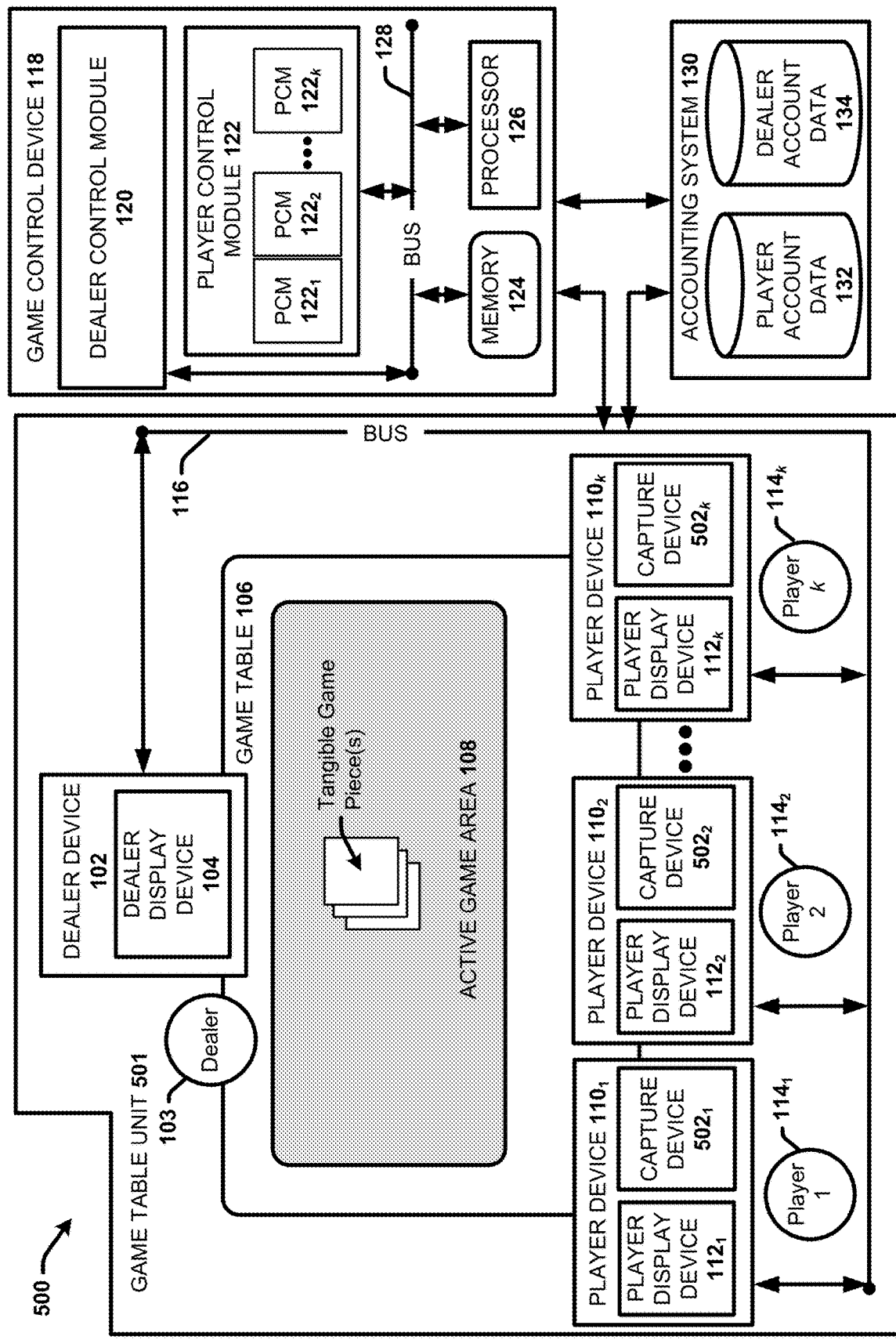
FIG. 5 illustrates a block diagram of another example, non-limiting, device operated table game system that integrates live dealer interaction with tangible game pieces in accordance with one or more embodiments of the disclosed subject matter.

For example, FIG. 5 illustrates a block diagram of another example, non-limiting, device operated table game system 500 that integrates live dealer interaction with tangible game pieces in accordance with one or more embodiments of the disclosed subject matter. System 500 includes same or similar features and functionalities as systems 100 and 200 with the addition of capture devices $502_{1-k}$ to the respective player devices $110_{1-k}$. In this regard, the respective player devices $110_{1-k}$ can include or be operatively coupled to at least one capture device 502.

With reference to FIGS. 4 and 5, in some embodiments in which the disclosed table game systems use player cards (e.g., player card 400 or the like) to access and load a player's account at a player device 110, the capture devices $502_{1-k}$ can be or comprise card reader devices configured to capture, read and/or otherwise extract the player account information from the player card. For example, the capture devices $502_{1-k}$ can comprise an RFID reader device, a magnetic strip reader device, or the like. In some embodiments in which the chip 402 comprises a barcode, the capture the capture devices $502_{1-k}$ can be or comprise a camera configured to capture and read the barcode to extract the player account information. In either of these embodiments, to begin playing a table game in accordance with some implementations of table game system 500, a player can present (e.g., swipe, insert, tap, etc.) the player card to the capture device 502 at their selected player device 110 and use the capture device 502 to access and/or load their account information at the player device 110.

Additionally, or alternatively, an electronic version of the player card 400 can be generated and/or displayed at a player's personal mobile device (e.g., a smartphone, a smartwatch, etc.). For example, the electronic version of the player card can comprise a graphical representation of the barcode or the like that contains the player's account information which can be presented on the player's mobile device and scanned and read by the capture device 502 (e.g., using a camera, a barcode reader, or the like). With these embodiments, the capture device 502 can extract the player account information linked to the barcode and load the corresponding player account at the player device 110.

With reference to FIGS. 3 and 5, the security component 304 can additionally or alternatively employ one or more biometric identification mechanism to securely identify a player in association with a request to load/access their player account at a player device 110 (and/or the user device 322 or another device). For example, the one or more biometric identification mechanisms can include but are not limited to, facial recognition, iris recognition, fingerprint recognition, voice recognition, gait recognition, or a combination thereof. With these embodiments, in association with creating a player account, the account creation component 302 can receive one or more biometric identifiers for the player and store the one or more biometric identifiers with the player account for account access purposes. For example, the security component 304 can receive one or more facial images of the player, one or more iris images of the player, one or more fingerprint images for the player, one or more voice samples for the player, etc. The security component 304 can further require the player to submit the biometric identifier(s) in association with a request to access their player account and use the submitted biometric identifier(s) to identify the player and access their player account that has been linked to their identity/biometric identifier(s). With these embodiments, the capture device $502_{1-k}$ can further be or include one or more biometric capture devices/readers. For example, the capture device $502_{1-k}$ can comprise a camera configured to capture one or more facial images of the player, one or more iris images of the player, one or more fingerprint images for the player, and the like. The security component 304 can further employ facial recognition technology, iris recognition technology, fingerprint recognition technology, etc., to verify the identity of the player based on the received biometric identifier(s) and access the player's corresponding player account linked to their identity.

In some embodiments, the security component 304 can employ a combination of two or more different player identification/authentication mechanisms to securely identify a player and access the player's account at a player device 110 (or another device). For example, the security component 304 can employ two or more of the following account access measures to restrict access to a player's account at a player device 110 (or another device): entry of a username/account name linked to the player account; entry of a secret password, passcode, PIN, etc. linked to the player account; provision of physical of a player card linked to the player's account; provision of an electronic version of the player card linked to the player account; and provision of one or more biometric identifiers linked to the player account.

In some embodiments, the account creation component 302 and the security comment 304 can also provide for creating a dealer account for a dealer using same or similar mechanisms discussed above for the player accounts. For example, in some implementations, a dealer 103 can establish a personal dealer account that links the dealer to a distinct account for the dealer. In this regard, each dealer in a casino gaming environment that includes a plurality of different device operated game table systems respectively operated by different dealers can have a separate dealer account in the dealer account data 134. Additionally, or alternatively, each dealer in such a casino gaming environment can be coupled to an aggregated house account that aggregates information for all (or subgroups) of the table game systems in the casino environment. For example, the house account can aggregate dealer winnings (e.g., funds/money virtual chips) received at the respective table game systems and provide the respective dealers (and/or the respective dealer control modules 120 associated with the respective dealer devices 102 used by the dealers at the respective game tables) with access to the house funds/money and/or financial account(s) for transfer to the players accounts in association with playing the table games.

The security component 304 can further employ same or similar account access security mechanisms (e.g., username/password login, PIN verification, dealer card reader mechanism, dealer biometric authentication mechanisms, etc.) to allow the dealer (or another authorized entity) to access their account and/or the house account at a dealer device 102 and/or another device. For example, in some implementations, the dealer user interface displayed at the dealer device 102 can present the dealer with a log-in screen via which the dealer can enter their username and password to gain access to their dealer account and/or the house account prior to initiating a gaming session at the game table 106. Additionally, or alternatively, (although not shown) the dealer device 102 can include or be operatively to a capture device 502 that can capture, read or otherwise extract information linking the dealer to the dealer/house account from a dealer card similar to the player card, via an electronic version of the dealer card, and/or that can identify the dealer using one or more biometric identification mechanism and access/load the dealer/house account linked to their identity.

The accounting system 130 can further include a finance linking component 306 that provides for linking one or more financial accounts for a player established with one or more player financial account systems 320 to their player account. The finance linking component 306 can also provide for linking one or more financial accounts for the dealer (or the "house") established with one or more dealer financial account systems 318 to the dealer account. Information regarding a financial account linked to a player account and/or a dealer/house account can further be stored with the player account (e.g., in the player account data 132) and/or the dealer/house account (e.g., in the dealer account data 134).

In the embodiment shown, the one or more dealer financial account systems 318 and/or one or more player financial account systems 320 can be communicatively coupled to the accounting system 130 via one or more networks 316. Thus in various embodiments, the one or more dealer financial account systems 318 and/or the one or more player financial account systems 320 can comprise one or more electronic payment systems with which the dealer/player has an established financial account that can be used to electronically transfer money/funds between the financial account and the player/dealer account with the accounting system 130. For example, the one or more dealer financial account systems 318 and/or one or more player financial account systems 320 can be or include various third party online banking systems/institutions (also referred to as an internet banking system or web banking system), one or more internal banking systems/intuitions for the disclosed table game systems, one or more online payment service providers (e.g., Alipay™, PayPal™, Apply Pay™, Zelle™, Venmo™, etc.), one or more cryptocurrency payment systems (e.g., Bitcoin payment systems such BitPay™, Coinify™, etc.), and the like. In this regard, the player and/or dealer financial accounts that can be linked to their player/dealer account with the accounting system 130 can include (but are not limited to), a banking checking account, a banking savings account, a credit card account, an online payment platform account, and a cryptocurrency account. The finance linking component 306 can employ various techniques to securely link and access player and/or dealer financial accounts held at their respective financial account systems to their player account and/or dealer/house account with the accounting system 130 (e.g., using defined application program interfaces (API)s for their respective financial account systems and the like).

The accounting system 130 can further provide for linking multiple different financial accounts to a player account and/or a dealer/house account. In addition, it should be appreciated that one or more dealer financial account systems 318 and the one or more player financial account systems 320 can be the same (e.g., both a dealer/house financial account and a player's financial account can be provided by the same bank, banking system, etc.).

In various embodiments, a player can use money/funds available to the player in a linked financial account to purchase goods and/or services associated with the disclosed table game systems. For example, in some embodiments, the disclosed table game systems can charge a fee for playing a table game which can be paid using funds withdrawn from a linked financial account. The accounting system 130 can further include withdrawal component 308 to facilitate withdrawing the requisite funds to pay the fee prior to allowing a player to play the table game using their selected player device 110. In another embodiments, the disclosed table games can involve games that require players to use points to play a game. For example, the table game can involve betting using points. In another example, the game can involve playing rounds, wherein each round requires the player to exchange a defined amount of points to play the round. The table games can further involve rewarding players with additional points for game win events and/or penalizing players with removal of points for game loss events. In some implementations of these embodiments, the player can use their linked financial account to purchase points. The amount of points available to the player for playing games can be stored with their player account data.

In other embodiments, the withdrawal component 308 can transfer money/funds from a linked financial account for a player to the player's account and store the withdrawn money/funds in the players account. The available funds in the player's account can then be used by the player to purchase goods and/or services associated with the disclosed table game systems. For example, in some embodiments in which the table games involve monetary betting, the player can use available money/funds provided in a linked financial account to withdrawal money for the monetary betting.

In various embodiments, the withdrawal component 308 can facilitate withdrawing a monetary amount from the linked financial account for a player in association with a request to add the withdrawn monetary amount to the player's account. The withdrawal component 308 can further add the withdrawn monetary amount to the player's account and information regarding the amount of funds available in the player's account can be stored with the player's account in in the player account data 132. In some embodiments, the withdrawal component 308 can charge the player a withdrawal fee for facilitating the withdrawal. The withdrawal component 308 can further be configured to add/deposit the withdrawal fee amount to the dealer account and/or a general house account for the gaming system (e.g., an aggregated account for a plurality of different dealers) provided in the dealer account data 134.

In some implementations, the player can generate and authorize the withdrawal request in association with access of their player account via the user device 322, a player device 110, or another device. For example, once a player has created/established a player account with the accounting system 130, the account management component 314 can provide various account management features and functionalities associated with the player account, including linking one or more financial accounts to the player account, controlling transfer or funds/money, controlling conversion of funds/money, setting rules and restrictions for account access/usage, and the like. Thus in some implementations of system 300, a player can log-into or otherwise securely access their player account and be presented with an account management user interface that allows the player to select the monetary amount and the financial account for withdrawing the funds and authorize the withdrawal. In other embodiments in accordance with table game system 100, table game system 200 (and additional systems described herein), a player can control the withdrawal via the player user interface presented at their player device 110 in association with playing the table game. For example, the player user interface can provide a betting control function via which the player can select an amount of funds to play with during a gaming session and/or for betting on a single game hand, or the like. With this example, if the amount of available funds in the player account is less than the selected amount, via the player user interface, the player can authorize the withdrawal component 308 to withdrawal the selected amount of funds (and/or another defined amount of funds) from one or more linked financial accounts for the player and add the selected amount of funds to their player account. Once added to their player account, the player can be used the funds/money for betting in association with playing the game.

The currency of the withdrawn money/funds added to the player's account can vary and can include currencies for different countries, one or more forms of cryptocurrency, and the like. In some embodiments, the conversion component 310 can convert the withdrawn currency into a different currency for association with the player's account. For example, in one or more embodiments in which the disclosed table games involve betting using United States (U.S.) dollars and the withdrawn funds include money in another form of currency (e.g., a foreign currency, a cryptocurrency, etc.), the conversion component 310 can convert the withdrawn currency into U.S. dollars in association with depositing the withdrawn amount in the player's account. In some implementations of these embodiments, the conversion component 310 can charge the player a conversion fee for performing the conversion. The conversion component 310 can further be configured to add/deposit the conversion fee amount to the dealer account and/or the general house account (e.g., an aggregated account for a plurality of different dealers) for the gaming system (e.g., provided in the dealer account data 134).

In other embodiments, the disclosed table games can involve betting using virtual chips having a value corresponding to the withdrawn monetary amount. With these embodiments, the conversion component 310 can convert the money/funds withdrawn from a linked player financial account into virtual chips having the corresponding value. For example, in some implementation, the virtual chips can correspond to traditional casino gaming chips with different monetary values. Each player account can further include chip information identifying or indicating an amount of virtual chips and/or money the player has available to use for playing games (e.g., available for betting) and/or purchasing other goods and services associated with the disclosed table game systems.

In other embodiments, the accounting system 130 can provide for depositing money/funds into their player account and/or otherwise purchasing virtual chips for adding to a player account without linking a financial account to their player account. For example, in some implementations described in greater detail with reference to FIG. 24, the disclosed table gaming systems can provide a kiosk device via which a player (or an authorized agent of the player) can deposit cash into their player account. In other embodiments, a player can purchase a prepaid player card that has a defined amount of credit (e.g., money/funds, virtual chips, etc.) associated with it. In some implementations, the prepaid player card can further be linked to their identity and/or a player account the player account for the player with the accounting system (e.g., in the player account data 132). With these embodiments, the player can use the prepaid player card to play table games in accordance with the disclosed table game systems.

The withdrawal component 308 can also provide for withdrawing money/funds from one or more financial accounts for the dealer/house for depositing in the dealer/house account. Information regarding the amount of funds available in the dealer/house account can further be stored with the dealer/house account in the dealer account data 134. In some embodiments, the withdrawal component 308 can be configured to maintain a minimum available balance in the dealer/house account. With these embodiments, in implementations in which the dealer account available balance drops below a threshold amount, the withdrawal component 308 can automatically withdrawal a defined amount of money from a linked financial account for the dealer/house for transfer into the dealer/house account.

In addition to withdrawing money for loading onto a player/dealer account, the deposit component 312 can provide for depositing money/funds from a player/dealer account to a linked financial account for the player/dealer held at the one or more player financial account systems 320 and/or the one or more dealer financial account systems 318. For example, in various embodiments, the disclosed table game systems can involve rewarding a player with a monetary reward and/or virtual chips corresponding to a monetary reward in association with playing table games. These game winning amounts (e.g., virtual chips, money/funds, etc.) can be added to and stored in the player's account with the accounting system 130. The deposit component 312 can further transfer the aggregated game winnings and/or a selected amount of the aggregated game winnings to one or more of the linked player financial accounts. In some embodiments, the conversion component 310 can also convert the virtual chips and/or money into a selected currency prior to depositing into the linked financial account. The deposit component 312 can similarly provide for depositing or otherwise transferring monetary game winnings added to the dealer account to one or more linked financial accounts for the dealer/house at the one or more dealer financial account systems 318.

The account management component 314 can provide various player account and/or dealer account management features and functionalities. For example, the account management component 314 can allow a player/dealer to modify account access information established for their player account (e.g., modify their username/password, modify their PIN, modify their player card data, modify their biometric access data, etc.). The account management component 314 can also allow a player to set personal account access and/or usage restrictions for their player account. For example, the account access and/or usage restrictions can include restrictions on timing when the player can use their account to play games, restrictions on type of games the user can play, restrictions on betting maximums and/or minimums, restrictions on duration of time the player can play certain games, restrictions/conditions for when the player must stop playing a game and close out (e.g., based on time, amount lost, loss rate, amount won, win rate, etc.), restrictions on amount of funds/money the player can lose and/or win, restrictions on the amount of funds/money the player can use from their available player account balance per game, per hour, per day, per week, and the like.

In some implementations, the account access and/or usage restrictions can be based on other contextual game factors (or game context), which can include but is not limited to: a current status of the game (e.g., mid-shoe, new dealer, etc.), one or more current game statistics (e.g., dealer wins verses player wins, percentage landing on red verses landing on black, etc.), number of active player at the game table, type of the active player (e.g., either in-person or remote), identities of the other active players at the game table, player ratings of the other active players, identity of the dealer, a rating of the dealer, duration of play of the other active players, and the like. In this regard, as described in greater detail infra with reference to FIG. 21, in some embodiments, players can receive different status classifications or player ratings based on various factors related to their gaming activity/history, winning/loss amounts, winning/loss rates, player reviews (e.g., subjective ratings/reviews of the player provided by one or more dealers regarding their gaming behavior, generosity, kindness, sportsmanship, etc.) and the like. Information regarding a player's gaming history/activity, player rating, reviews and the like can further be stored with their player account in the player account data 132 and used for various purposes including as a condition for restricting player account usage for game play.

The account management component 314 can also allow the player to define/set personal accounting rules that control withdrawal amounts from one or more linked financial accounts for withdrawing money/funds for transfer to their player account. For example, the account management component 314 can allow a player to set one more withdrawal restrictions that control when the player can withdrawal funds from a linked financial account (and/or the available balance in their player account) and the amount of funds the player can withdrawal from different linked financial accounts. For instance, the player can authorize a maximum withdrawal amount per hour, per day, per week, per game, per financial account, etc. In another example, the account usage and/or withdrawal rules can be based on one or more conditions related to game type, game context, amount of time playing a game, loss amount, loss rate, etc.

Many of the example account usage and/or withdrawal restrictions described above can be based on tracked player activity and game context. For example, the account usage (e.g., for playing games) and/or withdrawal restrictions can be based on a tracked amount of active game time in total per a defined time period (e.g., per hour, per day, etc.), a tracked amount of active game time per a defined time period (e.g., per hour, per day etc.) and/or at a specific game, a tracked amount of winnings per a defined time period and/or game, a tracked amount of losses per a defined time period and/or game, a tracked amount of money/funds withdrawn, the various contextual factors discussed above, and the like. As discussed in greater detail infra with reference to FIGS. 17 and 21, the disclosed table game systems can include tracking components (e.g., live game tracking component 1704, player tracking component 2102, and dealer tracking component 2104) to track and generate this player and game activity/context information in real-time.

The security component 304 and the withdrawal component 308 can further control account access/usage and/or withdrawals based on the player defined account access and/or usage restrictions associated with respective players' accounts. For example, in some embodiments, the security component 304 can prevent or facilitate preventing a player from using their account to play table games under restricted conditions (e.g., at unauthorized times, for unauthorized durations, in unauthorized contexts, etc.). Similarly, the withdrawal component 308 can prevent or facilitate preventing a player from withdrawing funds/money from their player account and/or a linked financial account under restricted conditions (e.g., for unauthorized games, at unauthorized times, in unauthorized contexts, etc.).

In other embodiments, a player can authorize unlimited withdrawals from a linked financial account in association with player games. With these embodiments, as described in greater detail with reference to FIG. 6, in association with playing a table game using a player device 110, the player user interface can provide one or more betting controls that allow the player to continue to request and withdrawal additional funds from their linked financial account for playing the table game when their available balance in their player account drops to zero or less than the betting minimum. Additionally, or alternatively, the account management component 314 can allow the player to set an accounting rule for their account requesting the withdrawal component 308 maintain a minimum available balance in their player account. With these embodiments, in implementations in which the player account available balance drops below a threshold amount, the withdrawal component 308 can automatically withdrawal a defined amount of money from a linked financial account for the player for transfer into the player account.

Figure 6:
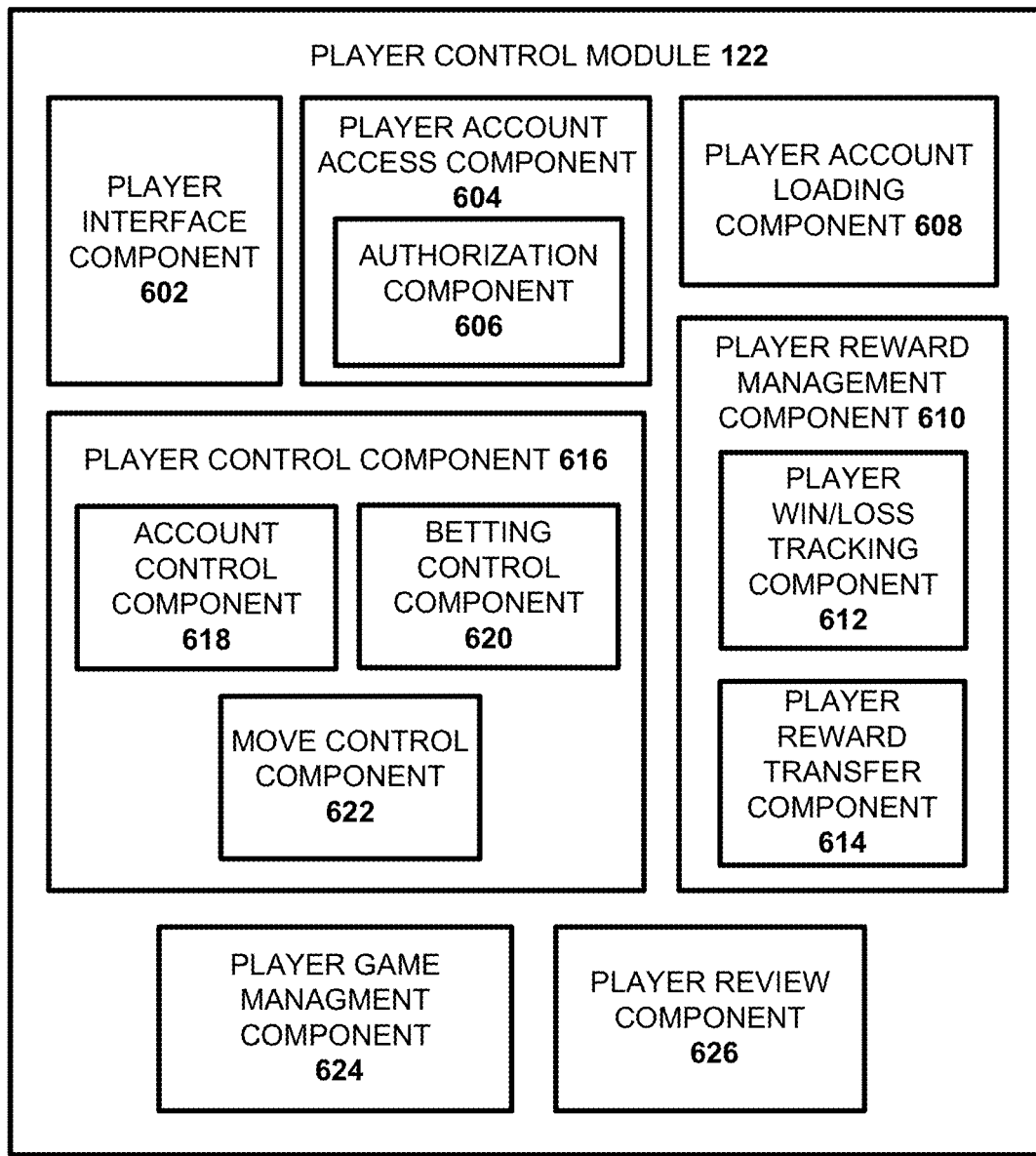
FIG. 6 presents an example player control module in accordance with one or more embodiments of the disclosed subject matter.

FIG. 6 presents an example player control module 122 in accordance with one or more embodiments of the disclosed subject matter. In some embodiments, the player control module 122 or an instance of the player control module 122 (e.g., PCMs $122_{1-k}$) can be deployed at each player device $110_{1-k}$ and accessed by a player in association with usage of their selected player device, as described with reference to table game system 200. In other embodiments, the player control module 122 or an instance of the player control module 122 for each player device (e.g., PCMs $122_{1-k}$) can be deployed at a game control device 118 communicatively and operatively coupled to the respective player devices $110_{1-k}$, as described with reference to table game system 100. Still in other embodiments, one or more components of the player control module 122 can be distributed between the game control device 118 and the respective player devices $110_{1-k}$. Repetitive description of like elements employed in respective embodiments is omitted for sake of brevity.

The player control module 122 can include various computer executable components that provide different player side game control and management features and functionalities associated with the disclosed table game systems. In the embodiment shown, these computer executable component include (but are not limited to), player interface component 602, player account access component 604, player account loading component 608, player reward management component 610, player control component 616, player game management component 624, and player review component 626.

With reference to FIGS. 5 and 6, in one or more embodiments, the player interface component 602 can control the player user interface displayed at a player device 110 via the player display device 112 and receive user input via the player user interface. In this regard, the player interface component 602 can generate and/or present the player user interface at the player device 110, control the appearance of the player user interface, receive and interpret player input entered via the player user interface, control adapting the player user interface in response to user interaction with the player user interface, and the like.

In various embodiments, the player user interface can provide one or more interactive controls that can be used by a player to play the table game at the game table 106 based on dealer game moves performed at the game table 106 using one or more tangible game pieces (e.g., cards, dice, a wheel, etc.). For example, in one or more embodiments in which the game is Blackjack (or a similar game), the player user interface can provide interactive controls for performing player game moves, such as placing bets, requesting to stay, requesting to hit, requesting to split, requesting to double down and the like. In this regard, the players $114_{1-k}$ can perform their desired game moves based on the live dealt cards placed on the game table 106 using the player move input commands entered using the player user interface presented by their respective player display devices $112_{1-k}$.

In one or more embodiments, the player user interface can comprise a GUI that is rendered on 2D display screen. With these embodiments, the player display device 112 can be or include a 2D display and one or more graphical elements of the player user interface can be rendered on the 2D display. The player can further interact with the graphical elements using touch input technology, touchless input technology, gesture input technology, or the like.

Figure 7:
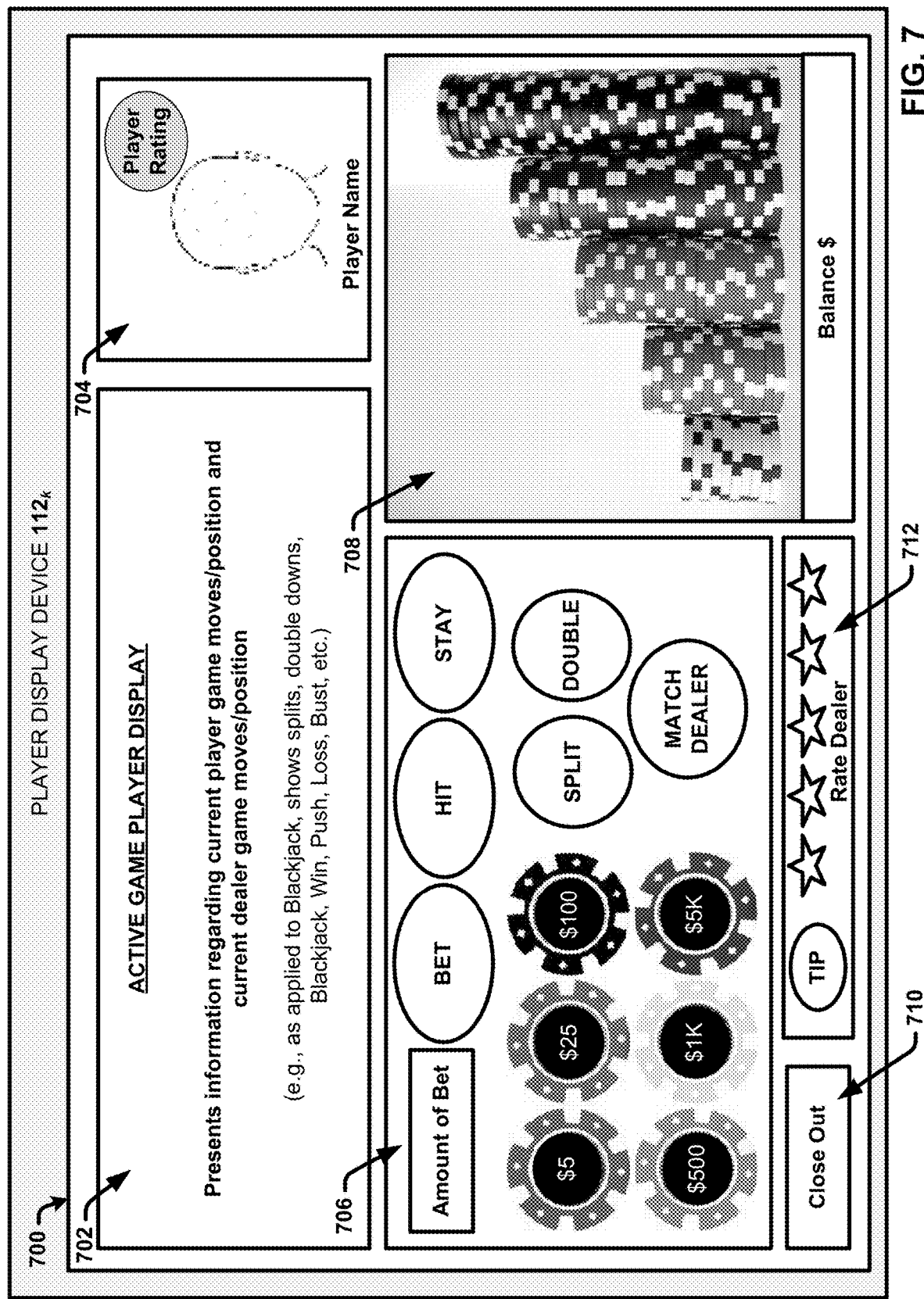
FIG. 7 presents an example two-dimensional (2D) player user interface for playing a device operated table game in accordance with one or more embodiments of the disclosed subject matter.

FIG. 7 presents an example 2D player user interface 700 for playing a device operated table game in accordance with one or more embodiments of the disclosed subject matter. In accordance with this example embodiment, the player display device $112_k$ can include a 2D display device configured to receive user input based on user interaction one or more of the graphical elements of the player user interface 700 via touch input technology, touchless input technology, gesture input technology, or the like.

With reference to FIGS. 5, 6 and 7, the player user interface 700 includes various graphical elements and relevant game information that can be presented to a player $114_k$ via the player display device $112_k$ in association with an active game session at a player device $110_k$. For example, the player user interface 700 can include an active game player display area 702 that can present game information regarding current game moves of the player $114_k$ and/or a current game position of the player $114_k$ for a current game round.

In particular, in various embodiments, the disclosed table games can include table games that are played in rounds, wherein each in each round, one or more players $114_{1-k}$ place bets against the dealer on the chance of occurrence of a defined winning game event and/or losing game event, the game is played, the results are evaluated, and the winner and losers are determined. For example, as applied to game Blackjack, a round generally starts with no cards on the table, and the player's bets being placed. A hand is dealt to every player, and the dealer, and the round ends when those hands have been played through, and the player's bets have been paid out. Continuing with this example of Blackjack, the current game moves of the player $114_k$ in a current round can include whether the player has chosen to hit, whether the player has chosen to stay, whether the player has chosen to split, whether the player has chosen to double, and the like. In another example as applied to the game of roulette, the players current game moves can include whether the player has chosen red or black, the specific number or numbers of the roulette layout the player has selected to place their bets on, and the like. In various embodiments, information regarding the current player game moves/position can be received and generated in response to user input commands entered using the player game controls displayed in the game control area 706. The type of graphical data displayed in the active game player display area 702 to indicate or convey a current player move and/or position can vary. For example, the graphical data can include but is not limited to, text, symbols, images, video, animations, and the like.

A current game position of the player in the game can also vary based on the type of game and the game rules. In some embodiments, the current game position of the player can be based on the dealer determined (or system determined) position of the player as a result of the players game moves and the dealer's game position based on the dealer's interaction with the tangible game pieces at the game table (e.g., based on the dealer's cards and the player's cards as applied to Blackjack). For example, as applied to the game of Blackjack, a player's current position could be pending (e.g., which can be the default position until the results of the round are determined), Blackjack, win, loss, bust, push, or the like. In some embodiments, information regarding the player's current position can be received from the dealer device 102 based on dealer input received from the dealer 103 via the dealer user interface as a result of the dealer's manual interpretation of the outcome of each game round. In other embodiments, the game round results can be automatically determined based on analysis of image data captured of the game table, as described infra with reference to FIG. 9 and the game image analysis component 934).

The active game player display area 702 can also present information regarding current game moves and/or a current game position of the dealer. In some embodiments, information regarding the current dealer game moves/position can be received and generated in response to dealer user input received via the dealer user interface and/or automatically based on analysis of image data captured of the game table, as described infra with reference to FIG. 9 and the game image analysis component 934).

In the embodiment shown, the player game controls included in the game control area 706 are tailored to the game of Blackjack, wherein players place bets against the dealer on the chance of occurrence of a defined winning game event or losing game event. In this regard, player user interface 700 presents an example player user interface for playing the game of Blackjack. For example, the game controls included in the game control area 706 include interactive controls for performing player game moves including requesting to hit (e.g., using the HIT control), requesting to stay (e.g., using the STAY control), requesting to split (e.g., using the STAY control), requesting to double down (e.g., using the DOUBLE control), and requesting to match the dealer (e.g., using the MATCH DEALER control). It should be appreciated that these game controls are merely exemplary and can vary for different games. In accordance with embodiment, the player 114$_k$ can perform their desired game moves based on the live dealt cards placed in the active area 108 of the game table by the dealer 103 using the player game controls included in the game control area 706. For example, in one implementation in which the display device 112$_k$ comprises a touchscreen, the player 114$_k$ can select their desired games move via touching the corresponding game controls. In another implementation in which the display device 112$_k$ comprises a touchless input display, the player 114$_k$ can select their desired games move via hovering one or more fingers, a hand, a stylus, etc. over the corresponding game controls.

The game control area 706 also includes betting controls for placing bets. In the embodiment shown, the betting controls include different graphical chips representing different monetary amounts. With this embodiment, the player can select (e.g., via touch input, touchless input, or another form of user input) the respective graphical chips corresponding to a desired bet amount to about to place a bet. The amount of the bet selected can also be displayed in the game control area 706. In some implementations, the player 114$_k$ can select a same graphical chip more than once to increase the value of the bet in corresponding increments (e.g., selection of the $5 graphical chip can result in placing a bet for $10, and so on). Once a player has entered their desired bet amount, the player can select the "BET" graphical control to place or otherwise lock in the bet.

The player user interface can also include an available balance section 708 that presents information regarding the player's current balance. For example, in some implementations, the current balance can represent an amount of virtual chips and/or money the player has won and/or maintained in association the current active gaming session at the game table 106. In other implementations, the current balance can represent an amount of virtual chips and/or money the player has available in their player account for playing games. In the embodiment shown, the current balance information can include a visual representation of the virtual chips having the value of the current balance as well as the balance valuation in dollars (or another currency).

The player user interface 700 can also provide player identifier information 704 that identifies the player and/or the player account and/or provides various other types of information about the player included in the player's account. For example, in the embodiment shown, the player identifier information 704 can include a facial image of the player or an avatar the player has selected to represent the player. The player identifier information can also include player rating information and the player's name (or account name, username, etc.). The player user interface 700 can also include a "close-out" control 710 via which the player can select to end the game and close out or otherwise log-out of their account at the player device 110. The player user interface 700 can also include a dealer section 712 that includes graphical controls via which the player can select to tip the dealer and/or rate the dealer.

It should be appreciated that player user interface 700 is merely one example implementation of a player user interface and that various other embodiments are envisioned. For example, with reference again to FIGS. 5 and 6, in one or more alternative embodiments, the player user interface can comprise an AR user interface rendered on a transparent player display device 112 positioned within a line of sight of the player's view of the active game area 108 (e.g., as eye ware worn by the player, as a transparent display that is vertically positioned on/over the game table between the player 114 and the active game area 106, or the like). With these implementations, one or more graphical elements of the AR player user interface can be rendered the transparent display and the player can interact with the graphical elements using touch input technology, touchless input technology, gesture input technology, voice input technology, or the like.

In some implementations of these AR embodiments, the player interface component 602 can spatially align one or more interactive graphical elements with one or more elements of the active game area 108. For example, the graphical elements can include graphical game pieces that can be interacted with by the player and moved by the player 114 about transparent display in a manner that spatially aligns them with selected positions of the active game area 108. For instance, in one or more embodiments in which the table game is roulette or a similar game, the AR player user interface can present the player with graphical chips that can be interacted with by the player and moved about the transparent display to align them with selected positions on the roulette layout printed on or otherwise provided on the active game area 108. Similarly, in some embodiments in which the table game is Blackjack, the player user interface can present the player with graphical chips that can be interacted with by the player and moved by the player onto the active game area in association with placing bets.

Additionally, or alternatively, the player user interface can comprise a 3D holographic user interface comprising touchable holograms corresponding to game pieces and/or player game move input controls. In some implementations these embodiments, the touchable holograms can include holographic game pieces that can be interacted with by the player and moved by the player 114 about the game table. For example, in one or more implementations in which the table game is roulette or a similar game, the holographic player user interface can present the player with holographic chips that can be interacted with by the player and moved on/over the game table 106 to align them with selected positions on the roulette layout printed on or otherwise provided on the active game area 108. Similarly, in implementations in which the table game is Blackjack, the holographic player user interface can present the player with holographic chips that can be interacted with by the player and moved by the player onto the active game area 108 in association with placing bets.

Figure 8:
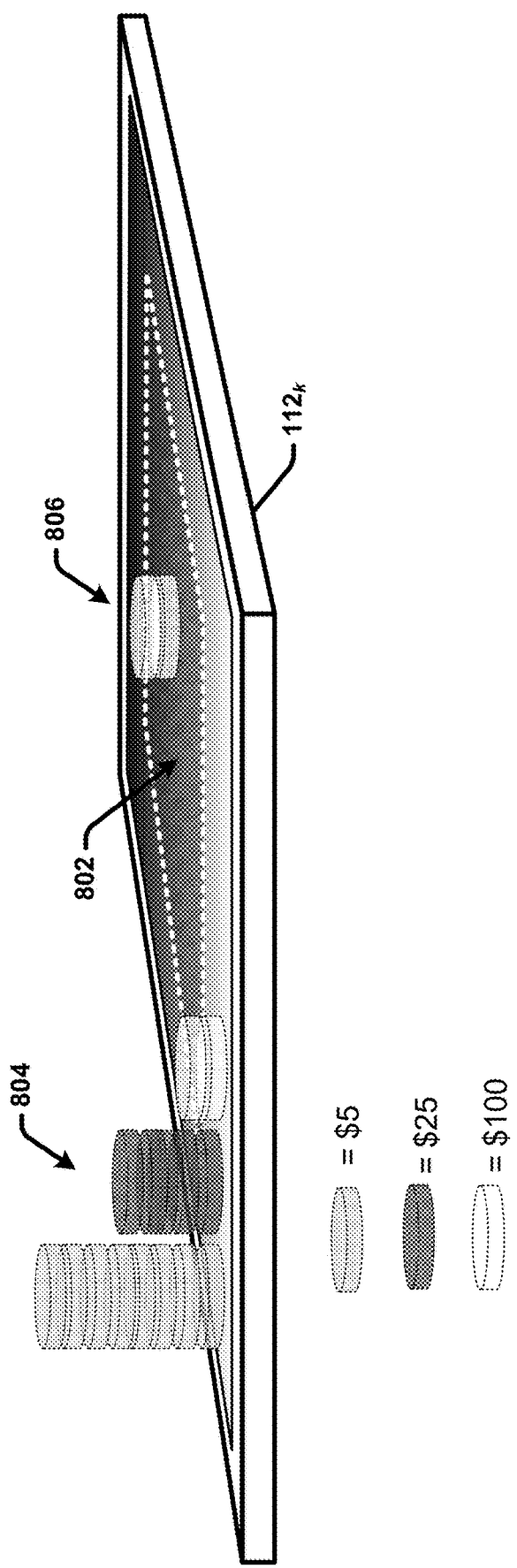
FIG. 8 presents another example player user interface for playing a device operated table game in accordance with one or more embodiments of the disclosed subject matter.

For example, FIG. 8 presents an example holographic player user interface 800 for playing a device operated table game in accordance with one or more embodiments of the disclosed subject matter. With this example embodiment, the player display device 112$_k$ can include a 3D display device configured to receive user input based on user interaction one or more of touchable holograms. In the embodiment shown, the touchable holograms include holographic chips (holographic chips 804 and holographic chips 806) that correspond to traditional casino gaming chips with different valuations. In various implementations, the holographic chips 804 represent a current amount of available chips the player has available for playing the game. For example, the holographic chips 804 can represent the amount of chips the player has won and/or maintained in association with playing the table game. In another example, the holographic chips 804 can represent the current balance of chips/money the player has available in their player account. In various embodiments, additional holographic chips can be added to the stack of holographic chips 804 as the player wins representing the amount of chips/money the player has won.

The player can further interact with these holographic chips 804 to place bets by moving one or more of them about the player user interface 800 onto the betting area 802. The one or more chips placed in the betting area are referred to herein as the "active chips." For example, in the embodiment shown, the player has currently placed a $200 bet with two white chips respectively having a value of $100. In accordance with this example implementation, movement of the active chips 806 onto the betting area 802 constitutes a player game move locking in the corresponding bet. In this regard, the interface component 602 can receive user game move input via the holographic display device indicating the player has moved the active chips 806 onto the betting area 802. The interface component 602 can further control generation and adaptation of the holographic elements of the player user interface 800 based on user interaction with the holographic elements. In some implementations, if the player loses the bet, the player user interface 800 can remove the active chips 806 from the betting area 802 by causing them to vanish, fade away, blow up, or the like.

In some embodiments, the player user interface 800 can also include various additional 3D holographic controls and/or 2D holographic controls for receiving player input commands corresponding to different player game moves. For example, in some implementations, one or more holographic feature of player user interface 800 can be combined with one or more 2D graphical elements of player user interface 700. Additionally, or alternatively, the player user interface 800 (and/or the interface component 602) can be configured to receive and interpret defined gesture input commands corresponding to defined game moves (e.g., tapping once for hit, tapping twice for double down, waving for stay, etc.) and/or voice input commands corresponding to defined game moves via the player user interface 800.

With reference to FIGS. 5-8, in addition to the feature and functionalities of the player user interfaces discussed above, the player interface component 602 can also incorporate various other features and functionalities into the player user interface that improve the gaming experience. In some embodiments, the player interface component 602 can adapt the appearance or look and feel of one or more graphical and/or holographic elements of the player user interface based on user interaction with them. For example, the player interface component 602 can change the color and/or size of a graphical/holographic element, change the position of a graphical/holographic element, cause a graphical/holographical element to change in shape, cause a graphical/holographical element to flash, cause a graphical/holographical element to disappear, and the like. In some implementations, the player interface component 602 can change the appearance or look and feel of a player game move control to indicate selection of the game move control. The player device 110 and/or the player display device 112 can also include audio hardware and software configured to provide different sound effects to indicate selection and/or interaction with one or more graphical/holographical elements of the player user interface.

The player interface component 602 can also change the appearance or look and feel of the player user interface to indicate a current player game position. In this regard, the player interface component 602 can change the color, size, flashing state, etc., of one or more elements of the player user interface to signal different game positions. For example, as applied to Blackjack and player user interface 700, the player interface component 602 can change the background color of the active game player display area 702 to a first color to indicate the player's current position is pending, a second color to indicate a Blackjack, a third color to indicate a win, a third color to indicate a loss, a fourth color to indicate a bust, a fifth color to indicate a push, and the like. In another example, the player interface component 602 can cause one or more areas of the player user interface to light up or flash different colors to indicate a Blackjack or a win. The player interface component 602 can similarly change the appearance of one or more elements or areas of the player user interface to indicate selection of different game moves. For example, as applied to Blackjack and player user interface 700, the player interface component 602 can change the background color of the active game player display area 702 and/or the game control area 706 to a first color to indicate that the player has chosen to hit, a second color to indicate when the player has chosen to stay, a third color to indicate when the player has chosen split, a fourth color to indicate when the player has chosen to double, and the like. The player device 110 and/or the player display device 112 can also include audio hardware and software configured to provide different sound effects to indicate different player game positions and/or game moves.

The player interface component 602 can also change the appearance or look and feel of the player user interface to indicate a player's rating or status. In this regard, the player interface component 602 can tailor the appearance of the player user interface for different player ratings. For example, assume the player rating system assign players on of three different ratings or status levels, including a silver rating for lowest rated player, a gold status for a higher rated player, and a platinum status for a highest rated player. In accordance with this example, the player interface component 602 can render one or more areas of the player user interface (e.g., the entire background color of the player user interface 700, the background color or the player identifier area 704, or the like) in a first color to indicate player has a silver rating, in a second color to indicate the player has a gold rating, and a third color to indicate the player has a platinum rating. This feature provides fun way to for players to visually signal/advertise their player rating to other players at the game table as well as observers and passers-by. In some embodiments, this feature can be a setting associated with the player account that can be enabled or disabled at the player's discretion (e.g., using the account management component 314 and/or the account control component 618).

In some implementations, the player interface component 602 can also signal table betting minimums and/or maximums using a visual indicator displayed at one or more of the player devices. For example, the player interface component 602 can use different background or frame colors for the player user interfaces to indicate table betting minimum (e.g., blue for a $5 minimum, green for a $25 minimum, yellow for a $100 minimum, and so one). In accordance with this example, the player interface component 602 (and/or the dealer control module 120 or another management component for the game table 106) can cause the background or frame color of all (or one or more) of the player user interfaces at a game table to be a same color to indicate the current betting minimum at the table.

The various features of the player user interfaces described above provide a more entertaining, interactive, stimulating, and sensory experience for each individual player at the game table 106 relative to traditional casino gaming table systems. In addition, by visually displaying game information indicating current player moves and positions, player ratings, game status and the like, respective players at the game table can more easily follow the positions and the moves of the other players table, making the entire game a more interactive and fun gaming experience for all the player at the game table 106. Further, with dynamic player user interfaces lighting up and changing colors signaling the activity at the game table 106, passers-by and observers around the game table are better able to view and hear the status, progression and excitement at the game table from afar. In this regard, as potential players tour the casino floor, the adaptive player user interfaces can provide them with a clear understanding of the activity and players at the game table 106 while the exciting colors and sounds entice them to join this new sensory table gaming experience.

The example player user interfaces shown in FIGS. 7 and 8 demonstrate player user interfaces that can be generated by the player interface component 602 in association with an active game session at a player device $110_k$. The term "active game session" is used herein to refer to active usage of a player device $110_k$ (or a remote player device as discussed infra) by a player $114_k$ to play a table game at the game table 106 with a live dealer 103 in association with loading and/or access of the player account for the player at the player device $110_k$. For example, in one or more embodiments, to begin playing a table game at a game table 106 using a player device $110_k$ that the player has selected to use to play the game, the player $114_k$ first accesses and/or links their player account to the device $112_k$ the player has selected to use to play the game. As described above with reference to system 300 and security component 304, various mechanisms can be used to securely accomplish this task (e.g., entry of a username/account name linked to the player account, entry of a secret password, passcode, PIN, etc. linked to the player account, provision of physical of a player card linked to the player's account, provision of an electronic version of the player card linked to the player account, and/or provision of one or more biometric identifiers linked to the player account).

In some embodiments, the player control module 122 can include player account access component 604 to control player account access and usage at a player device $110_k$ (and/or a remote player device as discussed infra) for playing the table game at the game table 106. For example, using the player device $110_k$ (and/or the player user interface and/or the capture device $502_k$) a player can submit a request (referred to herein as a "play request") to play the table game in association with provision of at least one identifier for the player and/or the player account. For example, in some implementations, the play request can be generated in response to user entry (e.g., at the player device $110_k$) of a username/account name linked to the player account, entry of a secret password, passcode, PIN, etc. linked to the player account, provision of physical of a player card linked to the player's account, provision of an electronic version of the player card linked to the player account, and/or provision of one or more biometric identifiers linked to the player account. In this regard, the play request can include at least one identifier for the player and/or the player account (e.g., the player's username/account name, the player's password, passcode, PIN, etc., the players account information linked to the player's physical and/or virtual player card, and/or one or more biometric identifiers for the player). In various embodiments, the player interface component 602 can generate and present a log-in user interface or an otherwise inactive version of the player user interface at the player device $110_k$ that facilitates entry of the one or more identifies and generation of the play request.

The player account access component 606 can further include an authorization component 606 that can perform an authorization/verification procedure using the accounting system 130 and the security component 304 based on reception of the play request. In particular, the authorization component 606 can access the player account data 132 and employ the security component 304 to determine whether the player is authorized to use the player device to play the table game based on whether the player has a player account with the accounting system 130, whether the player has provided the correct access information for accessing their player account (e.g., the correct username/password, the correct PIN, the correct biometric identifiers), and/or whether the player is authorized to use the player account to play the table game based on one or more access and/or usage restrictions associated with the player account.

For example, in one or more embodiments, the authorization component 606 can access the player account data 132 and determine, based on the one or more identifiers received with the play request, whether the player has a player account with the accounting system 130. In some embodiments, based on a determination that the player has a player account with the accounting system 130, the authorization component 606 can authorize the play request. The player account access component 604 can further deny the play request based on a determination that the player does not have a player account with the accounting system. In this regard, the disclosed table gaming systems can restrict playing table games (and optionally other types of games such as slot machines or the like) at one or more game tables such as game table 106, to using a player device $110_k$ (or a remote player device as discussed infra) and a player account. With these embodiments, a player will not be able to play a table game at a game table 106 unless the player has a player account.

Additionally, or alternatively, prior to authorizing the play request, the authorization component 606 can also employ the security component 304 and/or the account access and/or usage information associated with player account to verify the player's identity and/or determine whether any account usage restrictions are defined for the player account that should prevent authorization of the request. For example, in some implementations, the authorization component 606 can verify the player's identity based on reception of the correct username/password, the correct PIN and/or the correct biometric identifier(s) linked to the player's account. The authorization component 606 can also determine whether any account access/usage restrictions are applicable that prevent authorization of the play request (e.g., based on game type, timing of play, player account rating, player available balance, amount won, amount lost, loss rate, win rate, etc.). With these embodiments, the authorization component 606 can authorize the play request based on verification of the player's identity and/or a determination that no account access/usage restrictions apply.

As described above with reference to system 300 and the account management component 314, in some embodiments, the account access/usage restrictions can be set/defined by the player. Additionally, or alternatively, one or more account usage/access restrictions can be defined by the gaming system (e.g., by a gaming system administrator, the "house", or the like). For example, the gaming system can define usage restrictions that control player account usage for playing games based on tracked player activity and game play context. For instance, the gaming system can define usage restrictions that control player account usage for playing games based on player rating and game type, player rating and one or more game context factors of the game, based on player rating status and betting minimums/maximums, based on player rating and timing of play, based on player account balance and the like. Thus, in some embodiments, the gaming system can set usage restrictions that restrict what games a player can play and/or when the player can play certain games based on their player rating and/or one or more contextual factors associated with the game table. In accordance with these embodiments, information regarding gaming system defined account usage restrictions can be stored with the player account data 132 and/or in another accessible database used by the authorization component 604 to control authorization of a receive play request. The authorization component 606 can further determine whether a gaming system defined account usage restriction applies for a received play request based on information associated with the player account (e.g., regarding player rating, player activity/history, and the like), and a current context of the table game, and grant or deny the play request accordingly.

In one or more embodiments, based on authorization of a received play request, the player account loading component 608 can access and/or load the player's account information at the player device 110k. For example, the player account loading component 608 can load relevant player account information for playing the game and displaying via the player user interface, including information regarding the players available balance in their player account (e.g., amount of money/virtual chips the player has in their account for playing the table game), information regarding the player identity, information regarding their player rating, information regarding their gaming activity history (e.g., tracked gaming activity information for the player), and the like. The interface component 602 can further activate the player user interface for playing the table game and initiate the active game session for the player based on authorization of the play request. For example, based on authorization of the play request, the player interface component 602 can generate and display player user interface 700, player user interface 800, or a similar player user interface that provides one or more game controls for playing the table game by the player 114$_k$. The player can then begin playing the game using the player user interface and placing bets using the virtual chips (and/or money or another currency) available in their player account/available balance.

The player control component 616 can provide various software components that execute the underlying functions for the corresponding player control features and functionalities presented via the player user interface. For example, the player control component 616 can receive player input commands entered via the player user interface that control player game moves in association with playing a table game at a game table 106. The player control component 616 can further control the progression of the game for the player based on the player game moves. In the embodiment shown, the player control component 616 can include account control component 618, betting control component 620 and move control component 622.

In some embodiments, the account control component 618 can provide same or similar features and functionalities as the account management component 314 yet at the player device 110$_k$ in association with an active game session. With these embodiments, after a player has securely logged-into and/or otherwise accessed and/or loaded their player account at the player device 110$_k$, the account control component 618 can allow a player to access and manage their player account information at the player device 110$_k$ via the player user interface. For example, the account control component 618 can provide for viewing and changing account access settings, viewing and changing account usage restrictions, viewing and changing player user interface display settings (e.g., display player rating enabled/disabled, etc.), and the like. The account control component 618 can also provide allow a player to view and manage player account reward or finance information at the player device 110$_k$ in association with an active game session. For example, the player account control component 618 can allow a player to view their available balance in their player account, control withdrawals from their available balance in their player account for usage at the player device 110$_k$ for betting, control withdrawals from a linked financial account (e.g., held at one or more player financial account systems 320) for transfer of funds to their player account, and the like.

In embodiments in which the table game involves betting, the betting control component 620 can control player betting in association with the active game session. For example, the betting control component 620 can receive player input via the player user interface requesting an amount of virtual chips, points, and/or money/funds (or another currency) a player has selected to bet on each game round. The betting control component 620 can further lock in player bets and communicate with the player reward management component 610 to facilitate secure transfer of funds to and from the player account based on the locked in bet.

In various embodiments, the betting control component 620 can control the amount/value of a bet the player can place on each round based on the amount virtual chips, points, money/funds (or another currency) the player has available in their player's account. For example, the betting control component 620 can only authorize placement of bets using some or all of the virtual chips, points, money/funds, etc. a player has available in their player's account. In some implementations, once the amount of virtual chips, points, money/funds, etc., available in the player's account has dropped to less than the betting minimum at the table, the betting control component 616 can prevent the player from placing any additional bets and playing the table game. The betting control component 620 and/or the player interface component 602 can further present the player with a prompt asking the player if they would like to purchase additional virtual chips, points, etc., and/or transfer additional money/funds into their player account from a linked financial account. The betting control component 620 can also control the amount/value a player can bet on each round based on any account usage restrictions associated with the player and/or the player account, the table betting minimum and/or maximum, the game rules and the like.

In some embodiments, the betting control component 620 can also control timing for placing bets. For example, the betting control component 620 can restrict an amount of time a player has to place a bet during each game round. With these implementations, the betting control component 620 can activate and/or monitor a betting timer that clocks a duration of time the player has to make a bet on each game round. In some implementations, this betting timer can be initiated/activated in response to dealer input received from the dealer control module 120. For example, in some implementations, the betting timer can be initiated in response to selection of the player for their "turn" (as discussed in greater detail infra). The betting control component 620 can further prevent a player from placing a bet after betting timer has expired. In some implementations, the player interface component 602 can also temporarily deactivate one or more betting functionalities of the player user interface in response to expiration of the betting timer. For example, with reference to FIG. 7 and player interface 700, the player interface component 602 can deactivate the ability for the player to select the "BET" control to place and lock-in a bet. In another example with reference to FIG. 8, in response to expiration of the betting timer, and player interface 800, the player interface component 602 can prevent the player from being able to move one or more of the holographic chips 804 onto the betting area 802 and/or to remove one or more of the active chips 806 from betting area.

The move control component 622 can control additional player game moves (e.g., in addition to betting) based on their received input via the player user interface. In various embodiments, the move control component 622 can communicate player game moves to the dealer control module 120. The dealer control module 120 can further manage and control progression of the game by based on their received game moves. In some embodiments, the betting timer can also be or correspond to a game move timer that restricts the amount of time a player has to make their game moves during each round as well. With these embodiments, the move control component 622 can activate and/or monitor the time and prevent the player from entering a game move after the timer has expired.

The player reward management component 610 can facilitates rewarding and/or penalizing a player based on the results of each round of a table game played at the game table 106. In this regard, the reward management component 610 can control providing a player with a reward for a game win event and/or penalizing the player with removal of the reward based on a game loss event. In the embodiment shown, the player reward management component 610 can include a player win/loss tracking component 612 and a player reward transfer component 614.

In one or more embodiments, the player win/loss tracking component 612 can track player reward winnings and losses in association with an active game session at a game table 106. In this regard, the player win/loss tracking component 612 can track information regarding an amount of points, virtual coins, money/funds, etc., the player has won and/or lost over the course of the active game session. For example, in some embodiments in which the game involves betting an amount of points, virtual chips, money/funds, etc., on each game round, the player win/loss tracking component 612 can track how much the player wins or loses on each round. In this regard, the player win/loss tracking component 612 can determine or receive information (e.g., from the dealer control module 120) indicating whether the player wins or loses a round, and determine or receive (e.g., from the dealer control module 120) information indicating the amount of points, virtual chips, money/funds, the player wins or loses based on the value of the bet placed as entered/received via the player user interface. The player win/loss tracking component 612 can further keep a running tally of the amount of points, virtual chips, money/funds, etc., won by the player and/or the amount lost over the course of the game. In some implementations, the player interface component 602 can further display tracked information regarding the amount of points, virtual chips, money/funds, etc., won by the player and/or the amount lost over the course of the game.

In some embodiments in which the game betting involves using available points, virtual chips, money/funds, etc., in their player's account, the player win/loss tracking component 612 can subtract loss amounts from the player's account balance information and add win amounts to the player's account balance information. In this regard, the player win/loss tracking component 612 can generate updated available balance information indicating the total amount of available points, virtual chips, money/funds, etc., in their player's account after each round. In some implementations, the player interface component 602 can further displayed the updated balance information in the player user interface.

In one or more embodiments in the game involves betting, the player reward transfer component 614 can facilitate transferring player game winnings (e.g., points, virtual coins, money/funds, etc.) from the dealer's account to the player's account. For example, in some implementations, based on a determination that the player has won a game round, the player reward transfer component 614 can transfer an amount of points, virtual coins, money/funds, etc. corresponding to the value of the player's bet from the dealer's account (included in the dealer account data 134) to the player's account (included in the player account data). Additionally, or alternatively, the player reward transfer component 614 can determine a total amount won by the player during the active game session in association with ending the game (e.g., based on player input requesting to cash-out or the like), and transfer the total amount won by the player from the dealer's account to the player's account at this time.

In some embodiments, the player reward transfer component 614 can also facilitate transferring player game loses (e.g., points, virtual coins, money/funds, etc.) from the player's account to the dealer's account. For example, in some implementations, based on a determination that the player has lost a game round, the player reward transfer component 614 can transfer an amount of points, virtual coins, money/funds, etc. corresponding to the value of the player's bet from the player's account to the dealer's account. Additionally, or alternatively, the player reward transfer component 614 can determine a total amount lost by the player during the active game session in association with ending the game (e.g., based on player input requesting to cash-out or the like), and transfer the total amount lost by the player from the player's account to the dealer's account at this time.

In some embodiments, the player reward management component 610 and/or the account control component 618 can further provide for transferring any game winnings added to a player's account in association with playing the game at the game table 106 from their player account to one or more linked financial accounts. For example, in some implementations, in association with ending the game or closing out, the account control component 618 can allow a player to request (e.g., via the player user interface) to transfer/deposit their account balance and/or a portion of their account balance to one or more linked financial accounts. In this regard, in response to reception of the request transfer/deposit their account balance and/or the portion of their account balance, the player control module 122 can communicate with the accounting system 130 and direct the deposit component 312 to deposit/transfer the funds accordingly.

The player control module 122 can also include a player game management component 624 that facilitates tracking and managing the game at the player device $110_k$. In this regard, player game management component 624 can track information regarding progression of the game in association with the active game session, including player game moves and/or positions, player game bets, dealer game moves/positions and the like. In various embodiments, the player game management component 624 can receive information regarding dealer game moves and/or position from the dealer module 122. The player game management component 624 can also track player gaming performance and activity information regarding, player wins and losses (e.g., amount won, amount lost, win rate, los rate, etc.), timing of initiation of game play, duration of game play, timing for performance of game moves (e.g., response time to place game moves and/or make bets on each round), average betting amounts (e.g., per round, pe hour, etc.), and the like. In some embodiments, information tracked by the player game management component 624 can be presented to the player at the player user interface in association with the active game session. The interface component 602 can also use the tracked information to update the player user interface in real-time (e.g., to update the information displayed in the active game player display area 702). The player game management component 624 can further communicate the tracked information to the dealer control module 120 and/or another device (e.g., the master game control device 1602 as discussed infra with reference to FIG. 16) in real-time. Information tracked by the player game management component 624 can also be associated with the player's account and accessed by the player in association with access of their player account at times other than active game play (e.g., using the user device 322 and/or another device).

The player control module 122 can also include a player review component 626 that facilities receiving player feedback regarding the dealer and/or the active game session at the player device $110_k$. In some embodiments, the player review component 626 can allow a player to provide feedback rating the dealer based on one or more criterion, such as but not limited to: performance ability, professionalism, friendliness, sportsmanship, humor, engagement level, personability, and the like. For example, in some implementations, as described with reference to player user interface 700 and the dealer section 712, the player review component 626 can allow the player to rate the dealer in general on a five star level, with five stars being the highest and one star being the lowest. With these implementations, the player provided dealer rating can represent a subjective review of the player's interpretation of the dealer's performance ability, professionalism, friendliness, humor, engagement level, personability, and the like. In other embodiments, the player review component 626 can allow the player to provide separate ratings for the dealer for each of the different criterion. In some embodiments, the interface component 602 can present the player with a dealer review prompt to review/rate the dealer at the player user interface at the end of the game (e.g., in response to the player choosing to end the game or close-out).

Additionally, or alternatively, the player review component 626 can facilitate reviewing the dealer by the player at a future point in time following the game in association with access of their player account using the user device 322 (or another device). With these embodiments, information regarding the dealer's identity of a past game can further be tracked and associated with the player's account with their gaming history/activity information. The account management component 314 can further allow the player to view their historical gaming activity and rate/review past dealers they have played with.

Figure 9:
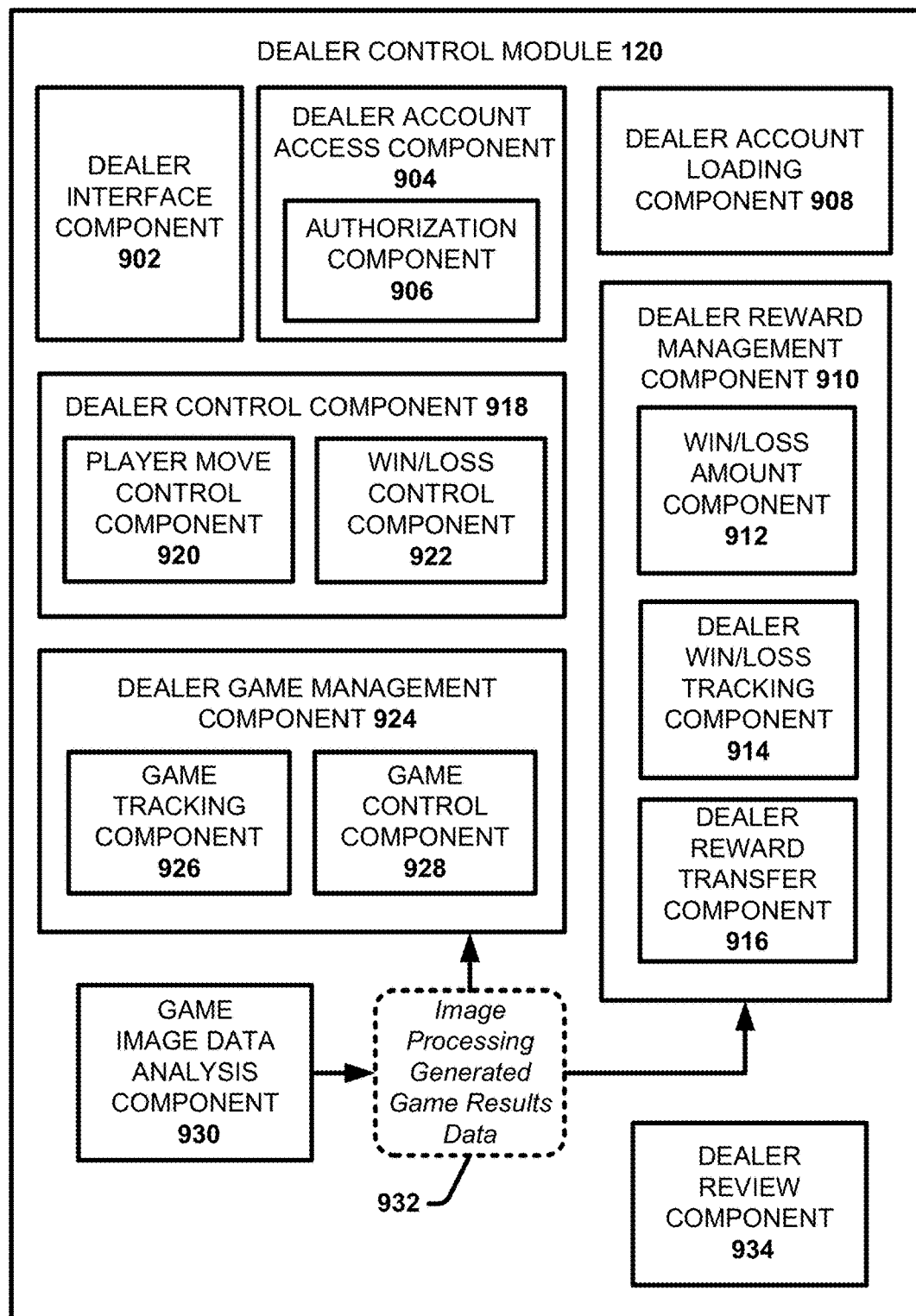
FIG. 9 presents an example dealer control module in accordance with one or more embodiments of the disclosed subject matter.

FIG. 9 presents an example dealer control module in accordance with one or more embodiments of the disclosed subject matter. In some embodiments, the dealer control module 120 can be deployed at the dealer device 102 and accessed by a dealer 103 in association with usage of the dealer device 102, as described with reference to table game system 200. In other embodiments, the dealer control module 120 can be deployed at a game control device 118 communicatively and operatively coupled to the dealer device 102 and the respective player devices $110_{1-k}$, as described with reference to table game system 100. Still in other embodiments, one or more components of the dealer control module 120 can be distributed between the game control device 118, the dealer device 102 and/or one or more additional systems/devices (e.g., accounting system 130, master game control device 1602, and the like). Repetitive description of like elements employed in respective embodiments is omitted for sake of brevity.

The dealer control module 120 can include various computer executable components that provide different dealer/house side game control and management features and functionalities associated with the disclosed table game systems. In the embodiment shown, these computer executable component include (but are not limited to), dealer user interface component 902, dealer account access component 904, dealer account loading component 908, dealer reward management component 910, dealer control component 918, dealer game management component 924, game image data analysis component 930, and dealer review component 932.

With reference to FIGS. 5 and 9, in one or more embodiments, the dealer user interface component 902 can control the dealer user interface displayed at the dealer device 102 via the dealer display device 104 and receive user input via the dealer user interface. In this regard, the dealer user interface component 902 can generate and/or present the dealer user interface at the dealer device 102, control the appearance of the dealer user interface, receive and interpret dealer input entered via the dealer user interface, control adapting the dealer user interface based on progression of the game, and the like.

In various embodiments, the dealer user interface 102 can present the dealer with real-time game information regarding player game moves/positions, player bets, player activity, dealer game moves/position and the like. The dealer 103 can further use the displayed information to facilitate managing and playing the game at the game table 106. For example, in one or more embodiments, the dealer control module 120 can receive player game move information for the respective players $114_{1-k}$ in real-time over the course of an active game session in association with usage of their player user interfaces as displayed at their player devices $110_{1-k}$. In this regard, the respective player devices $110_{1-k}$ (and/or the respective PCMs $122_{1-k}$ associated therewith) can communicate player game moves received at the player devices $110_{1-k}$ to the dealer control module 120 in response to reception off the player game moves at the respective player devices $110_{1-k}$. The player game move information can include for example, (but is not limited to), information regarding placed bets, bet amounts, and/or selected game moves. The dealer user interface component 102 can further present the player game move information to the dealer 103 via the dealer user interface.

In some embodiments, the dealer user interface can further provide one or more interactive game controls that can be used by the dealer to control playing the table game at the game table 106. For example, in some embodiments, the one or more interactive controls can include controls that can be used by the dealer to control progression of the game, to control entry of player game moves, to control entry of player game positions (e.g., declaring player wins and losses), to control distribution of player game winnings, to control collection of player game losses, to control player's turns, and the like. With these embodiments, the dealer control component 918 can provide one or more software components that execute the underlying functions for the corresponding to the dealer control features and functionalities provided by the dealer user interface.

Figure 10:
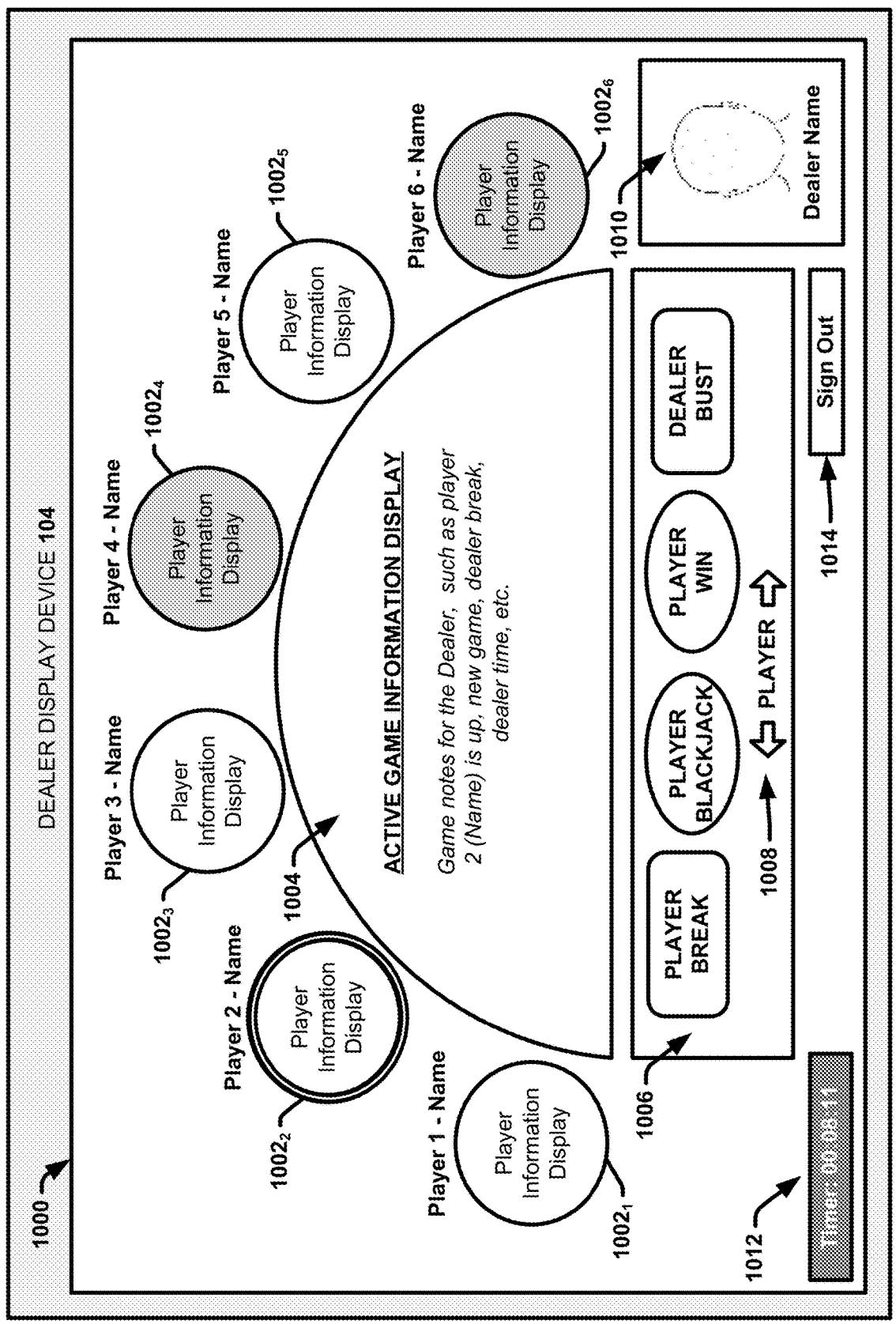
FIG. 10 presents an example dealer user interface that facilitates playing a device operated table game in accordance with one or more embodiments of the disclosed subject matter.

In this regard, FIG. 10 presents an example dealer user interface 1000 that facilitates playing a device operated table game in accordance with one or more embodiments of the disclosed subject matter. With this example embodiment, the dealer display device 104 can include a 2D display device configured to display the dealer user interface 1000 as a 2D GUI. Additionally, or alternatively, the dealer user interface 1000 (and additional dealer user interfaces described herein) can include a holographic user interface and/or one or more holographic elements. Various features and functionalities of the dealer use interface 100 are exemplified as applied to the game of Blackjack. However, it should be appreciated that various features and functionalities of the dealer user interface can be applied to other types of table games. Repetitive description of like elements employed in respective embodiments is omitted for sake of brevity.

With reference to FIGS. 9 and 10, the dealer user interface 1000 includes various graphical elements and relevant game information that can be presented to a dealer 103 via the dealer display device 104 in association with an active game session between the dealer 103 and at least one player at a player device $110_k$ (and/or a remote player device as discussed infra). In the embodiment shown, the dealer user interface 1000 can include respective player information display elements $1002_{1-6}$ for each potential player that can display relevant game information for each active player. The dealer user interface component 602 can further visually distinguish the player information display elements for active players and inactive players (e.g., available seats/player devices 110 that are not in use). For example, in the embodiment shown, the player information display elements $1002_4$ and $1002_6$ are greyed out to indicate that the player devices 110 for the corresponding player position is not in use. The dealer user interface 1000 can also include an active game information display area 1004 that can display additional active game information for the dealer. For example, the active game information display area 1004 can include information regarding current player game moves/position, and/or current dealer game moves/position. In some implementations in which the game involves players taking turns, the active game information display area 1004 that can also display information identifying whose turn it is.

In the embodiment shown, the number of player information display elements $1002_{1-6}$ are based on the maximum number of players $114_{1-k}$ that can play the table game at a time, which in this example embodiment is six. In various embodiments, the number of player information display elements $1002_{1-6}$ can correspond to the number of player devices $110_{1-k}$ at the game table 106. In the embodiment shown, the player information display elements $1002_{1-6}$ are arranged about the dealer user interface in positions relative to the active game information display area 1004 corresponding to the actual positions of the corresponding player devices $110_{1-k}$ at the game table 106. The active game information display area 1004 can further have a shape that resembles the shape of the game table 106. For example, in the embodiment shown, the active game information display area 1004 has the shape of a Blackjack table and the positions of the respective player information display elements $1002_{1-6}$ can correspond to the actual positions of the respective players $114_{1-k}$ at (or player devices 110) at the Blackjack table.

In various embodiments, the information displayed in a player information display element 1002 can identify the player's current game move(s) and/or current game position. For instance, as applied to the game of Blackjack, the information displayed in a player information display element 1002 can indicate whether the player has chosen to hit, whether the player has chosen to stay, whether the player has chosen to split, whether the player has chosen to double, and the like. In some implementations, the player game move information can also identify or indicate an amount of a bet placed by the player. As described above, in various embodiments, the players' current game move information can be received at the dealer control module 120 from the respective player devices (and/or the associated player control modules 120) in association with usage of the player user interfaces displayed at the respective player devices $110_{1-k}$. As applied to the game of Blackjack, the player game position information displayed in a player information display element 1002 can indicate whether the player's current position is pending (e.g., which can be the default position until the results of the round are determined), Blackjack, win, loss, bust, push, or the like.

In one or more embodiments, player position information can be generated at the dealer control module 120 based on dealer interaction with one or more interactive dealer controls included in the dealer user interface 1000. For example, the dealer user interface 1000 can include a game control area 1006 that includes various graphical controls that can be used by the dealer 103 to control the game at the game table. In the embodiment shown, these controls are tailored to the game of Blackjack, and include controls for the dealer to select and enter a resulting player position as determined by the dealer 103 based on manual observation of the dealer's cards and the player's cards laid out on the game table. For example, the game controls in the game area 1006 include a control for "PLAYER BREAK," "PLAYER BLACKJACK," "PLAYER WIN, and "DEALER BUST." In accordance with these embodiments, the dealer 103 can determine and select the resulting player position (i.e., the defined winning or losing event that resulted) for each active player during each game round using the corresponding game controls displayed in the game control area 1006 (e.g., touch input technology, touchless input technology, gesture input technology, or another input technology). The dealer control module 120 can further communicate the dealer selected player positions to the respective players at their respective player device in real-time.

In various embodiments, based on selection of a resulting game position for the player, the dealer control module 120 (e.g., via the dealer reward management component 910) and/or the player control module (e.g., via the player reward management component 610) can automatically determine and control distribution of player game winnings and/or collection of player game losses (e.g., automatically determine and control payouts and collections). In some implementations, once each player's resulting game position has been determined and selected at the end of each game round, dealer control module 924 can reset that active players' positions to "pending", and the dealer/dealer control module 120 can start a new game round.

In some embodiments, the dealer game controls can include a player selection control 1008 via which the dealer can select a specific player's information display element 1002 in association with applying a resulting game position. Additionally, or alternatively, the respective, player information display elements $1002_{1-6}$ can be directly selectable via the dealer user interface 1000. A selected player information display element 1002 can further be visually distinguished/identified in the dealer user interface (e.g., using a different color, using highlighting, using flashing graphics, etc.). For example, in the embodiment shown, the player information display elements $1002_2$ is encircled with different/distinguishing border line to indicate that it is currently selected.

In some embodiments, in which the game being played at the game table 106 involves players taking turns, the dealer 103 can also control player turns via the dealer user interface and the player selection control 1008 and/or direct selection of a player information display element 1002 for the corresponding player. For example, as applied to the game of Blackjack, the dealer can select a player when it is their turn to provide game moves in association with the dealer dealing cards to that player. Additionally, or alternatively, after a player in turn has selected their current game move and/or the dealer has provided input (e.g., via the one or more dealer controls) for the player declaring their resulting game position (e.g., player break, player blackjack, player win, dealer bust, etc.), the dealer user interface component 902 can automatically move onto and select the next player for their turn. For example, in the embodiment shown, Player 2 is currently selected to indicate that it is currently player's 2 turn to provide a game move. After the player has provided their game move (e.g., via their player user interface) and/or after the dealer has selected a final game position for Player 2, the system can automatically select, highlight, etc., player 3 for their turn. In some implementations, one or more features and functionalities of the player user interface can be disabled (e.g., an ability to enter game moves) when it is not their turn (e.g., via the player user interface component 602).

The dealer user interface 1000 can also provide dealer identifier information 1010 that identifies the dealer and/or the dealer's account and/or provides various other types of information about dealer. For example, in the embodiment shown, the dealer identifier information 1010 can include a facial image of the dealer or an avatar the dealer has selected to represent the dealer The dealer identifier information can also include the dealer's name (or account name, username, etc.). The dealer user interface 1000 can also include a timer 1012 that can track game time information (e.g., time of active play of the dealer at the game table, a betting timer, a player turn timer, etc.). The dealer user interface 1000 can also include a "sign-out" control 1014 via which the dealer 104 can select to end their game session at the game table and/or otherwise log-out of their account at the game table 106.

In this regard, with reference to FIG. 9, in various embodiments, the dealer 103 can log-in to their dealer account (and/or the house account) at the player device 102 in association with activating a table game session at a game table 106 using the player device 102. In various embodiments, the dealer control module 120 can include dealer account access component 904 to facilitate accessing and loading a dealer account (and/or the house account) at the dealer device 102 using same or similar techniques described with reference to the player account access component 604. In this regard, the dealer account access component 904 can control dealer/house account access and usage by one or more dealers at a dealer device based on submission of an account access/usage request by the dealer at the dealer device 102 that includes one or more identifiers for the dealer and/or the dealer/house account (e.g., an account name/username, a password, a PIN, dealer card information, dealer biometric information, etc.). The dealer account access component 904 can also include an authorization component 906 that can perform an authorization/verification procedure based on the one or more identifiers using the accounting system 130 and the security component 304 before logging the dealer in and accessing the dealer/house account at the dealer device 102.

In this regard, the authorization component 906 can access the dealer account data 134 and employ the security component 304 to determine whether the dealer is authorized to use the dealer device 102 to activate and control/the table game based on whether the dealer has provided the correct access information for accessing the dealer/house account (e.g., the correct username/password, the correct PIN, the correct biometric identifiers). The dealer account loading component 908 can further access and/or load the dealer/house account information at the dealer device 102 based on authorization of a received dealer account access/usage request. In some embodiments, the dealer account access component 904 can also provide the dealer reward management component 910 access to respective player accounts for active players at the game table based on authorization of a received dealer account access/usage request at the dealer device 102.

The dealer interface component 902 and/or the dealer control component 918 can further activate one or more dealer game management and control features and functionalities of the dealer user interface based on authorization of a received dealer account access/usage request. In this regard, the dealer control component 916 can provide various software components that execute the underlying functions for the corresponding dealer control features and functionalities presented via the dialer user interface.

For instance, in the embodiment shown, the dealer control component 918 can include player move control component 920 to facilitate dealer control, via the dealer user interface, of when an active player can submit their player game moves via their player user interface over the course of an active game session. For example, in some implementations, the player move control component 920 allow the dealer to control player turns for submitting one or more game moves via selection of the respective players for their turns via the dealer user interface. In some implementations, the player move control component 920 can further control activating and deactivating one or more player move control functionalities of the player user interfaces for the active players based on play turns. For example, in some embodiments, one or more player move control functionalities of the player user interfaces for the active players can become activated only when the player's turn is up (e.g., as controlled by the dealer via the dealer user interface). With these embodiments, when a player has been selected for their turn, the player game move control component 920 can direct their corresponding player device/player user interface to activate one or more player move submission controls of the player user interface.

The player move control component 920 can also allow the dealer to control move submission time frames for submission of player moves via the dealer user interface as well. For example, with respect to betting, the player move control component 920 can allow the dealer to start and/or stop the betting time period via which one or more of the active player can submit bets via the their player user interfaces. In this regard, based on stopping and/or expiration of the betting period as controlled by the dealer via the dealer user interface (e.g., using betting timer control provided on the dealer user interface), the player move control component 920 can block or ignore reception of any additional bets for the current game round. In some implementations, the player move control component 920 can also direct the player interface components respectively associated with the player user interfaces to temporarily deactivate the betting control functionality of the player user interfaces in response to expiration of the betting timing. The player move control component 920 can further communicate activation/deactivation of the betting time period with the respective player devices $110_{1-k}$ (and/or their associated PCMs $1220_{1-k}$) used by the active players. In some implementation, the player user interface component 602 associated with the respective player devices $110_{1-k}$ can further display the betting timer via the player user interfaces.

The player move control component 920 can similarly allow the dealer to control player submission time frames for other game moves via the dealer user interface as well. For example, with respect to the game of Blackjack, the player move control component 920 can allow the dealer to start and/or stop a move submission time period via which an active player can submit game moves via the their player user interface, including a request to "hit," "stay," "split", "double", "match the dealer", and the like. In some implementations of these embodiments, based on stopping and/or expiration of the move submission timer (as controlled by the dealer via the dealer user interface) the player move control component 920 can assume the player has requested to "stay" and accept this as the default position. In some implementations, the player move control component 920 can also direct the player interface components respectively associated with the player user interfaces to temporarily deactivate the move control functionality at the player user interfaces in response to expiration of the move submission time frame. The player move control component 920 can further communicate activation/deactivation of the move submission time period with the respective player devices $110_{1-k}$ (and/or their associated PCMs $1220_{1-k}$) used by the active players. In some implementation, the player user interface component 602 associated with the respective player devices $110_{1-k}$ can further display the move submission timer via the player user interfaces.

The dealer control component 918 can also include a win/loss control component 920 that can control declaring and/or applying player game win and/or loss positions based on dealer input via the dealer user interface. In this regard, as described with reference to dealer user interface 1000, in some embodiments, the dealer can manually determine whether each player wins or loses a game round based on the results of the dealers interaction with the tangible game pieces a the game table and the player's selected game moves. For example, as applied to Blackjack, the dealer can determine, based on the cards the dealer has dealt to the player and the dealer's cards, whether the player breaks, hits Blackjack, wins, whether the dealer busts, and the like. The dealer can further select the applicable player game result/position at the completion of the round via the dealer user interface. The win/loss control component 920 can further receive the dealer selected player game result/position information for the player (i.e., the specific win or loss event that resulted for the player) and direct the dealer reward management component 910 and/or the player reward management component 610 to control rewarding or penalizing the player accordingly based on the player's bet amount and the game rules.

In this regard, the dealer reward management component 910 can provide same or similar features and functionalities as the player reward management component 610. For example, the dealer reward management component 910 can include a dealer win/loss tracking component 914 that can provide same or similar features and functionalities as the player win/loss tracking component 612. For instance, the dealer win/loss tracking component 914 can track player reward winnings and losses in association with an active game session at a game table 106. The dealer win/loss tracking component 914 can also track dealer reward winnings and losses in association with the active game session at the game table 106. The dealer reward management component 910 can include a dealer reward transfer component 916 that can provide same or similar features and functionalities as the player reward transfer component 914. For example, the dealer reward transfer component 916 can facilitate transferring player game winnings (e.g., points, virtual coins, money/funds, etc.) from the dealer's account to the player's account, and vice versa. In this regard, in some embodiments, the player reward management component 610 can be removed from the player control module 122 and the various features and functionalities of the player reward management component 610 described with reference to FIG. 6 can be performed by the dealer reward management component 910. Repetitive description of like elements employed in respective embodiments is omitted for sake of brevity.

The dealer reward management component 910 can also include a win/loss amount component 912 that can determine player win amounts and loss amounts for each game round based on the player's game moves performed for the game round, the game result/position of the player, and one or more defined game rules for the game that control reward and/or loss amounts. For example, with respect to games involving betting, the win/loss amount component 912 can determine the value of a player's placed bet based on the selected bet amount, the player's selected game move or moves (e.g., split, double, etc.), and one or more defined payout rules for defined winning game events. In some implementations, depending on the game, different winning game events can be associated with different payout rules. As described above, the win/loss amount component 912 can receive information identifying the player's bet amount and selected game move or moves from the player device 110 (e.g., and/or associated player control module 122) used by the player. The win/loss amount component 912 can further be preconfigured with game rule payout information for calculating the value of a bet based on defined payout rules for defined winning game events under defined game move contexts. In this regard, once a player's position/game result has been determined, the win/los amount component 912 can determine an amount of points, virtual coins, money/funds, etc., the player has won or lost based on the value of the player's bet. As described above, in some embodiments, information regarding a player's resulting game position can been determined by the dealer and received at the player module from the dealer via the dealer user interface. In other embodiments as described below, player win/loss events can be automatically determined by the dealer control module 120 based on analysis of image data captured of the game table.

The dealer control module 120 can also include a dealer game management component 924 that facilitates tracking, managing and automatically or semi-automatically controlling the progression of the game at the dealer device 102 and/or the one or more player devices 110$_{1-k}$. In the embodiment shown, the dealer game management component 924 can include game tracking component 926 and game control component 928.

In some embodiments, the game tracking component 926 can provide same or similar tracking features and functionalities described with reference to the player game management component 624. For example, the game tracking component 926 can track information regarding progression of the game in association with the active game session, including player game moves and/or positions, player game bets, dealer game moves/positions and the like. In this regard, the game tracking component 926 can track the overall progression of game based on information provided by the active players via their player user interfaces and the dealer as provided via the dealer user interface. The player interface component 602 and the dealer interface component 902 can further automatically update the respective user interface accordingly based on the tracked game progression information.

The game control component 928 can provide one or more automated or semi-automated game control functions that control progression of the game at the respective player user interfaces and/or the dealer user interface based on the tracked game information and one or more defined game rules. For example, in some embodiments as described above with reference to the player move control component 920, the dealer can control player turns and/or timing for provision of player game moves via the dealer user interface. Additionally, or alternatively, the game control component 928 can automatically control player turns and/or timing for provision of player games moves based on one or more defined game rules and/or defined game progression logic. For example, the game control component 928 can control activation and/or deactivation of one or more player controls of the respective player user interfaces based on defined turn progression rules, based on defined game move submission time frames, and the like. For instance, the game control component 928 can determine who's turn it is based on the received player input and/or dealer input, notify the player via their player user interface that it is their turn, start the player's game move submission time or timers, and the like. With these embodiments, the dealer interface component 902 can automatically update the dealer user interface to identify (e.g., highlight, encircle, etc.) what player is currently up (i.e., who's turn it is) as controlled by the game control component 928.

In some embodiments, the game tracking component 926 can also track player gaming performance and activity information regarding, player wins and losses (e.g., amount won, amount lost, win rate, los rate, etc.), timing of initiation of game play, duration of game play, timing for performance of game moves (e.g., response time to place game moves and/or make bets on each round), average betting amounts (e.g., per round, pe hour, etc.), and the like. In some implementations, the game tracking component 926 can further communicate the tracked player information to a master game control device 1602 in real-time, as discussed infra with reference to FIG. 16. Player information tracked by the game tracking component 926 can also be associated with the player's account and accessed by the player in association with access of their player account at times other than active game play (e.g., using the user device 322 and/or another device).

The game tracking component 926 can similarly track dealer gaming performance and activity information. For example, the dealer gaming and performance information can include information regarding dealer wins and losses (e.g., amount won, amount lost, win rate, los rate, etc.), timing of initiation of game play, duration of game play, timing for performance of game moves, and the like. The dealer gaming and performance information can also include performance metrics regarding dealer productivity. For example, the game tracking component 926 can track information regarding game turnover rate (e.g., number of rounds executed per hour, per gaming session at the game table, etc.), number of hands dealt per a defined time period, average number of active players at the dealer's game table per a defined time period (e.g., the active session, per hour, etc.) information regarding the active players (e.g., player identity, player rating, player average betting amounts, player demographics, etc.). In some implementations, the game tracking component 926 can further communicate the tracked dealer information to a master game control device 1602 in real-time, as discussed infra with reference to FIG. 16. In some implementations in which dealers have individual dealer accounts, the dealer information tracked by the game tracking component 926 can also be associated with the dealer's account and accessed by the dealer in association with access of their dealer account at times other than active game play (e.g., using the user device 322 and/or another device).

As described above, in some embodiments, the dealer can determine player game win and loss events based on manual observation of the one or more tangible game pieces at the game table and enter this information via the dealer user interface. Additionally, or alternatively, the game table system can include one or more cameras configured to capture images of the game table (e.g., video and/or still images) during the game, including images of the tangible game pieces that are controlled by the live dealer. With these embodiments, the dealer control module 120 can include a game image analysis component 930 that can employ image processing technology to process the image data and automatically determine player game wins and loss events based on the image data and one or more defined rules of the game.

Figure 11:
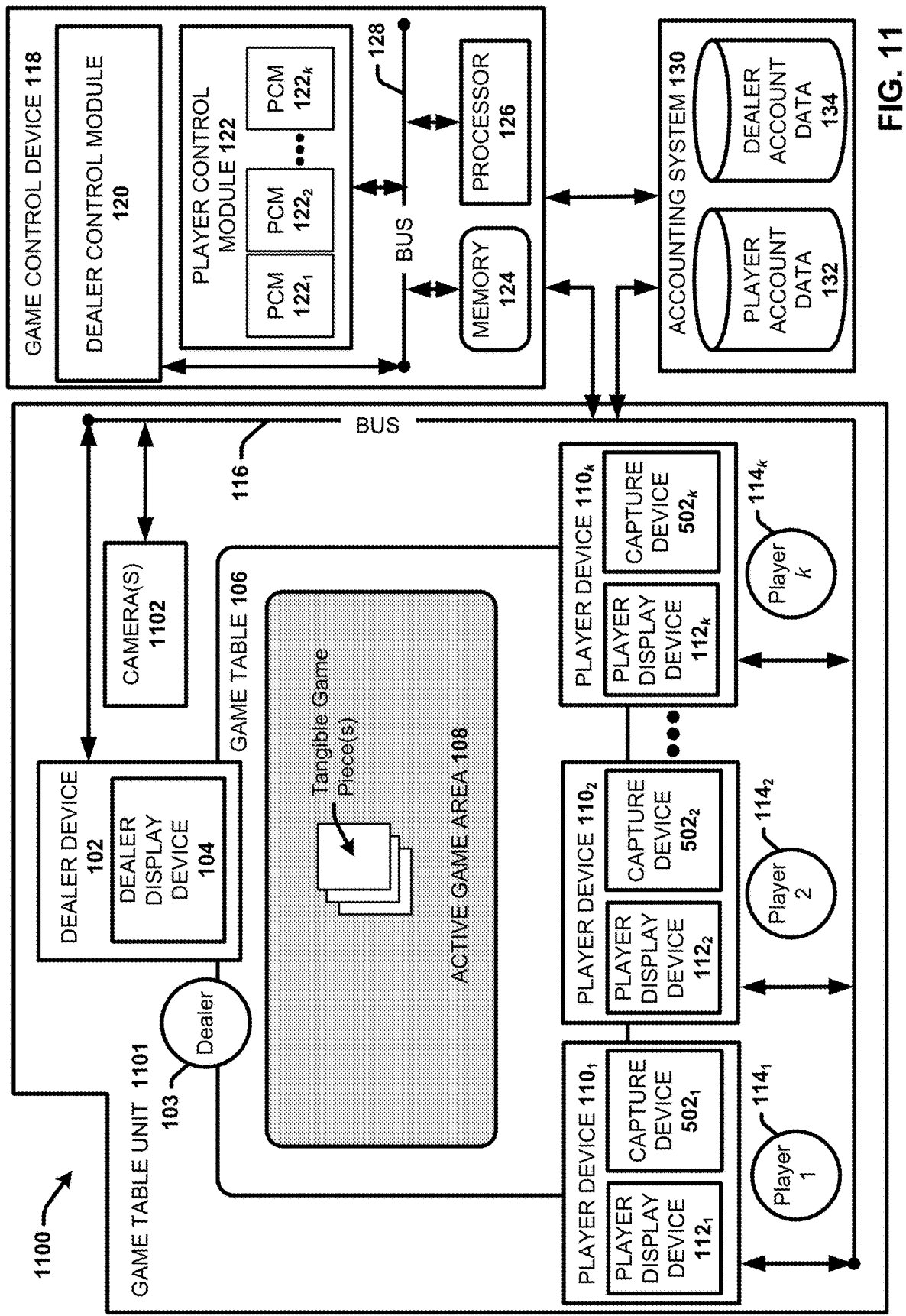
FIG. 11 illustrates a block diagram of another example, non-limiting, device operated table game system that integrates live dealer interaction with tangible game pieces in accordance with one or more embodiments of the disclosed subject matter.

In this regard, FIG. 11 illustrates a block diagram of another example, non-limiting, device operated table game system 1100 that integrates live dealer interaction with tangible game pieces in accordance with one or more embodiments of the disclosed subject matter. System 1100 includes same or similar features and functionalities as systems 500 with the addition of one or more cameras 1102 coupled to the game table unit 1101. For example, in the embodiment shown, the one or more cameras 1102 are connected to the system bus 116 and thus communicatively coupled to the dealer control module 120 at the game control device 120. However, the manner in which the one or more cameras are communicatively coupled to the dealer control module 120 and/or various other system devices/components can vary. For example, in some embodiments, the one or more cameras can be communicatively coupled to the dealer control modules 120 and/or one or more other devices/components/systems described herein via one or more wireless communication technologies/networks. In addition, the number, type and position of the one or more cameras can vary so long as at least one of the cameras provides an unobstructed view of the active game area 108 and the one or more tangible game pieces that that control the outcome of the game. Repetitive description of like elements employed in respective embodiments is omitted for sake of brevity.

With reference to FIGS. 9 and 11, in various embodiments, the one or more cameras 1102 can capture image data (e.g., still images and/or video) of the active game area 108 in association with playing the table game at the game table 106. For purposes of processing the image data to automatically determine the game results for each active player for each game round, the image data can include one or more images of the tangible game pieces in the active game area at the end of each round. This images data is referred to herein as "game results image data." For example, with respect to the game of Blackjack, the game results image data can depict the player's cards and the dealer's cards as dealt/laid down in the active game area 108. In another example with respect to roulette, the game results image data can depict the roulette wheel and the ball where it lands on the table on each turn.

In one or more embodiments, the game image data analysis component 930 can further receive and process the game results image data using one or more image processing techniques (e.g., object recognition, pattern recognition, etc.) and/or one or more machine learning techniques (e.g., one or more neural networks, one or more deep neural networks, etc.) to interpret the image data and/or determine or infer the actual game results reflected in the game results image data. In the embodiment shown, the information generated by the game image data analysis component 930 is referred to as image processing generated game results data 932. For example, in some implementations, with respect to Blackjack, the game image data analysis component 930 can be configured to read the player's cards and the dealer's cards depicted in the image data and automatically determine whether the player's cards beat the dealers cards (e.g., whether the player/dealer busts, whether the player breaks, whether the player/dealer hits Blackjack, etc.). In accordance with this example, the game image analysis component 930 can process employ image data processing to extract image feature information from the image data (e.g., feature vectors, one or more objects, one or more image patterns, etc.) and determine or infer the game results using one or more machine learning techniques based on defined or learned correlations in the feature information and defined winning game events and/or losing game events. In another example implementation as applied to roulette, the game image analysis component 930 can process the image data of the roulette wheel using object recognition, pattern recognition, text recognition, and the like to determine the color and number of the landing position of the roulette ball. The game image data analysis component 930 can further determine player win events and/or player loss events based on received player game move information (entered by the players via their player user interfaces) identifying their selected betting position or positions (numbers and/or colors) on the roulette layout.

In some implementations, the image processing generated game results data 932 can further be provided to the dealer game management component 924 to automatically control the progression of the game. Additionally, or alternatively, the dealer reward management component 910 can further automatically control/issue payouts and collections of game winning and/or game loss amounts between the player's account and dealer's account based on the game win/loss events represented in the image processing generated game results data 932. Additionally, or alternatively, the dealer interface component 902 can present the image processing generated game results data 932 to the dealer via the dealer user interface to facilitate the dealer in selecting the correct player game position/result via the player user interface.

The dealer control module 934 can also include a dealer review component 934 that facilities receiving dealer feedback regarding the players in a manner similar to the player review component 626. For example, in some embodiments, the dealer review component 934 can allow a dealer o provide feedback rating a player based on one or more criterion, such as but not limited to: performance ability, professionalism, friendliness, sportsmanship, humor, engagement level, personability, and the like. With these implementations, the dealer provided dealer rating can represent a subjective review of the dealer's interpretation of the player with respect to one or more criterion (e.g., performance ability, professionalism, friendliness, humor, engagement level, personability, and the like). In other embodiments, the dealer review component 934 can allow the player to provide separate ratings for the player for each of the different criterion. In various embodiments, player review information received from the dealer can be tracked and associated with the player's account. The account management component 314 can further allow the player to view their player review information.

Figure 12:
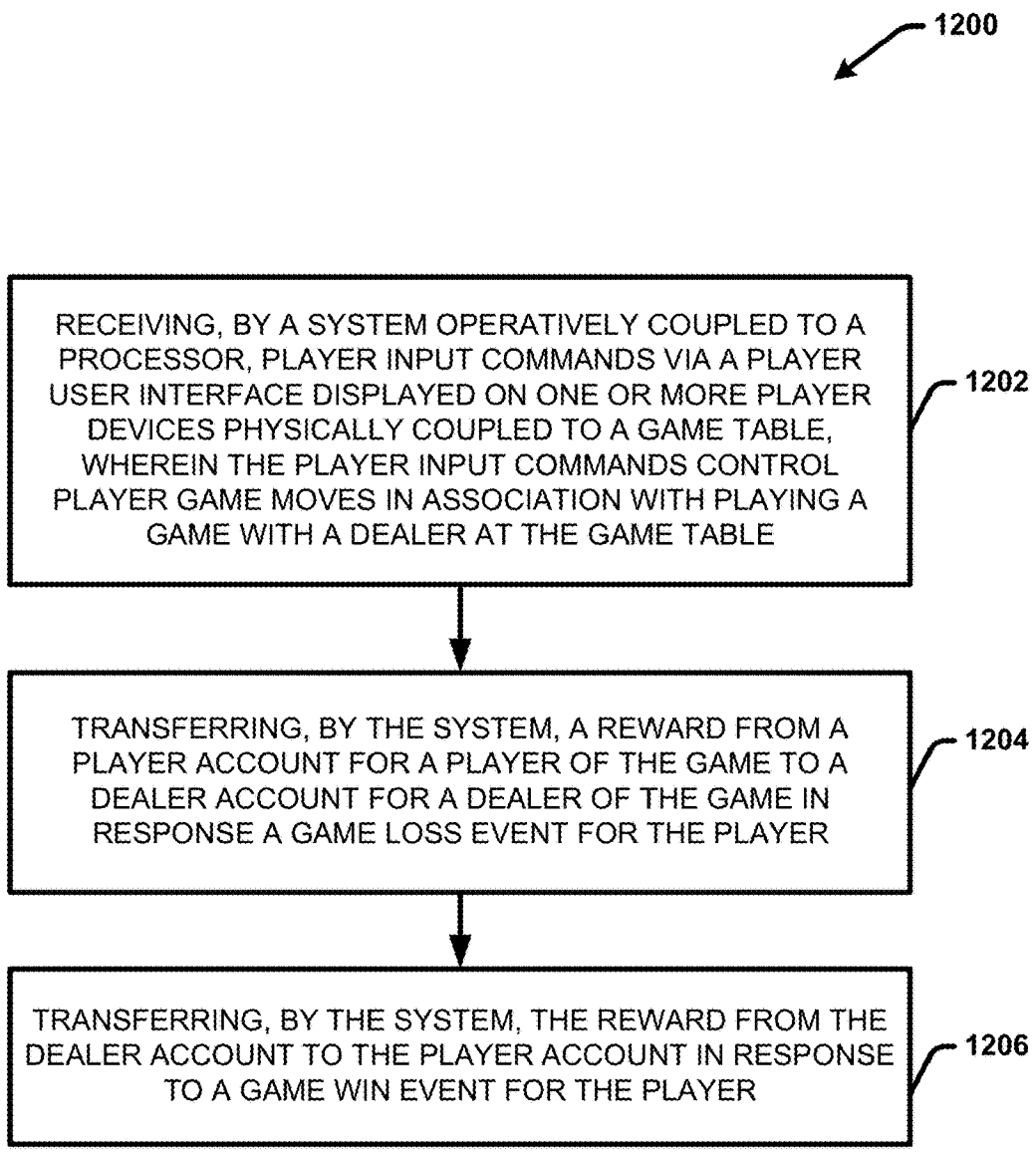
FIG. 12 presents a flow-diagram of an example, non-limiting, computer implemented method that facilitates playing a device operated table game integrating live dealer interaction with tangible game pieces in accordance with one or more embodiments of the disclosed subject matter.

FIG. 12 presents a flow-diagram of an example, non-limiting, computer implemented method 1200 that facilitates playing a device operated table game integrating live dealer interaction with tangible game pieces in accordance with one or more embodiments of the disclosed subject matter.

In accordance with method 1200, at 1202 a system operatively coupled to a processor (e.g., system 100, system 200, system 500, system 1100 and the like), can receive (e.g., via the player control module 122 and/or the dealer control module 120) player input commands via a player user interface displayed on one or more player devices physically coupled to a game table, wherein the player input commands control player game moves in association with playing a game with a dealer at the game table. At 1204, the system can transfer a reward from a player account for a player of the game to a dealer account for a dealer of the game in response a game loss event for the player (e.g., using the player reward transfer component 614 and/or the dealer reward transfer component 916). At 1206, the system can transfer, by the system, the reward from the dealer account to the player account in response to a game win event for the player (e.g., using the player reward transfer component 614 and/or the dealer reward transfer component 916).

Figure 13:
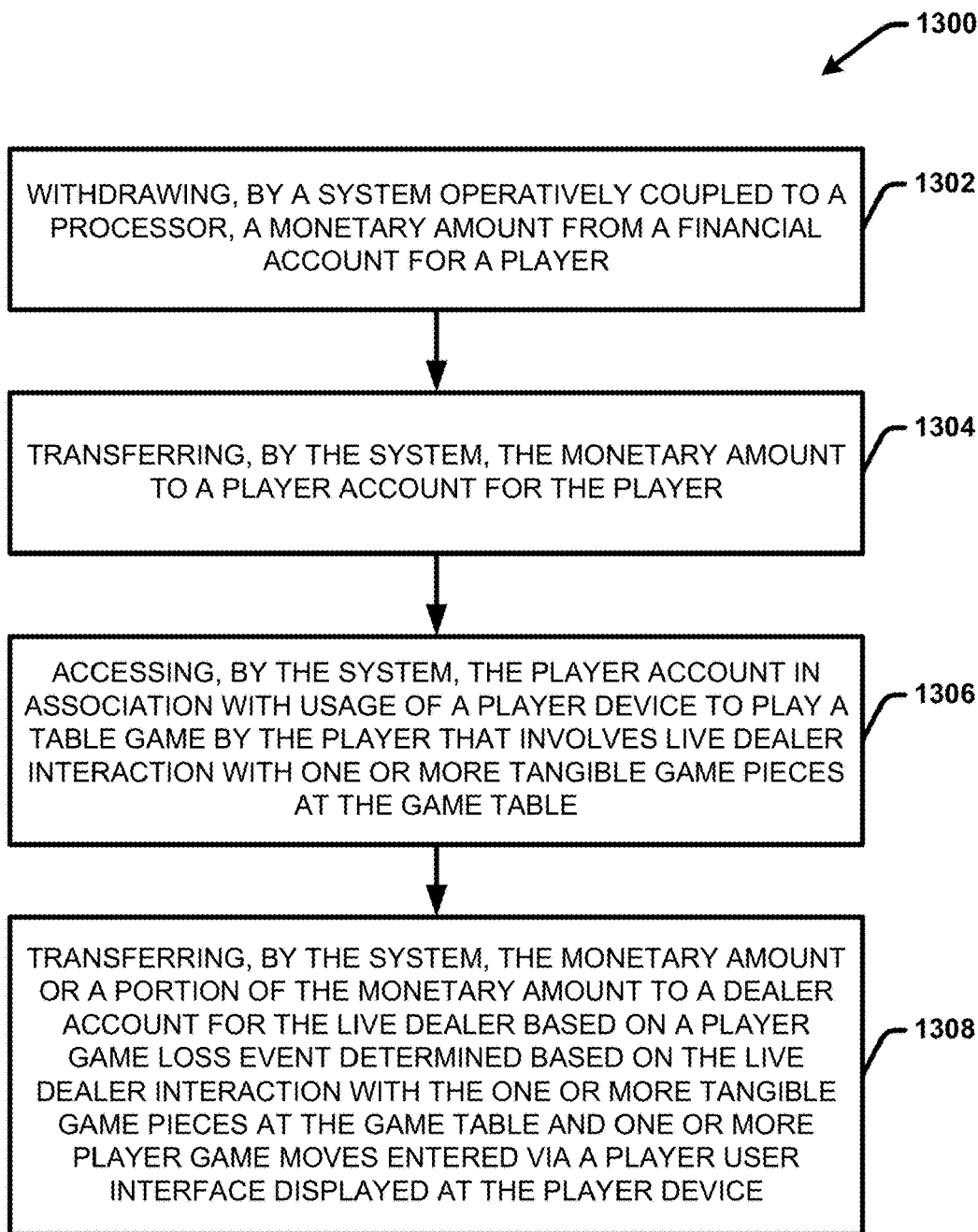
FIG. 13 presents a flow-diagram of another example, non-limiting, computer implemented method that facilitates playing a device operated table game integrating live dealer interaction with tangible game pieces in accordance with one or more embodiments of the disclosed subject matter.

FIG. 13 presents a flow-diagram of another example, non-limiting, computer implemented method 1300 that facilitates playing a device operated table game integrating live dealer interaction with tangible game pieces in accordance with one or more embodiments of the disclosed subject matter.

In accordance with method 1300, at 1302, a system operatively coupled to a processor (e.g., system 100, system 200, system 300, system 500, system 1100 and the like), can withdrawal a monetary amount from a financial account for a player (e.g., using withdrawal component 308). At 1304, the system can transfer the monetary amount to a player account for the player (e.g., using withdrawal component 308 and/or conversion component 310). At 1306, the system, can access the player account in association with usage of a player device to play a table game by the player that involves live dealer interaction with one or more tangible game pieces at the game table (e.g., using player account access component 604 and/or dealer account access component 904). At 1308, the system can transfer the monetary amount or a portion of the monetary amount to a dealer account for the live dealer based on a player game loss event determined based on the live dealer interaction with the one or more tangible game pieces at the game table and one or more player game moves entered via a player user interface displayed at the player device (e.g., using the player reward transfer component 614 and/or the dealer reward transfer component 916).

Figure 14:
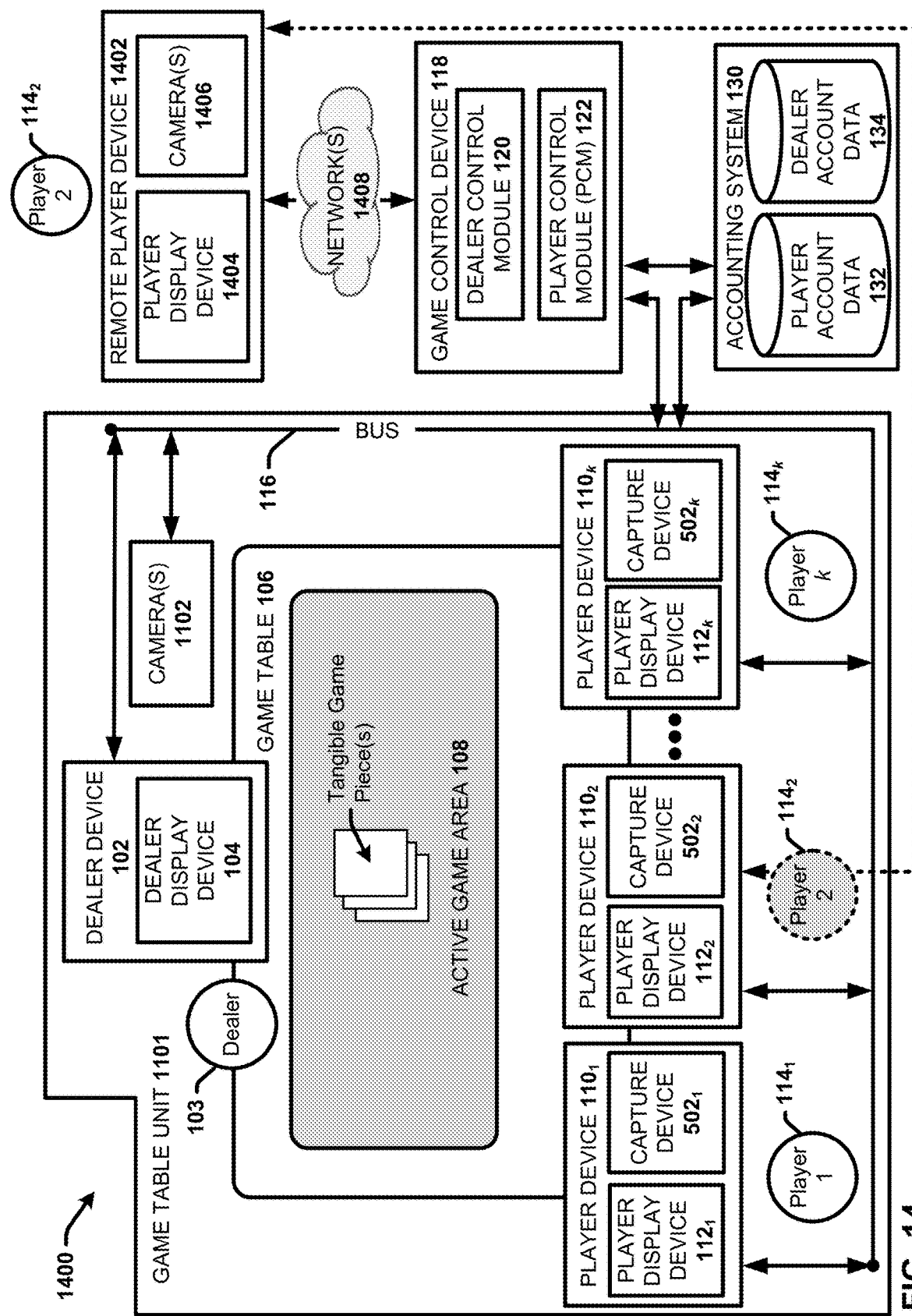
FIG. 14 illustrates a block diagram of an example, non-limiting system that facilitates remotely accessing and playing at device operated table game system that integrates live dealer interaction with tangible game pieces in accordance with one or more embodiments of the disclosed subject matter.

FIG. 14 illustrates a block diagram of an example, non-limiting system 1400 that facilitates remotely accessing and playing at device operated table game system that integrates live dealer interaction with tangible game pieces in accordance with one or more embodiments of the disclosed subject matter. System 1400 include same or similar features and functionalities as system 1100 with the addition of a remote player device 1402 and one or more networks 1408. In the embodiment shown, some components of the game control device 118 (e.g., the respective PCMs $122_{1-k}$, the device bus 128, the memory 124 and the processor 126) have been removed merely to simply the drawing. In this regard, although not shown, it should be appreciated that these components are assumed to be included in the game control device 118 in some embodiments. Additionally, or alternatively, one or more components of the dealer control modules 120 can be deployed at the dealer device 102 and/or respective PCMs $122_{1-k}$ can be deployed at the respective player devices $110_{1-k}$. Repetitive description of like elements employed in respective embodiments is omitted for sake of brevity.

System 1400 can provide the various features and functionalities described with reference to systems 100, 200, 500, 900 and 1100 described above, with the addition of the ability to remotely play the table game at the game table 106 by a remote player using a remote player device 1402. The term remote player is used herein to refer to a player that is not physically located at the game table 106 or within close proximity to the game table (e.g. in implementations in which the player devices $110_{1-k}$ can be detached from the game table 106 yet within ten feet or so of the game table). For example, a remote player can include a player that is located at home, or another physical environment that is remote from the physical location where the game table unit 1101 is located (e.g., outside of a casino in implementations in which the game table unit 1101 is located inside a casino). In this regard, a remote player does not at least directly physically interface with a player device 110 to play the table game at the game table 106 as described in previous system embodiments.

Alternatively, the remote player can use a remote player device 1402 to remotely access a player device 110 and/or a player control module 122 associated with the player device 110 via one or more networks 1408 (e.g., the Internet or the like). For example, in the embodiment shown, Player 2 $114_2$ is a remote player that is remotely accessing player device $110_2$ and/or a PCM $122_2$ associated with player device $110_2$ using remote player device 1402 to remotely play the table game at the game table 106. The term "in-person player" is used hereinafter to refer to a player that physically interfaces with a player device 110 at the game table 106 to play the table game as described in previous system embodiments. In the embodiment shown, the circle icon for Player 2 $114_2$ at the game table unit 1101 is shown in grey to indicate that the player is a remote player.

The one or more networks 1408 can include same or similar networks described with reference to networks 316. The remote player device 1402 can include any suitable computing device comprising a player display device 1404 that can provide same or similar features and functionalities as a player device 110. For example, the remote player device 1402 can include but is not limited to, a mobile phone, a smartphone, a tablet personal computer PC, a laptop PC, a desktop PC, a PDA, an Internet enabled television, a HUD, an AR device, a VR device, a wearable eyewear device, a wearable watch/wrist device, and the like. In this regard, the type of remote player device 1402 can vary. The type of the player display device 1404 can also vary. In one or more embodiments, the player display device 1404 can include same or similar features and functionalities as a player display device 112.

In various embodiments, the remote player device 1404 can operate in a same or similar manner as a player device 110 via accessing the game table unit 1101, the game control device 118 and/or the accounting system 130 via one or more networks 1408. In particular, system 1400 can employ a web-based platform (e.g., a website, web-application, a mobile application, etc.) that can be used by the remote player device 1402 to remotely access (e.g., using a browser, a client application, or the like) a player device 110 and/or a PCM 122 associated therewith, as well as the accounting system 130. In the embodiment shown, the game control device 118 associated with the game table unit 1101 can control and mange remote access to a player device 110 and/or a PCM 122 associated therewith by a remote player device 1402.

For example, in some embodiments in which respective the PCM $122_{1-k}$ are deployed at each player of the devices $110_{1-k}$, the game control device 118 can receive a remote play request from the remote player device 114 requesting to access and use one of PCMs 122 at one of the player devices $110_{1-k}$ to remotely play the table game. In some implementations, the remote play request can specifically identify a particular player device (e.g., player device $110_2$) that remote player would like to access and use. With these embodiments, the game control device 118 can facilitate connecting the remote player device 1402 with the associated PCM deployed at the selected player device 110 (e.g., PCM $122_2$ for selected player device $110_2$). For example, the game control device 118 can serve as a relay communication device between the remote player device 1402 and the PCM 122 at the player device 110.

In other embodiments in which respective PCM $122_{1-k}$ are deployed at the game control device 118, the game control device 118 can receive a remote play request from the remote player device 1402 requesting to access and use one of PCMs 122 at the game control device 118 to remotely play the table game. The game control device 118 can further connect the remote player device 1402 with the PCM 122 as deployed at the game control device 118 based on reception of the remote play request. Additionally, or alternatively, an instance of a PCM 122 can be deployed at the remote player device 1402 as client application or the like and activated for usage at a particular game table unit (e.g., game table unit 1101) in association with a request to remotely play the game at the game table unit. In some implementations of these embodiments, the player devices $110_{1-k}$ can be removed from the game table unit 1101 entirely the table game can be played only remotely using a remote player device 1402 and usage of a PCM 122 via the remote payer device 1402.

In this regard, with to reference to FIGS. 6 and 14, in some embodiments, in association with usage of the PCM 122 (e.g., regardless of its deployment location), the web-based platform can allow the remote player device 1402 to employ the player account access component 604 to remotely log-into their player account in association with submission of the remote play request to remotely play the table game played at the game table 106 with a live dealer (e.g., dealer 103). For example, the web-based platform can allow the remote player to log-into their player account and submit a play request using same or similar techniques described with reference to the player account access component 604 (e.g., via submission of player account access information, such a username/password, a PIN number, player card information, etc.).

In various embodiments, as with in-person gaming using a player device 110, the disclosed table gaming systems can restrict users to remotely playing table games based on usage of an established player account. In some embodiments, a new remote player without an established player account can access the accounting system 130 using the remote player device 1402 to establish a player account in accordance with the techniques described with reference to FIG. 3. With these embodiments, the remote player device 1402 can be or correspond to the user device 322 and/or include the accounting system interface component 324.

In this regard, similar to an in-person play requests received via a player device 110, the authorization component 606 can be configured to only authorized a remote play request to remotely play the table game at the game table 106 based at least in part on a determination that the player has an established player account with the account system 130. In some embodiments, the web-based platform can employ one or more heightened security measures to verify the player's identity prior to authorizing a remote play request. For example, in some implementations, the web-based platform can require the player to submit one or more facial images and/or video of the remote player's face captured at the time of submission of the play request and employ facial recognition techniques to verify the player's identity prior to authorizing the remote play request. In the embodiment shown, the remote player device 1402 can include one or more cameras 1406 that can be used to capture the facial image data/video in association with submission of the remote play request. The authorization component 606 can also employ one or more additionally player/player account identity verification techniques discussed with reference to FIG. 6.

In one or more embodiments, based on authorization of the remote play request, the remote player can begin playing the table game remotely using the remote player device 1402 and the features and functionalities of the PCM 122 connected to the game table unit selected for remotely playing. In this regard, by accessing and using the PCM 122 coupled to the selected game table unit via the remote player device 1402, the player can remotely play the game as if they were physically located at the game table 106 and playing the table game using a player device 110. For example, based on authorization of the remote player request, the player interface component 602 associated with the PCM 122 can generate and provide the remote player device 1402 with an activated remote player user interface for rendering and using via the player display device 1404.

In some embodiments, the remote player user interface can include same or similar features and functionalities as the player user interfaces discussed above with respect to FIGS. 1-13. The remote player user interface can additionally include image data of the game table 106 in association with playing the table game (e.g., via the one or more cameras 1102 and/or one or more additional cameras associated with the game table unit 1101). For example, the image data can include video and/or still images captured of the active game area 106, the dealer 103, and/or one or more in-person active players at the game table 106. In various embodiments, the image data can include a live video feed of the active game area 106, the dealer 103, and/or one or more in-person active players at the game table 106.

Figure 15:
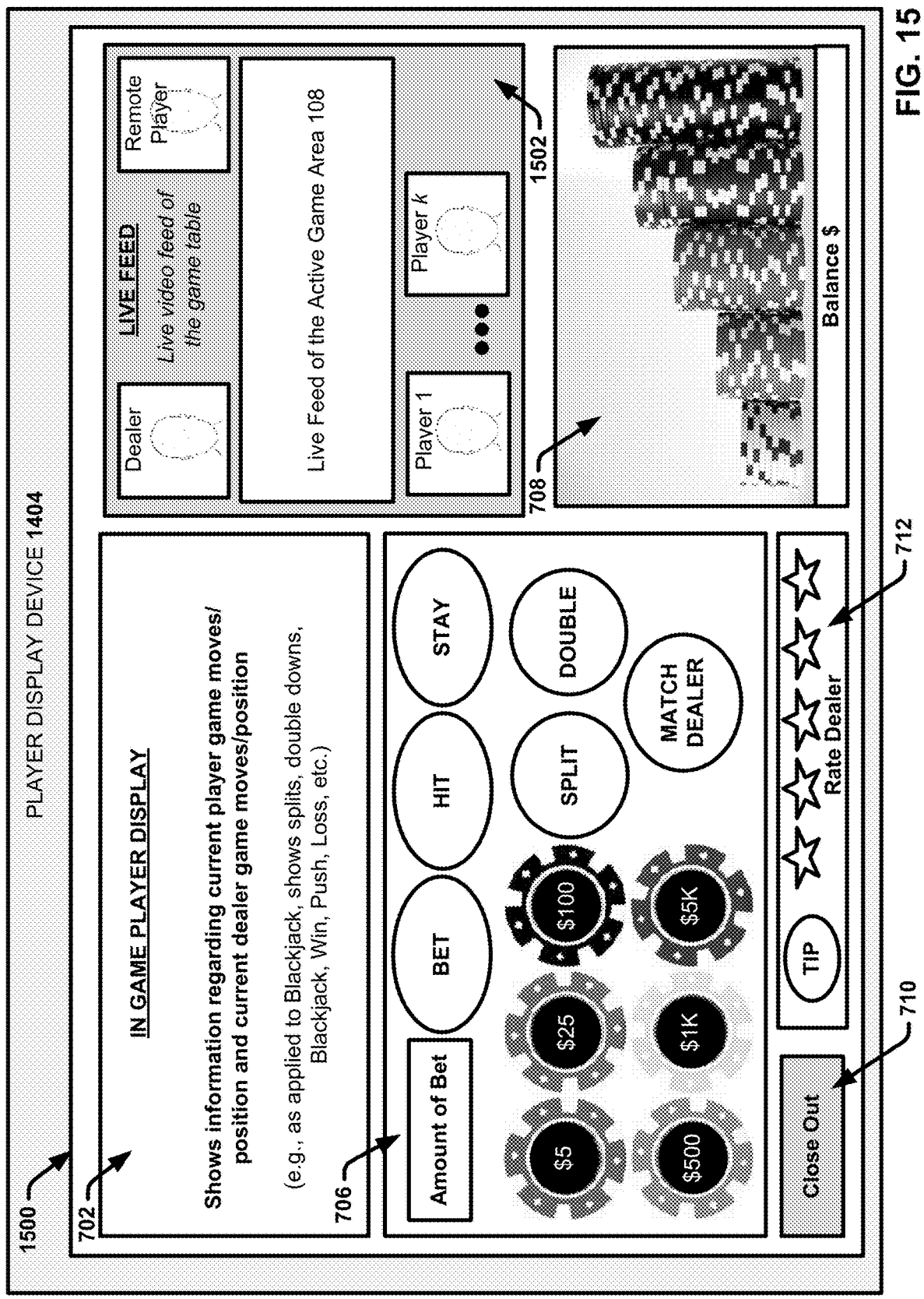
FIG. 15 illustrates a block diagram of another example, non-limiting system that facilitates remotely accessing and playing a device operated table game in accordance with one or more embodiments of the disclosed subject matter.

FIG. 15 presents an example remote player user interface 1500 for remotely playing a device operated table game in accordance with one or more embodiments of the disclosed subject matter. In this regard, the remote player user interface 1500 presents an example remote player interface that can be displayed at the remote player device 1402 in association with an active game session at a game table (e.g., game table 106 or the like). The remote player user interface 1500 includes same or similar features and functionalities as player user interface 700 with the addition of a live feed display area 1502. Repetitive description of like element employed in respective embodiments is omitted for sake of brevity.

With reference to FIGS. 6, 14 and 15, in various embodiments, the player interface component 602 associated with the PCM 122 being used by the remote player device 1402 can activate the remote player user interface 1500 in response to authorization of the remote play request. The player user interface component 602 can further generate and/or facilitate generating the live feed display area 1502 based on live video and/or image data captured via the one or more camera 1102. In some embodiments, the live video can also include audio. In the embodiment shown, the live feed display area can include a view of the active game area 108. For example, as applied to a Blackjack table, the view of the active game area 108 can include live video and/or images of the cards being dealt on the game table by the dealer. In some embodiments, the live feed display area 1502 can also include a view of the dealer and/or one or more of the other active game players at the game table, including in-person and remote players.

In this regard, in some embodiments, the live feed display area 108 can resemble a live video chat room that provides live multimedia (e.g., video and audio) communication between the respective players and the dealer over the course of an active game session. With these embodiments, the one or more cameras 1102 at the game table 106 can be configured to capture live video/audio of the respective in-person players and/or the dealer and present the live video/audio of the in-person players and/or the dealer in the live feed display area 1502. The one or more cameras 1406 of the remote player device 1402 can include a front facing camera (or the like) configured to capture live video of the remote player over the course of the active game session and present the live video of the remote player in the live feed area. In some implementations of these embodiments, the dealer user interface (e.g., dealer user interface 1000 or the like) displayed at the dealer device 102 to the dealer and/or the player user interfaces displayed at the player devices 110 to the in-person players can also include a live feed area similar to that of live feed area 1502 that presents the live video feed of the remote player (or remote players) to the respective in-person players. In addition, live video of other remote players can also be generated and displayed in real-time in the live feed display area 1502 in this manner.

With reference again to FIG. 14, in accordance with the embodiment shown in system 1400, the remote play request can be received and managed by the game control device 118 coupled to the game table unit 1101. Additionally, or alternatively, the remote play request can be received and managed by a master game control device 1602 that controls remote playing for a plurality of different game table units, as shown in FIG. 16.

Figure 16:
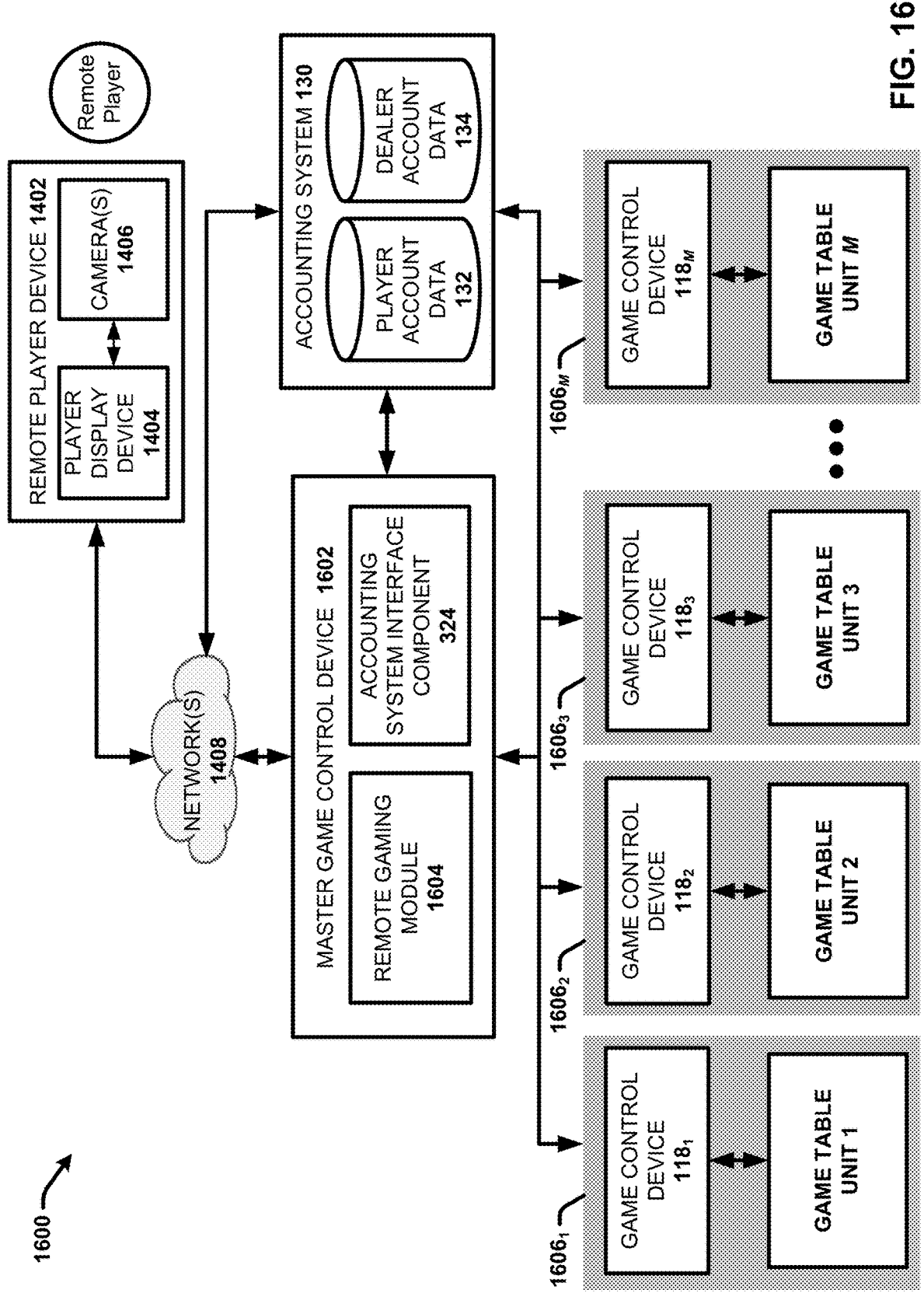
FIG. 16 presents an example remote player user interface for remotely playing a device operated table game in accordance with one or more embodiments of the disclosed subject matter.

In this regard, FIG. 16 illustrates a block diagram of another example, non-limiting system 1600 that facilitates remotely accessing and playing a device operated table game in accordance with one or more embodiments of the disclosed subject matter. Repetitive description of like elements employed in respective embodiments are omitted for sake of brevity.

System 1600 provides an example system architecture that facilitates remotely playing different device operated table games. For example, in some embodiments, the disclosed device operated table gaming techniques can be applied in a casino environment (or a similar environment) that includes a plurality of game tables where table games are played using live dealers at the game tables. For example, the casino environment can include several different Blackjack tables, roulette tables, craps tables, and the like. In accordance with this example use case, all (or at least some) of these game tables can be converted into and/or replaced with game table units corresponding to one or more of the game table units disclosed herein (e.g., game table unit 101, game table unit 102, game table unit 501, game table unit 1101, and the like). In this regard, the different game tables can be converted into and/or replaced with player device operated game tables wherein players provide at least some of their game moves (e.g., at least betting moves) via a player device that is physical coupled to the game table (e.g., player device 110) and/or a remote player device (e.g., remote player device 1402).

System 1600 provides an example system architecture in accordance with this concept. In this regard, system 1600 can include a plurality of table game systems $1601_{1-M}$. The number of different game table systems M can vary. In the embodiment shown, the respective table game systems $1601_{1-M}$ can include a game table unit (respectively identified as game table unit 1, game table unit 2, game table unit 3, and so on). In various embodiments, the game table units 1-M can be or correspond to one or more of the game table units disclosed herein (e.g., game table unit 101, game table unit 102, game table unit 501, game table unit 1101, and the like). Additionally, or alternatively, the player devices $110_{1-k}$ at the game table units can be removed. With this embodiment, the table game can still however be played remotely using a remote player device 1402 coupled to a PCM 122, the dealer control module 120, the dealer device 102 and/or the accounting system 130.

In the embodiment shown in system 1600, each of the game table units 1-M are coupled to a game control device 118 (respectively identified as game control devices $118_{1-M}$). With this embodiment, the game control devices $118_{1-M}$ can respectively be or correspond to one or more of the game control devices 118 described with reference to systems 100, 200, 500, 1100 and 1400. In this regard, in some embodiments, the game control device 118 associated with each game table unit can provide various game control and/or management functions for the specific game table unit with which it is coupled. For example, the game control device 118 associated each game table unit can include the dealer control module 120 and/or the player control module 122 or respective PCMs $122_{1-k}$ for the player device 110 respectively associated with the game table unit. Additionally, or alternatively, the game control devices $118_{1-M}$ can be removed from the respective table game systems $1601_{1-M}$ and the respective table game systems $1601_{1-M}$ can be managed and/or control by the master game control device 1602. With this embodiment, the player control module 120 can be deployed at the player device 102 of the game table unit and respective PCMs $122_{1-k}$ can be deployed at each of the each of the player devices $110_{1-k}$ (and optionally remote player device 1402).

System further includes a master game control device 1602, accounting system 130, and a remote player device 1402. It should be appreciated that a single remote player device 1402 is shown for ease of illustration and that system 1600 and other systems described herein can facilitate simultaneously connecting a plurality of different remote player devices to the master game control device 1602 in association with provision of remote gaming services. The respective table game systems $1601_{1-M}$, the master game control device 1602, the accounting system 130 and the remote player device 1402 can be communicatively coupled to one another via one or more wired and/or wireless connections. The connection architecture can vary. For example, in the embodiment shown, the remote player device 1402 can be communicatively coupled to the master game control device 1602 and the accounting system 130 via one or more networks 1408. In some embodiments, the master game control device 1602 can also be communicatively coupled to the accounting system 130 and the respective table game systems $1601_{1-M}$ via one or more of the same networks 1408. In other embodiments, the master game control device 1602 can also be communicatively coupled to the accounting system 130 and/or the respective table game systems $1601_{1-M}$ via one or more disparate networks. For instance, in some embodiments, the remote player device 1402 can be communicatively coupled to the master game control device 1602 and the accounting system 130 via the Internet, and the master game control device 1602 can also be communicatively coupled to the accounting system 130 and the respective $1601_{1-M}$ via a local enterprise network (e.g., an intranet or the like).

In accordance with system 1600, the master game control device 1602 can include a remote gaming module 1604 that facilitates remotely accessing the different table game systems $1601_{1-M}$ by the remote player device 1402 and remotely playing table games respectively associated with the table game systems using the remote player device 1404. In particular, the remote gaming module 1604 can provide various features and functionalities associated with remote gaming, including enabling, controlling and managing remote gaming. The master game control device 1602 can also include accounting system interface component 324 to interface with the accounting system 130 in association with controlling remote gaming by a remote player device 1402 based on authorized access and usage of a player account for the remote player using the remote player device 1402.

Figure 17:
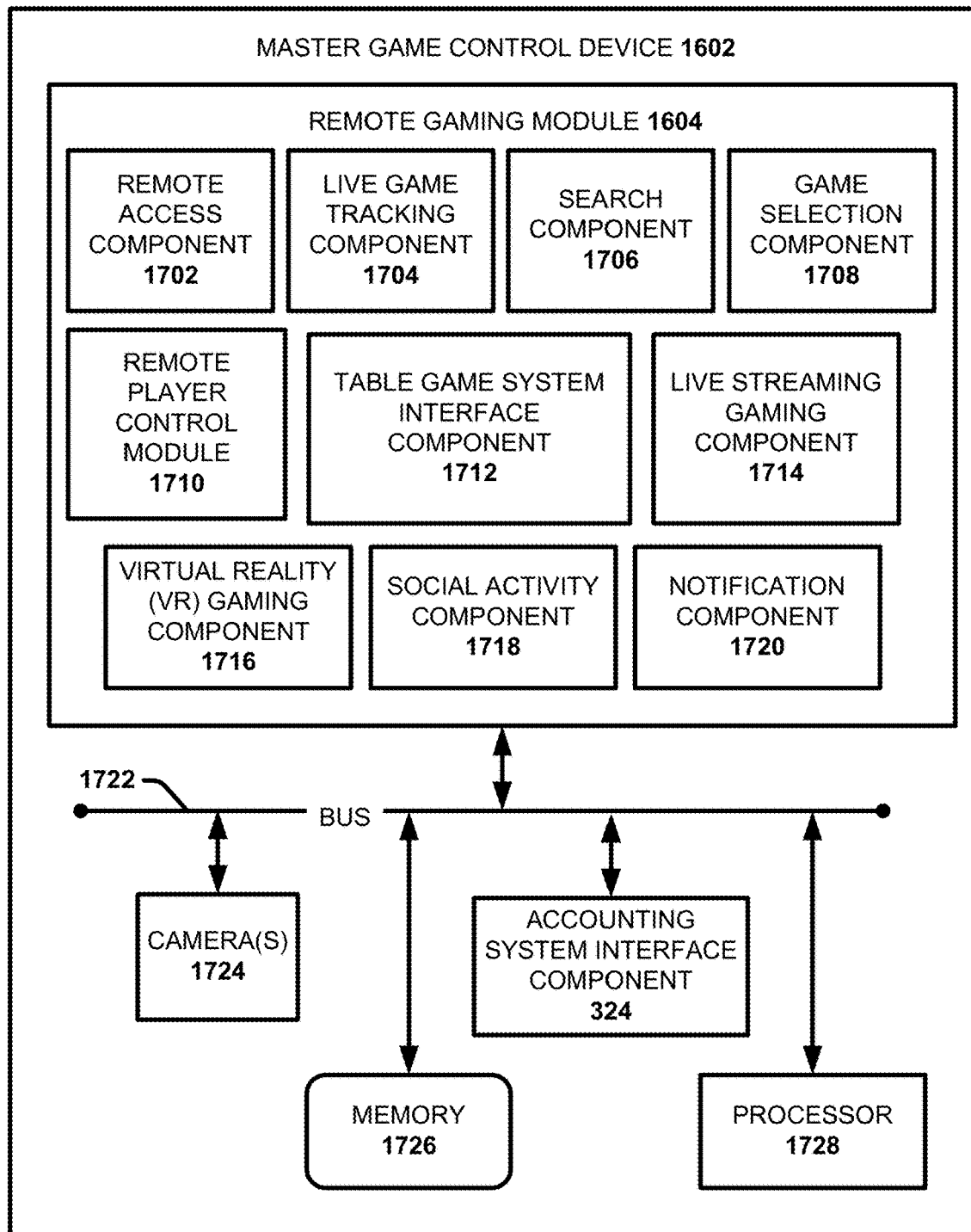
FIG. 17 presents an example master game control device in accordance with one or more embodiments of the disclosed subject matter.

FIG. 17 presents more detailed embodiment of the game master game control device 1602 and the remote gaming module 1604. Repetitive description of like elements employed in respective embodiments is omitted for sake of brevity.

The remote gaming module 1604 can include various computer executable components that provide different features and functionalities associated with remote gaming, including remote access component 1702, live game tracking component 1704, search component 1706, game selection component 1708, remote player control module 1710, table game system interface component 1712, live streaming gaming component 1714, virtual reality (VR) gaming component 1716, social activity component 1718, and notification component 1720. The master game control device 1722 can also include or be communicatively coupled to one or more cameras 1722 and accounting system interface component 324. In some implementations, the one or more cameras 1722 can respectively correspond to cameras dispersed in various locations throughout a table game environment where different table game systems (e.g., table game systems $1606_{1-M}$) are located (e.g., a casino environment or the like). For example, the one or more cameras 1722 can correspond to cameras 1102 respectively located at the game table units and/or additional cameras located in other areas of the table game environment and providing different perspectives of the game tables and the environment.

The master game control device 1602 can further include or be operatively coupled to at least one memory 1726 and at least one processor 1728. In various embodiments, the at least one memory 1726 can store executable instructions (e.g., executable instructions provided by remote gaming module 1604 and the accounting system interface component 324) that when executed by the at least one processor 1726, facilitate performance of operations defined by the executable instructions. The master game control device 1602 can further include a device bus 1722 that communicatively couples the various components of the master game control device 1602. Examples of said and memory 1726 and processor 1728 can be found with reference to FIG. 25, as well as other suitable computer or computing-based elements that can be used in connection with implementing one or more of the systems or components shown and described in connection with FIG. 17 or other figures disclosed herein.

With reference to FIGS. 16 and 17, the remote access component 1702 can facilitate and control remotely accessing one or more features and functionalities of the remote gaming module 1604 by remote players using their respective remote player devices (e.g., remote player device 1402). In some embodiments, the master game control device 1602 can be or correspond to one or more server devices that provide the various remote gaming services associated with the remote gaming module 1604 discussed herein to remote player devices using a server-client model via an interactive network based platform or web platform. With these embodiments, the remote access component 1702 can provide various front-end and/or back-end features and functionalities that control and/or facilitate accessing the web platform by remote players for remoting gaming services. For example, the web platform can include any platform that enables delivery of content and services over the hypertext transfer protocol (HTTP) such as but not limited to, web-application (i.e., an interactive website), a mobile website, a mobile application or the like. Thus in various implementations, when connected to the network (e.g., the Internet), a remote player can access the web-application and/or the mobile website using a suitable web browser and/or a native client application downloaded onto their remote player device 1402.

In some embodiments, the remote access component 1702 can allow registered and unregistered players to access at least some of the features and functionalities of the remote gaming module 1604 (e.g., via the web platform or the like). A registered player refers to a player that has an established player account with the accounting system 130. However, as described in greater detail below, the remote gaming module 1604 can restrict remote playing of table games using table game systems $1606_{1-M}$ to only registered players in association with authorized access of their player account (e.g., via logging into their player account using their player account access information). Alternatively, the remote access component 1702 can require all remote players to establish player accounts and log-into the system using their player accounts in order to access and employ the features and functionalities of the remote gaming module 1604. With these embodiments, the remote access component 1702 can also allow an unregistered player to access and employ the accounting system interface component 324 to establish a player account in order to access the features and functionalities of the remote gaming module 1604.

In various embodiments, the remote player control module 1710 can be or correspond to player control module 122 and include one or more components of the player control module 122. In this regard, the remote player control module 1710 can include player interface component 602, player account access component 604, player account loading component 608, player reward management component 610, player control component 616, player game management component 624, and/or player review component 626. One or more of these components can provide same or similar functions as those described with reference to FIG. 6 yet applied for usage by a remote player device 1402 instead of a player device 110. Repetitive description of like elements employed in respective embodiments is omitted for sake of brevity.

In one or more embodiments, the remote access component 1702 can employ accounting system interface component 324 and a player account access component 604 of the remote player control module 1710 to facilitate logging a registered remote player into their account. In this regard, the remote access component 1702 can employ same or similar mechanisms for player account access described with reference to FIG. 6 and player account access component 604, authorization component 604, and security component 304. For example, the remote access component 1702 can provide remote players with an account log-in user interface via which a registered player can submit their account access information in accordance with a request to access and load their player account. The remote access component 1702 can further employ the accounting system interface component 324 and the authorization component 604 to interface with the accounting system 130 and perform a player/account authentication/verification procedure using one or more of the techniques described with supra. For example, the player/account authentication/verification procedure can involve determining whether the remote player has provided the correct access information for accessing their player account (e.g., the correct username/password, the correct PIN, the correct biometric identifiers). Based on authorization of the account access request, the remote access component 1702 can log the player into their account. The remote access component 1702 can further allow logged-in players to view and manage their player account using the accounting system interface component 324.

The remote gaming module 1604 can further provide various additional features and functionalities associated with remote gaming for logged-in players, some of which can optionally be accessed by unregistered players or logged-out players. For example, the remote access component 1702 can allow logged-in players (and optionally logged-out/unregistered players) to access the remote gaming platform (e.g., a website, web-application, mobile application, etc.) and view general game information regarding the table game systems $1601_{1-M}$ provided be the system 1600 that can be remotely played. In some implementations, the general game information can also include descriptive information regarding the type of table games played at the respective table game systems $1601_{1-M}$, information regarding game rules, information regarding historical game activity at the respective game tables (e.g., game wining and loss statistics, frequency of play, and the like).

In addition to this relatively static gaming content, the remote gaming module 1604 can also provide logged-in players (and optionally logged-out/unregistered players) with live game activity information regarding current gaming activity at the respective table game systems $1601_{1-M}$. For example, the live game activity information can include information regarding (but not limited to): availability status of player spots/seats (or player devices 110) at the respective table game systems $1601_{1-M}$, current game status, (e.g., mid-shoe, new dealer, etc.), current game statistics (e.g., dealer wins verses player wins, percentage landing on red verses landing on black, etc.), number of active player at the game table, type of the actives players (e.g., either in-person or remote), identities of the active players, player ratings of the other active players, identities of the active dealers at the respective tables, ratings of the dealers, duration of play of the other active players, and the like. With these embodiments, the remote gaming module 1604 can include live game tracking component 1704 to track and generate this live game activity information in real-time.

Regarding availability status of player spots/seats at the respective table game systems $1601_{1-M}$, in some embodiments, the number of in-person and/or remote players that can play a table of one or more of the table game systems $1601_{1-M}$ can be unlimited. With these embodiments, the availability status of these table game systems can always be available. However, in other embodiments, system 1600 can restrict the number of players that can play (at least some of) the table games of table game systems $1601_{1-M}$ at a time. For example, as applied to the game of Blackjack, the number of active players can be limited to six or seven. The active players can include both in-person and remote players.

In accordance with these embodiments, the live game tracking component 1704 can track the number of active players at the respective table game systems $1601_{1-M}$ in real-time and generate availability status information regarding the current number of available spots at the respective table game systems $1601_{1-M}$. For example, with respect to in-person active players, the live game tracking component 1704 can track the number of active game sessions in association with usage of the respective player devices $110_{1-k}$ to determine the number of active players at each game table. The live game tracking component 1704 can similarly track the number of active remote gaming sessions at the respective game table systems $1601_{1-M}$. With these embodiments, the game selection component 1708 can restrict remote gaming selection based on spot/seat availability. For example, the game selection component 1708 can only allow remote players to request to remotely play table games at table game systems where there are available spots/seats.

In some embodiments, the maximum number of active players that can play a table game of a table game system $1606_M$ can be equal to the number of player devices $110_{1-k}$ coupled to the game table. With these embodiments, a remote player can only remotely play the table game of that table game system $1606_M$ if at least one of the player devices $110_{1-k}$ is available (e.g., not in use by an in-person player or another remote player). With these embodiments, an available spot/seat is synonymous with an available player device 110. In some implementations of these embodiments, based on establishment of a remote gaming session for a remote player at the table game system $1606_M$, one of the available player devices $110_{1-k}$ can be temporarily blocked for usage by an in-person player. In some implementations, the specific available player device that is blocked can be selected by the remote player and display information indicating the player device is currently in use by a remote player, as described below.

With these embodiments, the live game tracking component 1704 can also generate availability status information that identifies the specific player devices $110_{1-k}$ at the game tables that are available and unavailable. The respective player devices $110_{1-k}$ can be distinguished via different identifiers (e.g., player device 1, player device 2, player device 3, and so on). The game selection component 1708 can also allow remote players to select a specific available player device at a game table that they would like to remotely use. For example, in the embodiment shown in FIG. 14, the remote player can have selected to use player device 1102 for remote playing. In some implementation of these embodiments, the player user interface locally displayed at a player device 110 selected for use by a remote player can be adapted to indicate that it is occupied by a remote player. For example, the display screen can be greyed out and/or displaying information indicating the device is occupied by a remote player. In other implementations, the player device 110 occupied by a remote player can display the remote player's name, picture, avatar or the like. Still in other implementations, the player device 110 occupied by a remote player can provide live video and/or audio of the remote player streamed from the remote player's device (e.g., a captured via the one or more cameras 1406).

The search component 1706 can provide one or more search functionalities to remote players to facilitate finding a game table system for remotely playing and/or viewing. In particular, the search component 1706 can provide a variety of search criteria that can be used by a remote player to filter the table game systems $1601_{1-M}$. In some implementations, the search criteria can include game type and availability status. With these implementations, the remote player can search for table game systems where a table game of a selected game type (or types) is played with at least one available spot/seat (or player device 110). For instance, the remote player can search for all Blackjack table game systems with at least one available spot/seat. In some implementations, the search component 1706 can also allow the remote player to select the number of available spots/seats (or player devices). For instance, in one example use case in which two (or more) remote players (e.g., friends) in communication with one another would like to remotely play at the same time and the same game table, the search component 1706 can allow the remote players to search for tables with at least two available spots/seats.

The search criteria can also include number of active players. For example, a remote player may want to play a table game that has at least one other active player and thus use this as a search criterion. In this regard, the search component 1706 can allow a remote player to search for available table game systems where a certain game type is played with at least N number of active players (e.g., wherein N can be 0, 1, 2, 3, etc. and vary based on the total number of players that can play the table game at the respective table game systems at a time). In other implementations, the number of active players can be used as sorting criterion that can be selected by the remote player via which the search results list of available table games is sorted/ordered (e.g., ordered from tables with the least amount of active players to tables with the highest amount of active players, or vice versa).

Some additional search criteria can include but is not limited to: betting minimum, betting maximum, game status (e.g., mid-shoe, new dealer, etc.), current game statistics (e.g., dealer wins verses player wins, percentage landing on red verses landing on black, etc.), dealer rating, dealer identity, active player status or player rating, active player type (e.g., either in-person or remote), and active player identity. In this regard, essentially any attribute that can be tracked by the live game tracking component 1704 (and/or other tracking component discussed herein), about the table game activity, the players and the dealers can be used to search, filter and sort the table game systems $1601_{1-M}$.

Regarding the dealer identity search criterion, in various implementations, information identifying the dealers can be provided to in-person and remote players in association with playing table games in accordance with the disclosed table gaming systems. For example, the dealer's name for a current active game session can be presented to an active player via the player user interface and/or remote player user interface. The dealer can also wear a name tag the provides their name. In other implementations, information regarding a player's gaming history can be tracked and stored with their player account and accessed by the player in association with access of the player account. This historical game activity information can include information identifying the player's past games and the identities of the dealers. In this regard, players can learn dealer's names and develop a rapport with certain dealers, develop a favorite dealer or dealers, and the like. The search component 1706 can thus allow players to search for and find a game table system where their favorite dealer is currently dealing.

Similar to the dealer identity criterion, in some embodiments, players can learn other players names or usernames (or the like) in association with playing the disclosed table game systems in-person and/or remotely. In accordance with these embodiments, information regarding the identities of active players (e.g., in-person and remote) at the respective table game systems can further be tracked (e.g., by the live game tracking component 1704 and/or the social activity component 1718) in real-time and made available to some (or all) of the remote players as a search criterion for finding table games to play. With these embodiments, a remote player can employ another player's name as a search criterion to search for a table game system whether that particular player is currently playing (e.g., either in-person or remotely). The remote gaming module 1604 can further include social activity component 1718 to facilitate various social networking type gaming features in this regard. For example, the social activity component 1718 can provide a social networking function of the remote gaming module 1604 via which a player can develop a list of gaming friends, followers or the like and associate this list with their player account. With these embodiments, the search component 1706 can allow the remote player to search for table game systems where one or more of their friends are currently playing (e.g., either in-person or remotely).

The search component 1706 can thus allow a remote player to search for table games systems included amongst table game systems $1601_{1-M}$ that satisfy one or more selected search criterion. The search component 1706 can further provide the remote player with an interactive list of the table game system(s) that satisfy one or more selected search criterion (if found). For example, identified table game systems included in the list can be selectable, wherein selection of table game system included in the list can facilitate one or more actions, including viewing additional information about the table game system (e.g., which can live video and/or VR imagery of the table game system as described below) and/or submitting a remote play request to remotely play the selected table game system.

In this regard, the game selection component 1708 can provide for receiving remote player input selecting an available table game system included amongst the table game systems $1601_{1-M}$ for remotely playing. In some embodiments (where applicable), the game selection component 1708 can also allow the remote player to select a specific seat or player device 110 at the game table of the selected table game system for using by the remote player. In various embodiments, remote player selection of a table game system for remotely playing corresponds to submitting a remote play request to remotely play the selected table game system by the remote player. For example, the game selection component 1708 can allow a remote player to click on or otherwise select an available table game system presented to the remote player in list format (or another suitable format) in association with selection of a "request to remotely play," command, resulting in submission of a remote play request to remotely play the selected table game system. In some implementations, the table game system can be selected directly from the search results list provided by the search component 1706 if the game has at least one available seat/spot. In this regard, the game selection component 1708 can prevent a remote player from selecting a table game system for remotely playing if it currently does not have any available spots/seats (or player devices).

In other implementations in which the searching function is not used, the game selection component 1708 can provide the remote player with a list of currently available table game systems (e.g., with at least one spot/seat) and the remote player can select the table game system from the list. The list can further be categorized and organized based on the various search criteria discussed above. For example, the game selection component 1708 can provide different groupings of currently available table game systems grouped by game type, betting minimum, number of active players, and/or various other criteria.

In some embodiments, the remote access component 1702 can allow logged-in and logged-out or unregistered players to view table game systems they may be interested in remotely playing. However, if a remote player is unregistered or not-logged into their account, the game selection component 1708 can prevent the remote player from selecting one of the table game systems 1601$_{1-M}$ and submitting a remote play request. In this regard, the game selection component 1708 can prevent a remote player from summitting a remote play request if the remote player does not have a player account and/or has not successfully logged into their player account using their player account access information. In some implementations of these embodiments, in response to a logged-out or unregistered player attempting to submit a remote play request, the game selection component 1708 and/or the remote access component 1702 can generate and present a prompt to the remote player informing them that they need to first log-into their player account before they can submit the remote play request. For example, the prompt can include data entry fields for submitting their account access information and logging into their player account. The prompt can also include a link for unregistered players to follow to set up a new player account.

In accordance with these embodiments, all remote play requests are received by the game selection component 1708 after a remote player has securely accessed their player account in association with a successful log-in. As describe above, the remote access component 1702 can employ one or more authorization/verification procedures in association with logging a remote player into their player account. In this regard, all remote play requests will be received from remote players who have an established player account, who have been authorized to access the player account, and whose identity has been verified.

In this regard, in some embodiments, an additional authorization procedure for the remote play request can be eliminated and the remote play request can be considered authorized at the time of submission/reception by the game selection component 1708. With these embodiments, based on reception of a remote play request from a registered player in association with log-in to their player account, the game selection component 1708 can generate a remote play request message including information identifying the remote player and/or the remote player's player account and the selected table game system (e.g., via a unique identifier for the particular table game system). In some implementations, where applicable, the remote play request message can also identify a selected spot/seat or player device 110 for using by the remote player. The game selection component 1708 can further provide the remote play request message to the table game system interface component 1712.

The table game system interface component 1712 can further employ the remote play request message to facilitate connecting the remote player to the selected table game system 1606$_M$ (and/or player device 110$_k$) and establishing an active remote gaming session for the remote player at the selected table game system. In this regard, in response to reception of the remote play request message, the table game system interface component 1712 can connect the remote player device 1402 to the respective devices included in the table game system 1606$_M$. For example, in some embodiments, the table game system interface component 1712 can connect the remote player device 1402 to the game control device 118M of the selected table game system 1606$_M$ which in turn can connect the remote player device 1402 to the dealer device 102, the dealer control module 120, the other player devices 110$_{1-k}$, and/or the respective PCMs 122$_{1-k}$ for the other player devices. In other embodiments in which a local game control device 118 is not deployed for the respective table game systems 1606$_{1-M}$, the table game system interface component 1712 can connect the remote player device 1402 to the dealer device 102, the dealer control module 120, the other player devices 110$_{1-k}$, and/or the respective PCMs 122$_{1-k}$ for the other player devices.

The table game system interface component 1712 can further direct the remote player control module 1710 to active a remote gaming session for the remote player/player account at the table game system 1606$_M$ in association with connecting the remote player device to the respective devices included in the table game system 1606$_M$. In this regard, the remote player control module 1710 can active a remote gaming session for the remote player/player account by proceeding in a same or similar manner described with reference to FIG. 6 after authorizing a play request for a player device 110. Based on activation of the remote gaming session, the remote player can then use the gaming control features and functionalities of the remote player control module 1710 in a same or similar manner as if then player was using a corresponding player control module 122 deployed at a player device 110. For example, using an interface component 602, the remote player control module 1710 display and activate the remote player user interface (e.g., remote player user interface 1500 or the like) for playing the table game and initiate the active remote game session for the remote player. The remote player can then begin playing the game using the remote player user interface and placing bets using the virtual chips (and/or money or another currency) available in their player account/available balance.

In other embodiments, the remote player control module 1710 can perform one or more additional authorization/verification procedures for a remote play request prior to authorizing the remote play request and establishing the active remote gaming session. In this regard, the remote player control module 1710 can employ heightened security measures for remote gaming to ensure player accounts are not used by unauthorized entities. With these embodiments, the game selection component 1708 can provide the remote play request message to the remote player control module 1710. Based on reception of the remote play request message, the remote player control module 1710 can perform one or more additional authorization/verification procedures to determine whether the remote player is authorized to use the player account to remotely play the table game, to verify the identity of the remote player, and/or to determine there are any usage restrictions associated with the player account and/or the context of the remote gaming session that warrant denial of the remote play request.

In some embodiments, the remote player control module 1710 can process the remote play request in a similar manner as a play request submitted by an in-person player using a player device 110 and an associated player control module 122 (e.g., using authorization component 606, accounting system interface component 324 and the security component 304) based on reception of the play request. In this regard, the authorization component 606 can employ on or more of the same authorization checks described with reference to FIG. 6 prior to authorizing the remote play request. In some embodiments, the remote player control module 1710 can require the remote player to resubmit their account access information prior to authorizing the remote play request (e.g., the correct username/password, the correct PIN, the correct biometric identifiers). In other embodiments, the remote player control module 1710 can require the remote player to activate a front facing camera on their device and agree to maintain a live video stream of their face during the active remote gaming session. With these embodiments, the system can employ facial recognition technology to verify the identity of the remote player and ensure that the same person continues to play the table game after the remote gaming session has been activated.

The remote player control module 1710 and the authorization component 606 can also determine whether the player's account has sufficient funds for playing the table game prior to authorizing the remote play request.

In some embodiments, various additional system and/or player restrictions can be applied for remote gaming that can control authorization or denial of a remote play request. With these embodiments, the authorization component 606 can further evaluate the remote play request in view of the one or more additional restrictions prior to authorizing or denying the remote play request. For example, in some implementations, the system can apply a location restriction for remote gaming that limits remote gaming to only authorized locations. For example, the location restriction can include a defined distance from the physical environment where the table game systems $1606_{1\text{-}M}$ environment are located (e.g., within N miles of the environment). In another example, the location restriction can identify specific states, region, areas, countries where remote gaming is authorized and/or unauthorized. With these embodiments, the remote play request message can include information identifying or indicating (e.g., an Internet protocol (IP) address or the like) the current location of the remote player device 1402 submitting the remote play request. The authorization component 606 can further deny the remote play request if the current location is an unauthorized location.

The system can also apply various contextual restriction on remote gaming. For example, the system can apply restrictions on timing when remote gaming is authorized and unauthorized (e.g., time of day, day of week, etc.). Another contextual restriction can be based on the number of current active remote gaming sessions and the current capacity of in-person players and/or people physically located at the table game system environment. For example, system can limit the number of remote gaming sessions that can be active at a time, which can vary based on current capacity (e.g., when the casino is busy, fewer remote gaming sessions can be authorized, or vice versa). The system can also restrict authorization of remote gaming sessions based on other contextual game factors (or game context), which can include but is not limited to: a current status of the game (e.g., mid-shoe, new dealer, etc.), one or more current game statistics (e.g., dealer wins verses player wins, percentage landing on red verses landing on black, etc.), number of active player at the game table, type of the active player (e.g., either in-person or remote), identities of the other active players at the game table, player ratings of the other active players, identity of the dealer, a rating of the dealer, duration of play of the other active players, and the like.

In various embodiments, after the remote player control module 1710 has processed the remote play request using one or more additional authorization/verification checks described above and determined that the remote play request is authorized, the table game system interface component 1712 can then proceed to connect the remote player to the selected table game system and establish the remote gaming session as described above.

The live streaming component 1714 can facilitate the various live steaming elements of remote gaming described with reference to FIG. 15 and the remote player user interface 1500. In this regard, the live streaming gaming component 1714 can receive live video and/or audio from the captured of the remote player, the in-person players, the dealer, and the active game table area 108 and facilitate generating and providing the live feed display area 1502. Repetitive description of like element employed in respective embodiments is omitted for sake of brevity.

In some embodiments, the live streaming gaming component 1714 can also provide for remotely viewing live video of the physical environment where the different table game systems $1601_{1\text{-}M}$ are located (e.g., a casino environment or the like) in association with remotely touring the casino environment. For example, the live streaming gaming component 1714 can allow remote players to view live video feeds of the respective table game systems $1601_{1\text{-}M}$, including live video of the game tables, the game table action, the dealer, the active players and so on. The live streaming gaming component 1714 can also allow remote players to view live video feeds of different areas of the casino environment. With these embodiments, the live game tracking component 1704 can receive the live video feeds from cameras dispersed throughout the casino environment (e.g., one or more cameras 1724, one or more cameras 1102, and the like).

In some implementations of these embodiments, the game selection component 1708 can integrate a table game selection functionality with live video of the different game table systems. For example, the game selection component 1708 can allow a remote player to view live video of the different game tables and find a game table with an available spot/seat that they would like to remotely play. The game selection component 1708 can further provide a game table/seat selection function that allows the remote player to select the specific game table/seat in association with display of the live video of that game table/seat. For example, the selection functionality can allow remote players to directly click on, point to, etc., the particular table game and/or seat in the live video. The game selection component 1708 can further map the position of the user input to the game table/seat displayed in the image data at the time of reception of the input to determine the specific table/seat the remote player has selected. In another example, the live video feed of each game table can be separately presented to the remote player (e.g., in different windows, in association with scrolling, etc.) as captured via different cameras respectively associated with each game table. With this example, the remote player can select a specific game table for remotely playing in association with viewing the live video feed for that game table. The remote game selection component 1708 can further receive information identifying the specific game table that was being displayed to the remote player at the time of selection.

Additionally, or alternatively, the VR gaming component 1716 can generate and provide remote players with a VR gaming environment of the physical game table environment where the different table game systems $1601_{1\text{-}M}$ are located (e.g., a casino environment or the like). With these embodiments, the VR gaming component 1716 can generate an immersive VR environment of the physical game table environment using the live video described above, and/or using previously captured image data of the physical gaming environment. For example, the VR gaming component 1716 can employ the live video and/or previously captured image data of the physical game table environment to generate a graphical three-dimensional (3D) model of the environment. The VR gaming component 1716 can further employ the 3D model to provide an immersive VR experience for remote players via which the remote players can tour/view the game table environment from a perspective as if they were physically located in the environment. In some implementations in which live video is used, the immersive 3D environment can be continuously updated in real-time to reflect the current state of the environment.

For example, in one or more embodiments, the VR gaming component 1716 can employ previously captured image data of the game table environment to generate a static 3D model of the game table environment. In this regard, the static 3D model of the gaming environment can represent the state of the environment in still imagery of the environment in a static state. In some implementations, the static 3D model can be generated using image data of the gaming environment without people and/or other dynamic elements. In another implementations, the static 3D model can depict some people excluding players at the respective game tables. For example, the static 3D model can include graphical representations of the dealers at the respective tables, waiters and staff, other people about the casino floor, etc. The VR gaming component 1716 can further employ the static 3D model of the gaming environment to create an immersive VR environment via which remote players can tour the environment in the static state. The VR gaming component 1716 can further employ live video captured of the game table environment and or live game activity information tracked by the live game tracking component 1704 to generate and add dynamic elements to the VR environment based on the current state of the table game system environment. In this regard, the VR gaming component 1716 can update the VR gaming environment to include graphical representations of actual people (e.g., a avatars) and things currently located in the game table environment. For example, in some implementations, based on information tracked by the live game tracking component 1704 identifying current active in-person and/or remote players at a game table and the respective seats/player devices 110 they are using, the VR gaming component 1716 can generate graphical representations of these players (e.g., their selected avatars) and integrate the graphical representations into the immersive VR environment at the game table. In accordance with this example, a remote player can tour the gaming environment floor in the VR environment mode and see what tables have active players, who the players are (e.g., if the recognize their avatar), what tables have available seats, and so on.

The VR gaming component 1716 can also allow remote players to interact with graphical objects and avatars (e.g., graphical representations of people) present in the VR environment. For example, the VR gaming component 1716 can allow a remote player to select a game table/seat for playing based on user input received in association with viewing the VR environment. In some implementations, the VR gaming component 1716 can also allow remote players to interact with a VR representation of a game table and play the table game at the VR representation of the game table, wherein the VR representation of the game table integrates live image data (e.g., live video) of the dealer and the dealer's interaction of with the tangible game pieces at the game table.

The notification component 1720 can provide a notification feature of the remote gaming module 1604 for providing notifications to registered players regarding occurrence of various defined events determined based on the live game activity information tracked by the live game tracking component (and/or the social activity component 1718). For example, the notification component 1720 can provide notifications regarding availability of spots/seats at table game systems 16021-M, regarding when and where (at which at table game systems and/or in-person or remote) certain players have started an active gaming session, regarding when and where certain dealers have started dealing, regarding changes in betting minimums or maximums, and the like. The specific defined gamed events for which a player would like to receive notifications can be selected and/or defined by the player and associated in the player account information. For example, a player may like to receive notifications when their gaming friends start active gaming sessions and where, when spots open up at the high roller Blackjack table, and the like. The notification component 1720 can further provide notifications to players at the remote player devices 1402, at the player devices $110_{1-k}$ in association usage thereof, and/or other personal devices associated with the respective players (e.g., as push-notifications or the like)

Figure 18:
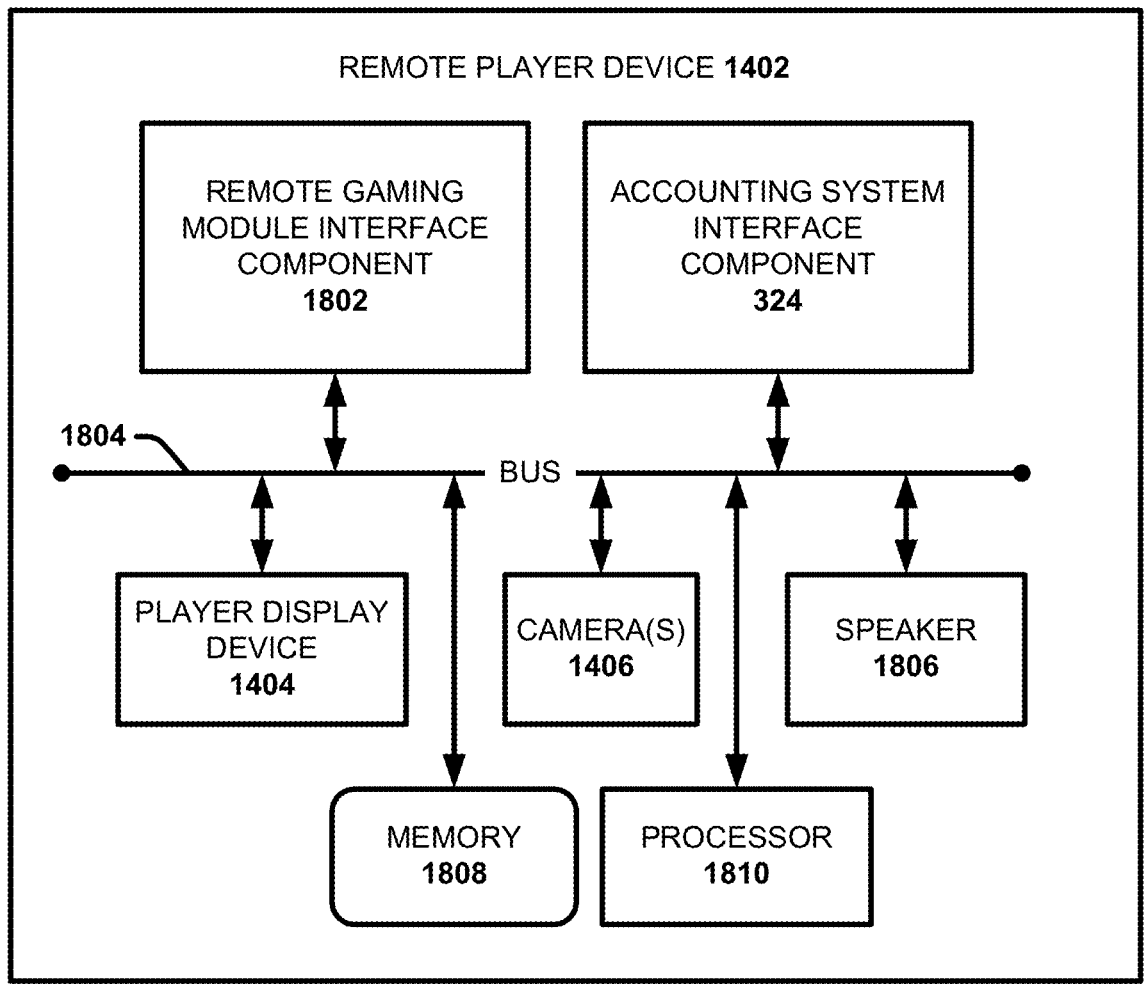
FIG. 18 presents an example remote player device in accordance with one or more embodiments of the disclosed subject matter.

FIG. 18 presents an example remote player device 1402 in accordance with one or more embodiments of the disclosed subject matter. The remote player device 1402 can include remote gaming module interface component 1802 and accounting system interface component 324 to facilitate the various features and functionalities associated with remote gaming. The remote player device 1402 can also include player display device 1404, one or more cameras 1406, and a speaker 1806. The remote player device 1402 can also include or be operatively coupled to at least one memory 1808 and at least one processor 1810. In various embodiments, the at least one memory 1808 can store executable instructions (e.g., executable instructions provided by remote gaming module interface component 1802 and the accounting system interface component 324) that when executed by the at least one processor 1810, facilitate performance of operations defined by the executable instructions. The remote player device 1402 can further include a device bus 1804 that communicatively couples the various components of the remote player device 1402. Examples of said and memory 1808 and processor 1810 can be found with reference to FIG. 25, as well as other suitable computer or computing-based elements that can be used in connection with implementing one or more of the systems or components shown and described in connection with FIG. 18 or other figures disclosed herein. Repetitive description of like elements employed in respective embodiments is omitted for sake of brevity.

In accordance with the embodiment shown, the remote player device 1402 can include remote gaming module interface component 1802 to facilitate interfacing with the master game control device 1602 and the remote gaming module 1604. For example, as described above, in some embodiment one or more features and functionalities of the remote gaming module 1604 can be deployed as and an interactive website, a web-application, cloud-a application, at thin client application, a thick client application, a native client application, a hybrid client application, or the like. With these embodiments, the remote gaming module interface component 1802 can be or include a browser, a thin client application, or the like that, is configured to interface with the master game control device 1602 and the remote gaming module 1604 to access and employ the various features and functionalities of the remote gaming module at the remote player device 1402.

Additionally, or alternatively, one or more components of the remote gaming module 1604 can be deployed locally at the remote player device 1402 (e.g., as part of a client/mobile application or the like).

Figure 19:
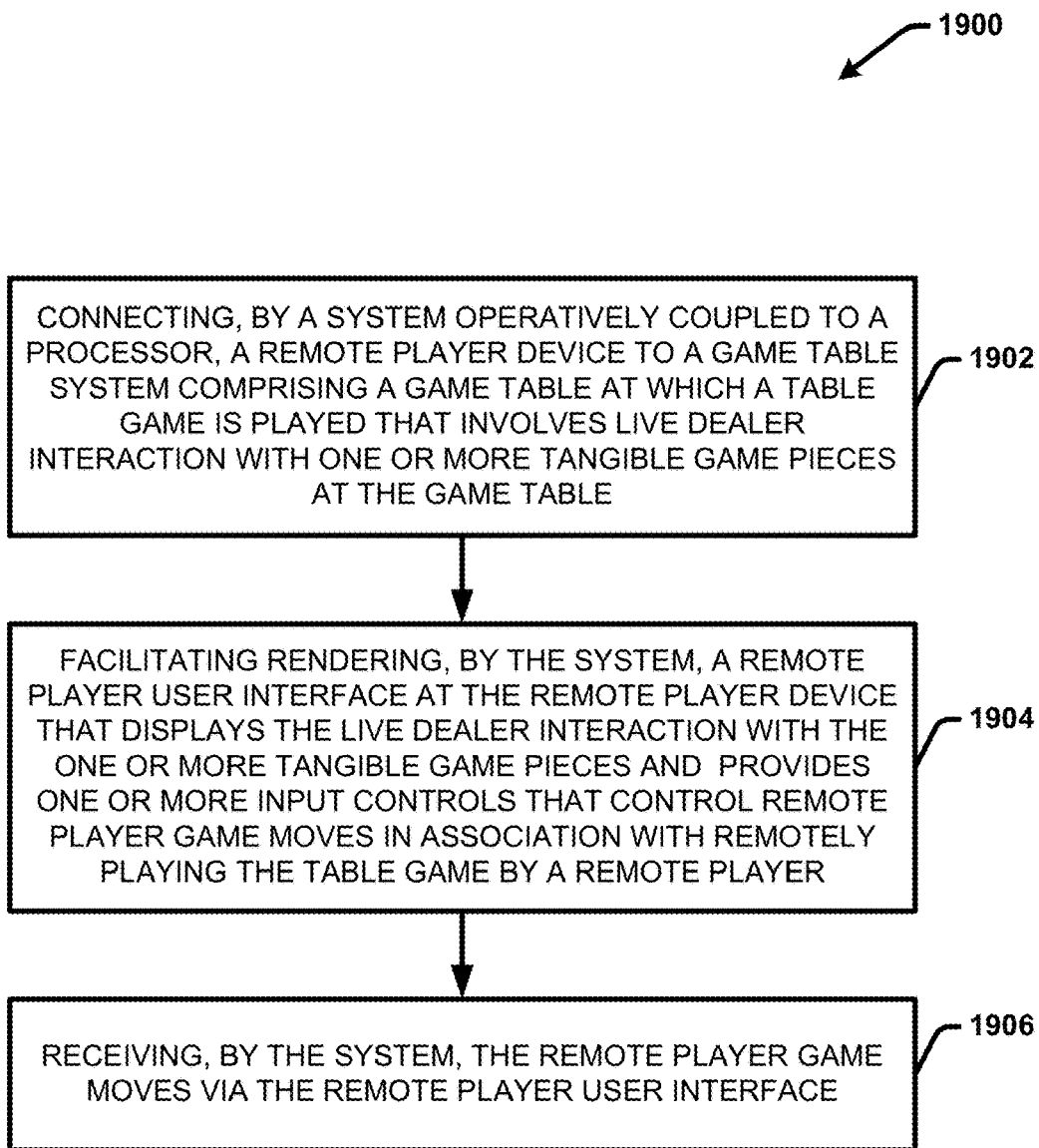
FIG. 19 presents a flow-diagram of an example, non-limiting, computer implemented method that facilitates remotely accessing and playing a device operated table game integrating live dealer interaction with tangible game pieces in accordance with one or more embodiments of the disclosed subject matter.

FIG. 19 presents a flow-diagram of an example, non-limiting, computer implemented method 1900 that facilitates remotely accessing and playing a device operated table game integrating live dealer interaction with tangible game pieces in accordance with one or more embodiments of the disclosed subject matter.

In accordance with method 1900, at 1902 a system operatively coupled to a processor (e.g., system 1400, system 1600 and the like), connects (e.g., via remote access component 1702, and/or table game system interface component 1710) a remote player device (e.g., remote player device 1402) to a game table system comprising a game table at which a table game is played that involves live dealer interaction with one or more tangible game pieces at the game table (e.g., one or more of the table game systems $1601_{1-M}$). At 1904, the system facilitates rendering (e.g., via the table game system interface component 1710 and the player interface component 602) a remote player user interface (e.g., remote player user interface 1500) at the remote player device that displays the live dealer interaction with the one or more tangible game pieces and provides one or more input controls that control remote player game moves in association with remotely playing the table game by a remote player. At 1906, the system receives the remote player game moves via the remote player user interface (e.g., via the table game system interface component 1710).

Figure 20:
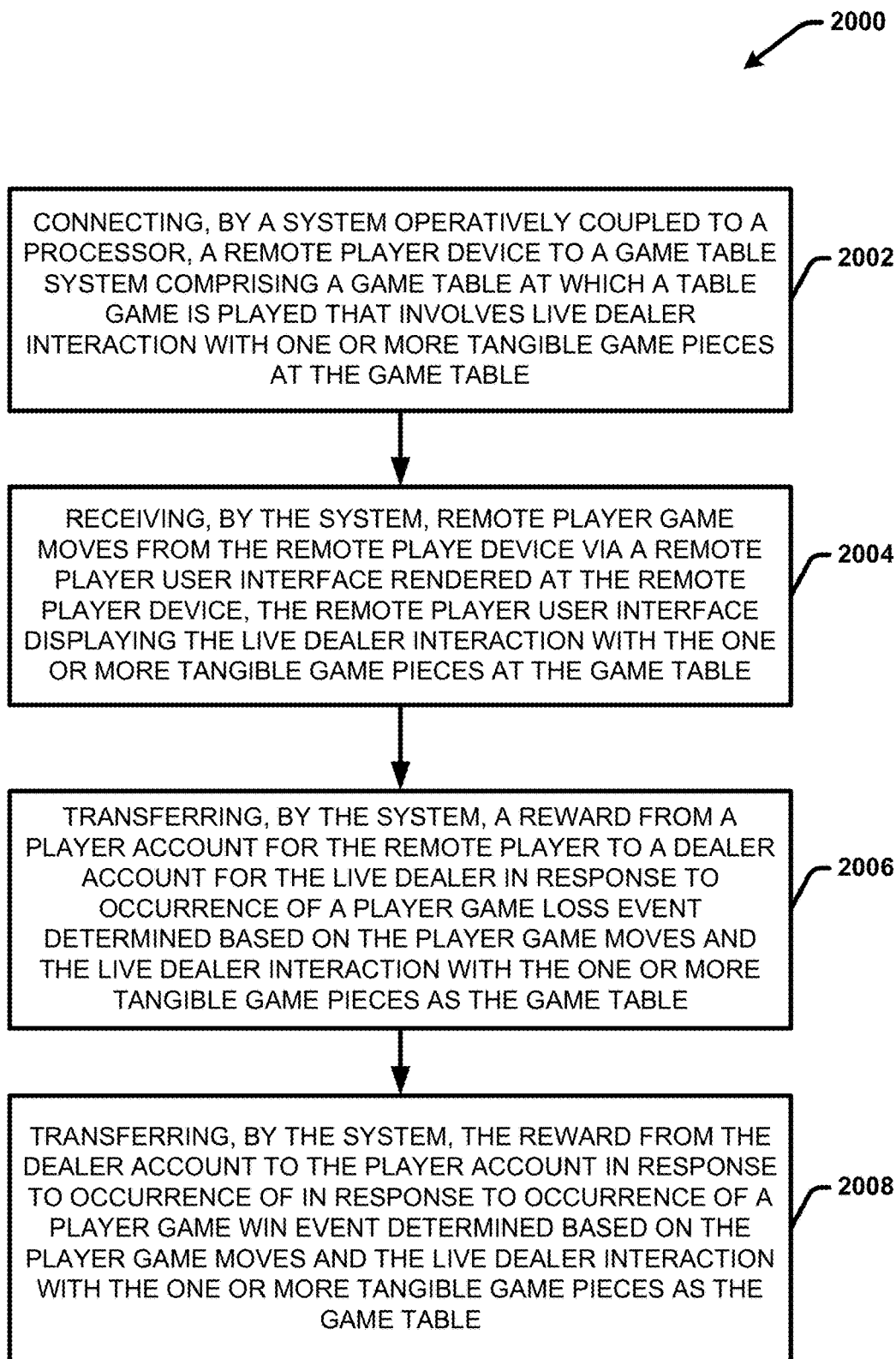
FIG. 20 presents a flow-diagram of another example, non-limiting, computer implemented method that facilitates remotely accessing and playing a device operated table game integrating live dealer interaction with tangible game pieces in accordance with one or more embodiments of the disclosed subject matter.

FIG. 20 presents a flow-diagram of another example, non-limiting, computer implemented method 2000 that facilitates remotely accessing and playing a device operated table game integrating live dealer interaction with tangible game pieces in accordance with one or more embodiments of the disclosed subject matter.

In accordance with method 2000, at 2002, a system operatively coupled to a processor (e.g., system 1400, system 1600 and the like), connects (e.g., via remote access component 1702, and/or table game system interface component 1710) a remote player device (e.g., remote player device 1402) to a game table system comprising a game table at which a table game is played that involves live dealer interaction with one or more tangible game pieces at the game table (e.g., one or more of the table game systems $1601_{1-M}$). At 2004, the system receives remote player game moves via a remote player user interface rendered at the remote player device (e.g., via the table game system interface component 1710), wherein the remote player user interface displays the live dealer interaction with the one or more tangible game pieces at the game table. At 2006, the system transfers (e.g., using player reward transfer component 614 and/or dealer reward transfer component 916) a reward (e.g., points, virtual chips, money/funds, etc.) from a player account for the remote player to a dealer account for the live dealer in response to occurrence of a player game loss event determined based on the player game moves and the live dealer interaction with the one or more tangible game pieces at the game table. At 2008, the system transfer (e.g., using player reward transfer component 614 and/or dealer reward transfer component 916) the reward (or a portion of the reward) from the dealer account to the player account in response to occurrence of in response to occurrence of a player game win event determined based on the player game moves and the live dealer interaction with the one or more tangible game pieces at the game table.

Figure 21:
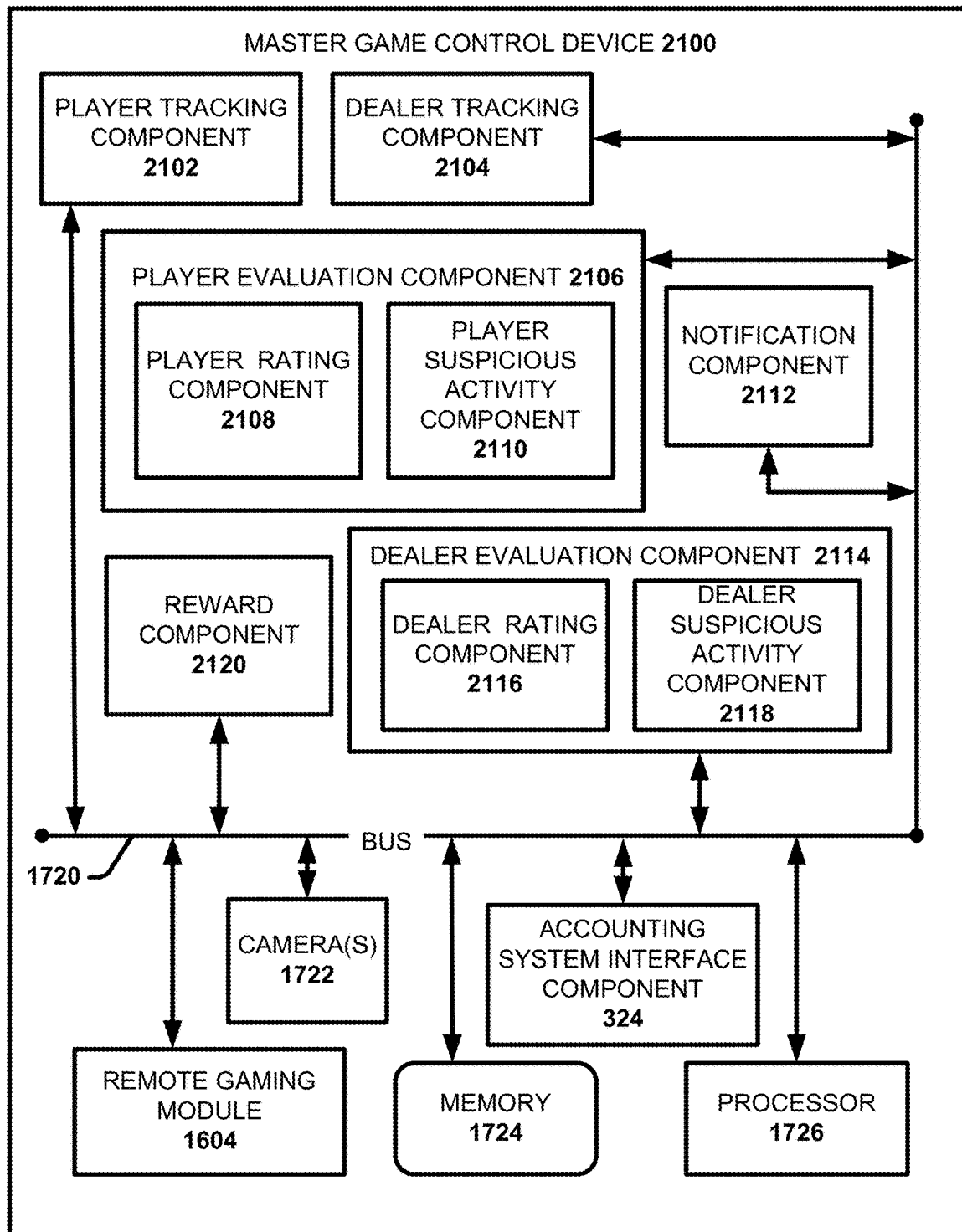
FIG. 21 illustrates a block diagram of another example, non-limiting master game control device 2100 for tracking and evaluating player and dealer activity in association with playing one or more device operated table games in accordance with one or more embodiments of the disclosed subject matter.

FIG. 21 illustrates a block diagram of an example master game control device 2100 that facilitates tracking and evaluating player and dealer activity in association with playing one or more device operated table games in accordance with one or more embodiments of the disclosed subject matter. Similar to master game control device 1602, master game control device 2100 can include remote gaming module 1604, accounting system interface component 324, one or more cameras 1722, memory 1724, processor 1626 and device bus 1720. Master game control device 2100 can further include various additional computer executable components that provide additional features and functionalities related to tracking and processing player and dealer gaming activity information. In the embodiment shown, these additional components include player tracking component 2102, dealer tracking component 2104, player evaluation component 2106, notification component 2112, dealer evaluation component 2114, and reward component 2120. Repetitive description of like elements employed in respective embodiments is omitted for sake of brevity.

The player tracking component 2101 can track a variety of information about registered players in association with usage of their player accounts to play table games in accordance with the disclose table game systems. Information tracked about each player by the player tracking component 2101 can further be stored and associated with their player account and/or processed in real-time by the player evaluation component 2106, the notification component 2112 and/or the reward component.

In various embodiments, the player tracking component 2102 can track player activity information in association with usage of their player account to initiate and perform an active gaming session in real-time. For example, the player tracking component 2102 can track when (e.g., time and date) and where a player starts and stops an active gaming session. For example, this can include what table game system and game type played at the table game system, whether the player is playing in-person using a player device 110 or remotely using a remote player device 1402, if in-person, the specific player device used, and the like). The player tracking component 2101 can thus keep track of the duration of play for each active gaming session. The player tracking component 2101 can also track game move/position and event information regarding the various game moves/ and game events that occur over the course of the active gaming session. This can include information regarding the amount bet on each round, number of wins and losses, and the like. The player tracking component 2101 can also track information regarding winning amounts and loss amounts (e.g., amount won/lost during the session, amount won/lost on each game round etc.). The player tracking component 2101 can also track player review information received from dealers in association with active gaming sessions.

In some embodiments, a player can user their player card or player account to purchase goods and services other than games at the gaming environment. For example, in implementations in which the gaming environment is a casino that include various stores, restaurants, spas, and the like, the player tracking component 2101 can also track information regarding when and where the player uses their player card/account to purchase goods and services at the different stores, restaurants, spas, etc.

The player evaluation component 2106 can further evaluate tracked information for each player in-real time and/or offline for various purposes. In various embodiments, the player evaluation component 2106 can evaluate tracked player game activity information and generate player game performance evaluation information for the players using one or more player performance metrics. For example, the performance metrics can include but are not limited to: total duration of game play (e.g., to date or per a defined time period, such as per hour, per day, per week, etc.), frequency of game play per a defined time period (e.g., per day, per week, per month, etc.), average duration of active game sessions, total number of active game sessions (e.g., to date or per a defined time period), total amount won (e.g., to date, for a current active session, and/or per a defined time period), total amount lost (e.g., to date, for a current active session, and/or per a defined time period), loss rate, win rate, and average bet amount per round, average bet amount per game/active gaming session, and the like.

The player evaluation component 2106 can further include a player rating component 2108 that can generate a player rating for each registered player based on the performance evaluation information. The player evaluation component 2106 can also employ player review information received from dealers for the player in association with generating the player rating. In this regard, the player rating component 2108 can determine different status classifications or player ratings for players based on various factors related to their gaming activity/history, winning/loss amounts, winning/loss rates, player reviews (e.g., subjective ratings/reviews of the player provided by one or more dealers regarding their gaming behavior, generosity, kindness, sportsmanship, etc.) and the like. The mechanism used by the player rating component 2108 to determine/calculate a player's rating based on the various performance metric values and/or player review information can vary. For example, the player rating component 2108 can employ one or more heuristic based rating algorithms and/or one or more machine learning models to determine the player rating.

In some implementations, the player rating component 2108 can determine/calculate a player's rating in accordance with a defined schedule (e.g., once a day, once a week, etc.). In other implementations, the player rating component 2108 can determine/re-calculate a player's rating in real-time based on their tracked game activity information. In this regard, each time new player activity information is received, the player rating component 2108 can recalculate and update the player's rating based on the new activity information. In some implementations, this can occur over the course of an active gaming session. In other implementations, the player rating component 2108 can be configured to recalculate a player's rating at the end of each active gaming session. In some embodiments, the notification component 2112 can further notify a player when their player rating has changed and/or achieved a new status. For example, the notification component 2112 can associate the notification with the player's account and/or push the notification to a device associated with the player.

In some embodiments, the reward component 2120 can be configured to provide players with rewards based on their tracked player activity information, player rating, and/or received reviews. For example, the reward can be or correspond to a monetary reward, a gift voucher, a coupon or the like. In this regard, some traditional casino gaming systems compensate loyal players with rewards based on their amount of game play and/or money spent at the casino. However, with conventional casino gaming systems, it can be very difficult to track and monitor players to determine how to reward/compensate them properly.

With the disclosed table gaming systems, the reward component 2120 can automatically and accurately determine an appropriate reward for loyal players based on their tracked game activity information, their player rating, and/or their received reviews. In this regard, the reward component 2120 can receive accurate performance metrics determined for the player by the player evaluation component 2106 to tailor reward provision accordingly. For example, in some implementations in which the reward component 2120 is configured to provide players with gift voucher based on their amount of game play over a defined period of time (e.g., 24 hours), the reward component 2120 can determine an amount or value of the gift voucher to provide based on their tracked amount of game play. In this regard, the reward component 2120 can determine the type of the reward to provide and the value of the reward based on the tracked game activity information and/or the determined performance metric values, their player rating, and/or their received reviews. In some implementations, the reward component 2120 can also tailor rewards for players based on their preferences, demographics, and the like.

In addition, the reward component 2120 can provide players with rewards in real-time in response to occurrence of defined reward events. For example, the reward component 2120 can be configured to provide a player with a reward in response to the player achieving a defined duration of game play, a defined amount of active game sessions, or the like. In another example, the reward component 2120 can be configured to provide a player with a reward in response to the player losing a defined amount. The reward component 2120 can also tailor the reward based on the amount lost, amount of game play, and the like. In this regard, the reward component 2120 can automatically determine (e.g., based on the tracked player activity information) when a defined reward event occurs and provide the player with a reward in real-time. For example, in some embodiments, the reward component 2120 can issue the reward to the player's player account automatically in response to occurrence of a defined reward event. The notification component 2112 can further provide the player with a notification (e.g., at their remote device or another personal computing device) notifying the player that they have received a reward and what the reward is.

In some embodiments, the reward component 2120 can employ artificial intelligence AI and various machine learning ML techniques to determine or infer when to provide a player with a reward and what reward to provide to achieve one or more target goals, such as increasing player gaming time, increasing player betting amounts, increasing player satisfaction and moral, incentivizing players to continue to play, and the like. In particular, the player reward component 2120 can evaluate tracked player activity information 2102 to learn player patterns and correlations between various gaming events and player activity and different factors that contribute to a player stopping game play, reducing their bet amount, becoming dissatisfied, and the like. For example, the player reward component 2120 can learn that a certain player John Doe usually stops playing games after he has lost X amount of money at a particular table game. In accordance with this example, the player reward component 2120 can provide players with rewards to incentivize theme to continue to play and/or return again soon. In this regard, the player reward component 2120 can infer that based on John Doe losing X amount of money at the particular game, he is likely to stop playing for the rest of the day and thus now is a good time to provide John Doe with a reward to incentivize him to keep playing.

In order to provide for or aid in inferring when to provide a player with a reward and what reward to provide to achieve one or more target goals, the reward component 2120 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The player evaluation component 2106 can further include player suspicious activity component 2110 to identify suspicious player activity (e.g., counting cards or the like) based on the tracked player activity information. For example, the suspicious activity component 2118 can employ various implicitly trained and/or explicitly trained machine learning techniques to evaluate player game moves and positions in their tracked player activity information based on game rules and known patterns for suspicious player activity to determine or infer whether a player is currently or has previously cheated a game (e.g., counted cards or the like). In this regard, the player suspicious activity component 2110 can identify suspicious activity in real-time based on a player's current game moves/positions and optionally their historical gaming activity.

The notification component 2112 can further notify one or more regulatory entities regarding the suspicious player activity based on the identification of the suspicious player activity. For example, the notification component 2112 can send a notification to a gaming system manager, system administrator or the like identifying the player/player account and the suspicious activity detected. In some embodiments, the account access component 604 can further restrict usage of the player account to play the table games (e.g., in-person or remotely) based on identification of the suspicious player activity. For example, the player suspicious activity component 2110 can flag a player's account in response to detection of suspicious activity. Based on flagging the players' account with suspicious activity, the player control module 122 and/or the remote player control module 1710 can deny play requests and remote play requests respectively for the player account.

The dealer tracking component 2104 can similarly track gaming activity for dealers in association with usage of their dealer accounts to play table games as the dealer in accordance with the disclose art table game systems. Information tracked about each dealer by the dealer tracking component 2104 can further be stored and associated with their player account and/or processed in real-time by the dealer evaluation component 2106 and/or the notification component 2112. In some embodiments, the dealer tracking component 2104 can track similar gaming activity for dealers as the player tracking component 2102 tracks for players. For example, the dealer tracking component 2104 can track game move/position and event information regarding the various game moves/and game events that occur over the course of the active gaming session for the dealer. This can include information regarding number of wins and losses, and the like. The dealer tracking component 2104 can also track information regarding winning amounts and loss amounts (e.g., amount won/lost during the session, amount won/lost on each game round etc.). The dealer tracking component 2104 can also track information regarding dealer performance efficiency. For example, the dealer tracking component 2104 can track information including number of rounds achieved per each dealing period at a game table, number of active players for each dealing period, number of active players for each round, type of the active players (e.g., in-person vs. remote), ratings of the active players, and the like. The dealer tracking component 2104 can also track player review information received from dealers in association with active gaming sessions.

The dealer evaluation component 2114 can further evaluate tracked information for each dealer in-real time and/or offline for various purposes. In various embodiments, the dealer evaluation component 2114 can evaluate tracked dealer game activity information and generate dealer game performance evaluation information for the dealers using one or more dealer performance metrics. For example, the dealer performance metrics can include but are not limited to: total amount won (e.g., to date and/or per a defined time period), total amount lost (e.g., to date and/or per a defined time period), average loss rate, average win rate, average number of rounds per dealing period, average number of rounds per dealing period as function of the number of active players, and the like.

The dealer evaluation component 2114 can further include a dealer rating component 2116 that can generate a dealer rating for each dealer based on the performance evaluation information and/or the received reviews. The mechanism used by the dealer rating component 2116 to determine/calculate a dealer's rating based on the various performance metric values and/or dealer review information can vary. For example, the dealer rating component 216 can employ one or more heuristic based rating algorithms and/or one or more machine learning models to determine the dealer rating. The dealer rating component 2116 can also recalculate and update the dealer ratings based on reception of new dealer activity information (e.g., in real-time). In various implementations, the dealer rating can reflect their performance efficiency and/or player reviews of the dealer. In some implementations, the notification component 2112 can notify one or more suitable entities, such as a gaming system manager, a system administrator or the like, in response to a dealer's rating dropping below a threshold level.

The dealer evaluation component 2114 can further include dealer suspicious activity component 2118 to identify suspicious dealer activity (e.g., cheating, stealing, helping players win, etc.) based on the tracked player activity information. For example, the dealer suspicious activity component 2118 can employ various implicitly trained and/or explicitly trained machine learning techniques to evaluate dealer game moves and positions in their tracked dealer activity information based on player game moves/positions, winning an loss amounts, distribution of game winnings to players, game rules and known patterns for suspicious dealer activity to determine or infer whether a dealer is currently or has previously performed suspicious (e.g., cheating, stealing, helping players win, etc.). In this regard, the player suspicious activity component 2110 can identify suspicious activity in real-time based on a player's current game moves/positions and optionally their historical gaming activity.

The notification component 2112 can further notify one or more regulatory entities regarding the suspicious dealer activity based on the identification of the suspicious dealer activity. For example, the notification component 2112 can send a notification to a gaming system manager, system administrator or the like identifying the dealer/dealer account and the suspicious activity detected.

Figure 22:
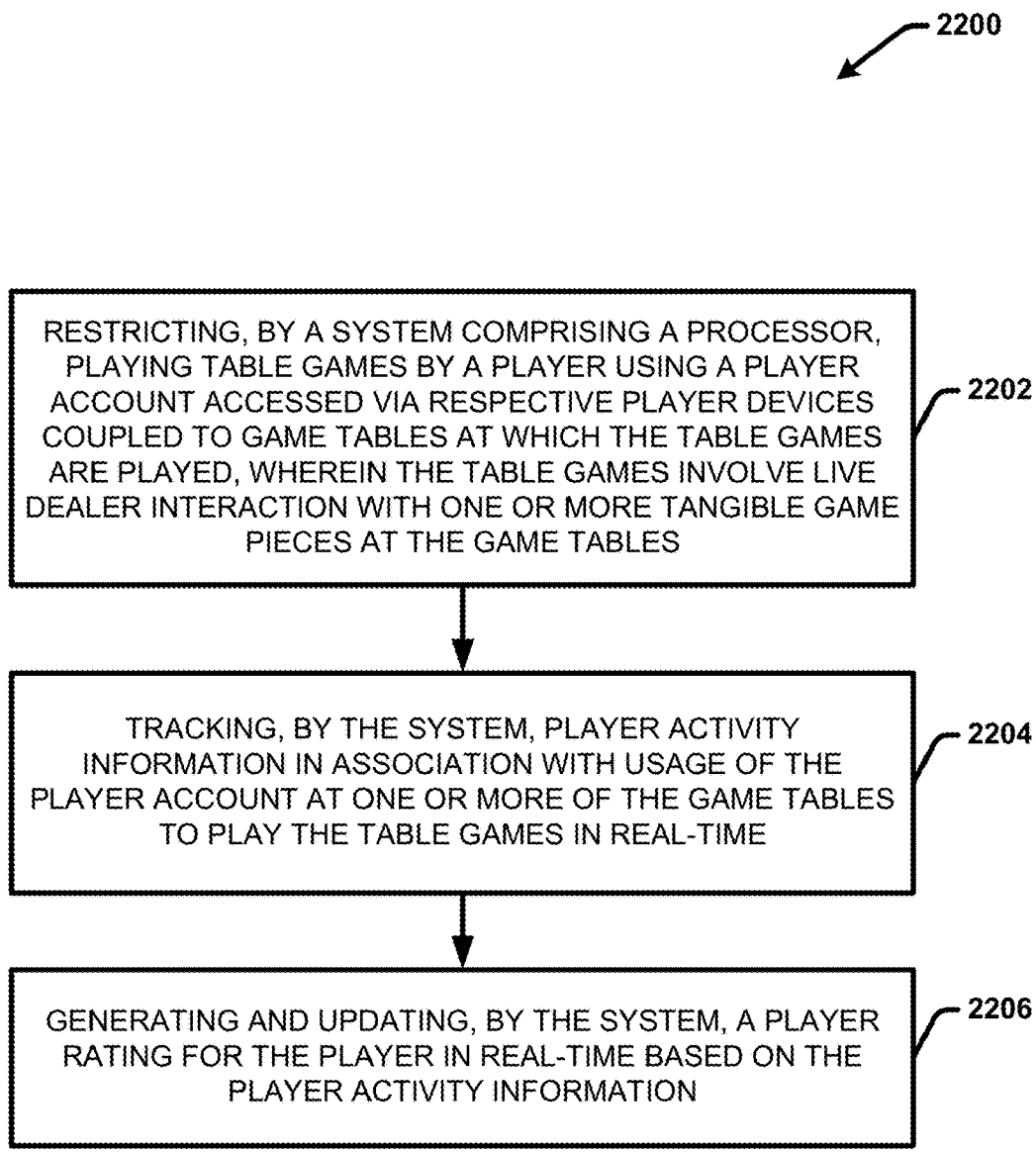
FIG. 22 presents a flow-diagram of an example, non-limiting, computer implemented method for determining a player rating in accordance with one or more embodiments of the disclosed subject matter.

FIG. 22 presents a flow-diagram of an example, non-limiting, computer implemented method 2200 for determining a player rating in accordance with one or more embodiments of the disclosed subject matter.

In accordance with method 2200, at 2202, a system comprising a processor (e.g., system 1400, system 1600 and the like), restricts (e.g., via player account access component 604) playing table games by a player using a player account access via respective player devices coupled to game tables at which the table games are played, wherein the table games involve live dealer interaction with one or more tangible game pieces at the game tables. At 2204, the system tracks player activity information in association with usage of the player account at one or more of the game tables to play the table games in real-time (e.g., via the player game management component 624, the game tracking component 926, and/or the player tracking component 2102). At 2206, the system generates and updates a player rating for the player in real-time based on the player activity information (e.g., using the player rating component 2108).

Figure 23:
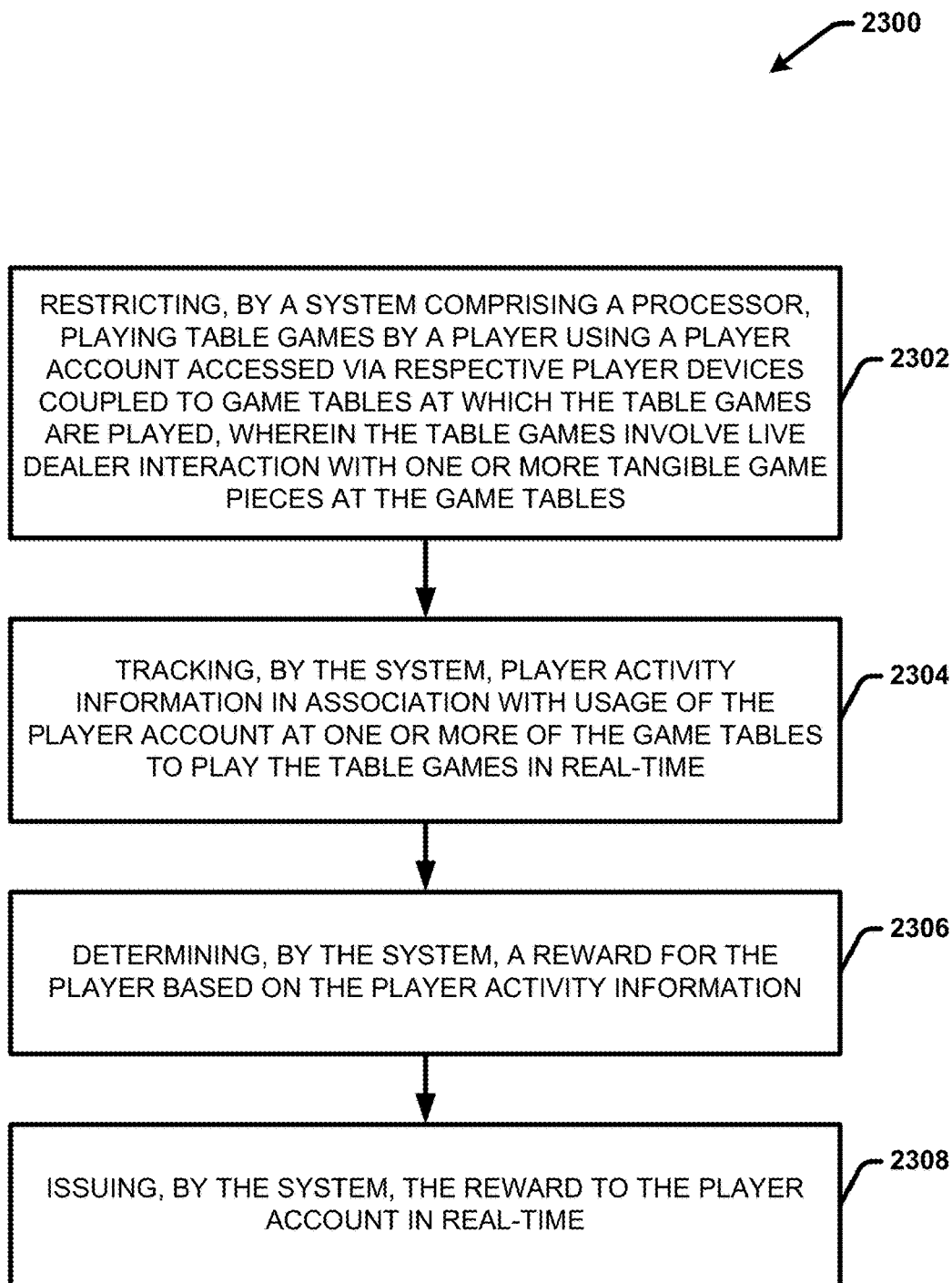
FIG. 23 presents a flow-diagram of an example, non-limiting, computer implemented method for issuing player rewards in accordance with one or more embodiments of the disclosed subject matter.

FIG. 23 presents a flow-diagram of an example, non-limiting, computer implemented method for issuing player rewards in accordance with one or more embodiments of the disclosed subject matter.

In accordance with method 2300, at 2302, a system comprising a processor (e.g., system 1400, system 1600 and the like), restricts (e.g., via player account access component 604) playing table games by a player using a player account access via respective player devices coupled to game tables at which the table games are played, wherein the table games involve live dealer interaction with one or more tangible game pieces at the game tables. At 2304, the system tracks player activity information in association with usage of the player account at one or more of the game tables to play the table games in real-time (e.g., via the player game management component 624, the game tracking component 926, and/or the player tracking component 2102). At 2306, the system determines a reward for the player based on the player activity information (e.g., using reward component 2120). At 2308, the system issues the reward to the player account in real-time (e.g., using reward component and/or notification component 2112).

Figure 24:
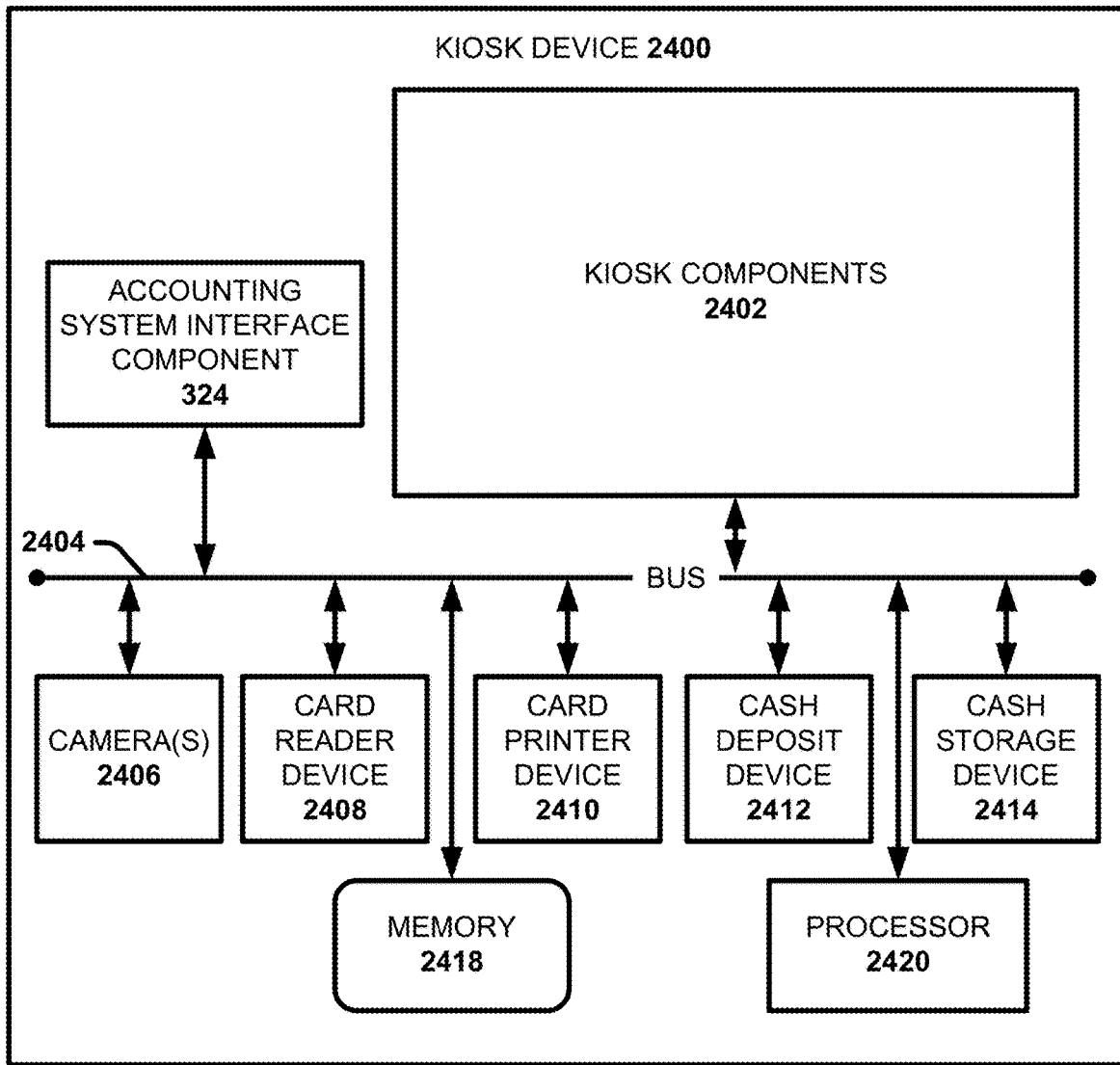
FIG. 24 illustrates a block diagram of an example, non-limiting system that facilitate depositing tangible money into different financial accounts using an automatic deposit machine in accordance with one or more embodiments of the disclosed subject matter.

FIG. 24 illustrates a block diagram of an example, non-limiting kiosk device 2400 that facilitate depositing tangible money into different financial accounts using an automatic deposit machine in accordance with one or more embodiments of the disclosed subject matter. Repetitive description of like elements employed in respective embodiments is omitted for sake of brevity.

In the embodiment shown, the kiosk device 2400 can include accounting system interface component 324 and one or more kiosk components 2402 (which can include computer executable components). The one or more kiosk component 2402 can include (but are not limited to) any of the components described in the previous figures. The kiosk device 2400 can further include one or more cameras 2404, a card reader device 2408, a card printer device 2410, a cash deposit device 2412, and a cash storage device 2414.

The kiosk device 2400 can also include or be operatively coupled to at least one memory 2418 and at least one processor 2420. In various embodiments, the at least one memory 2418 can store executable instructions (e.g., executable instructions provided by the accounting system interface component 324 and the kiosk components 2402) that when executed by the at least one processor 2420, facilitate performance of operations defined by the executable instructions. The kiosk device 2400 can further include a device bus 2804 that communicatively couples the various components of the kiosk device 2400. Examples of said and memory 2418 and processor 2450 can be found with reference to FIG. 25, as well as other suitable computer or computing-based elements that can be used in connection with implementing one or more of the systems or components shown and described in connection with FIG. 18 or other figures disclosed herein.

In some embodiments, the kiosk device 2400 can be or include user device 322. In this regard, although not shown, the kiosk device 2400 can be included in system 300 and connected to the accounting system 130, the dealer financial account systems 318 and the player financial account systems 320 via one or more networks 316. In one or more embodiments, the kiosk device 2400 can be used to create new player accounts. For example, in some implementations, the kiosk device 2400 can be or correspond to kiosk that is physically located in a table game system environment (e.g., at the casino) that an in-person player can used to create a player account and print (e.g., via the card printer device 2410) and receive a player card. With these embodiments, an in-person player can interface with the kiosk device 2400 using a suitable input mechanism to create a player account using the features and functionalities of the accounting system interface component 324. In some implementations of these embodiments, the one or more cameras 2406 can be used to capture facial image data of the player and/or other biometric information for the player in association with creating the player account. The biometric information can further be employed for account access purposes.

Additionally, or alternatively, the kiosk device 2400 can be or correspond to a reverse automatic teller machine (ATM), wherein a player can use their player card (e.g., as read via card reader device 2408) and/or player account access information to access and/or load their player account at the kiosk device 2400. The kiosk device 2400 can employ one or more of the disclosed account access authorization/verification techniques described herein to securely log-into and access a player's account (e.g., with reference to the authorization component 606 and the security component 304). The kiosk device 2400 can further include a cash deposit device 2412 via which a player can deposit cash into the kiosk device 2400 for loading onto their player account. For example, in various embodiments, the kiosk device 2400 can include and/or employ finance linking component 306, withdrawal component 308, conversion component 310, deposit component 312 and/or account management component 314. In some implementations, the kiosk device 2400 can receive various different cash currencies and convert them into another currency for usage with the player account (e.g., virtual chips or the like using conversion component 310). The kiosk device 2414 can further include a cash storage device 2414 that can receive and store deposited cash.

Additionally, or alternatively, the kiosk device 2400 can be or correspond to a smart ATM that automatically deposits cash into any financial account for a player. For example, a registered player can use the kiosk device 2400 to deposit cash directly into one or more of their linked player financial account systems for a reverse ATM charge (e.g., using conversion component 310 and deposit component 312). For example, the conversion component 310 can convert cash received via the cash deposit device 2412 into a digital currency or digital representation of the amount deposited. The player can then select the desired financial account for transferring the money in association with access and loading of their player account and viewing their linked player financial account systems.

It should be noted that, for simplicity of explanation, in some circumstances the computer-implemented methodologies are depicted and described herein as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 25:
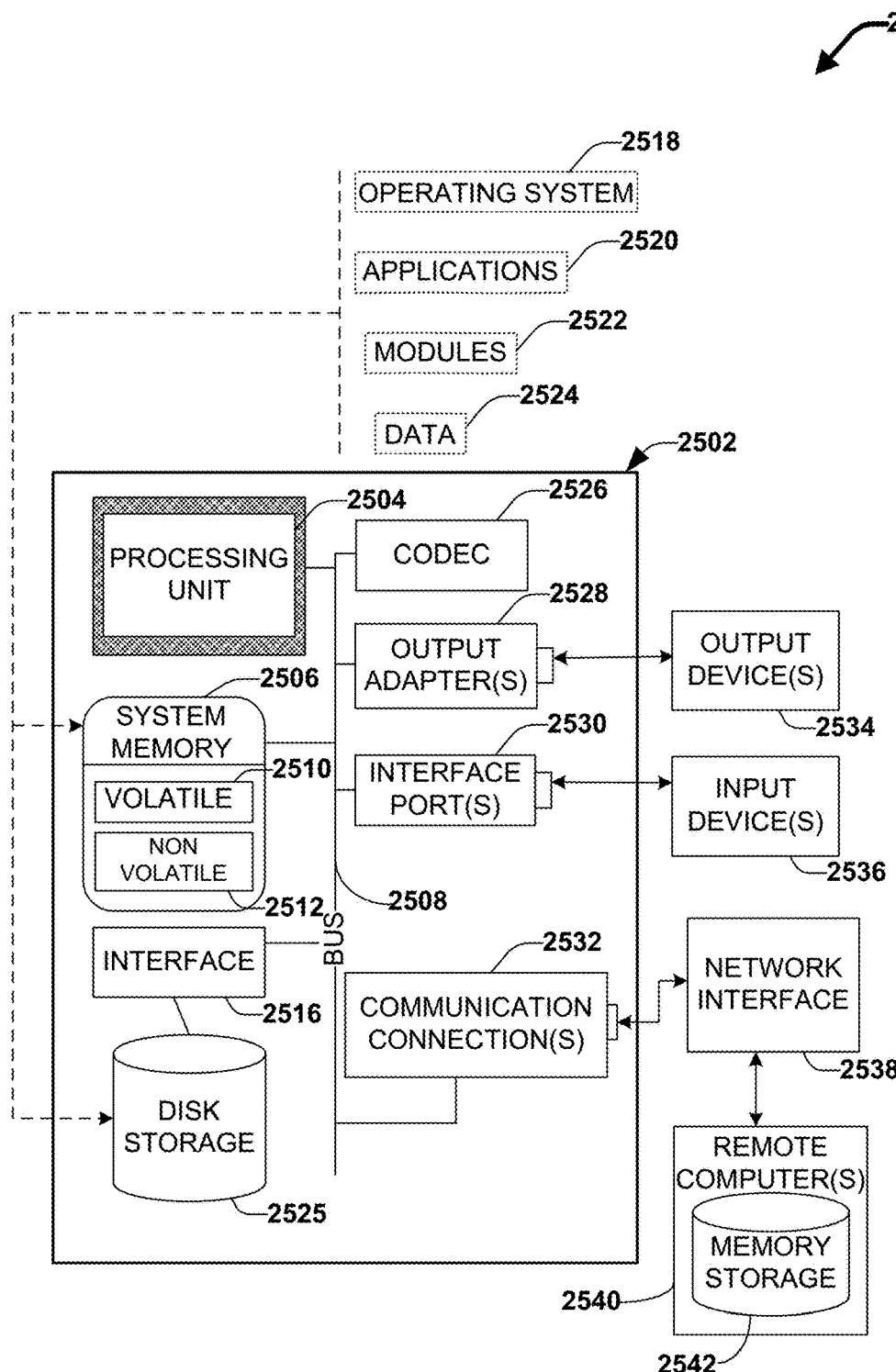
FIG. 25 illustrates a block diagram of an example, non-limiting operating environment in which one or more embodiments described herein can be facilitated.

FIG. 25 can provide a non-limiting context for the various aspects of the disclosed subject matter, intended to provide a general description of a suitable environment in which the various aspects of the disclosed subject matter can be implemented. FIG. 25 illustrates a block diagram of an example, non-limiting operating environment in which one or more embodiments described herein can be facilitated. Repetitive description of like elements employed in other embodiments described herein is omitted for sake of brevity.

With reference to FIG. 25, a suitable operating environment 2500 for implementing various aspects of this disclosure can also include a computer 2502. The computer 2502 can also include a processing unit 2504, a system memory 2506, and a system bus 2508. The system bus 2508 couples system components including, but not limited to, the system memory 2506 to the processing unit 2504. The processing unit 2504 can be any of various available processors. Dual microprocessors and other multiprocessor architectures also can be employed as the processing unit 2504. The system bus 2508 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 25124), and Small Computer Systems Interface (SCSI).

The system memory 2506 can also include volatile memory 2510 and nonvolatile memory 2512. The basic input/output system (BIOS), containing the basic routines to transfer information between elements within the computer 2502, such as during start-up, is stored in nonvolatile memory 2512. Computer 2502 can also include removable/non-removable, volatile/non-volatile computer storage media. FIG. 25 illustrates, for example, a disk storage 2514. Disk storage 2514 can also include, but is not limited to, devices like a magnetic disk drive, floppy disk drive, tape drive, Jaz drive, Zip drive, LS-100 drive, flash memory card, or memory stick. The disk storage 2514 also can include storage media separately or in combination with other storage media. To facilitate connection of the disk storage 2514 to the system bus 2508, a removable or non-removable interface is typically used, such as interface 2516. FIG. 25 also depicts software that acts as an intermediary between users and the basic computer resources described in the suitable operating environment 2500. Such software can also include, for example, an operating system 2518. Operating system 2518, which can be stored on disk storage 2514, acts to control and allocate resources of the computer 2502.

System applications 2520 take advantage of the management of resources by operating system 2518 through program modules 2522 and program data 2524, e.g., stored either in system memory 2506 or on disk storage 2514. It is to be appreciated that this disclosure can be implemented with various operating systems or combinations of operating systems. A user enters commands or information into the computer 2502 through input device(s) 2536. Input devices 2536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2504 through the system bus 2508 via interface port(s) 2530. Interface port(s) 2530 include, for example, a serial port, a parallel port, a game port, and a universal serial bus (USB). Output device(s) 2534 use some of the same type of ports as input device(s) 2536. Thus, for example, a USB port can be used to provide input to computer 2502, and to output information from computer 2502 to an output device 2534. Output adapter 2528 is provided to illustrate that there are some output devices 2534 like monitors, speakers, and printers, among other output devices 2534, which require special adapters. The output adapters 2528 include, by way of illustration and not limitation, video and sound cards that provide a means of connection between the output device 2534 and the system bus 2508. It should be noted that other devices and/or systems of devices provide both input and output capabilities such as remote computer(s) 2540.

Computer 2502 can operate in a networked environment using logical connections to one or more remote computers, such as remote computer(s) 2540. The remote computer(s) 2540 can be a computer, a server, a router, a network PC, a workstation, a microprocessor based appliance, a peer device or other common network node and the like, and typically can also include many or all of the elements described relative to computer 2502. For purposes of brevity, only a memory storage device 2542 is illustrated with remote computer(s) 2540. Remote computer(s) 2540 is logically connected to computer 2502 through a network interface 2538 and then physically connected via communication connection 2532. Network interface 2538 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 2532 refers to the hardware/software employed to connect the network interface 2538 to the system bus 2508. While communication connection 2532 is shown for illustrative clarity inside computer 2502, it can also be external to computer 2502. The hardware/software for connection to the network interface 2538 can also include, for exemplary purposes only, internal and external technologies such as, modems including regular telephone grade modems, cable modems and DSL modems, ISDN adapters, and Ethernet cards.

One or more embodiments described herein can be a system, a method, an apparatus and/or a computer program product at any possible technical detail level of integration. The computer program product can include a computer readable storage medium (or media) having computer readable program instructions thereon for causing a processor to carry out aspects of one or more embodiment. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In this regard, in various embodiments, a computer readable storage medium as used herein can include non-transitory and tangible computer readable storage mediums.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments.

Aspects of one or more embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowchart and block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and block diagram block or blocks.

The flowchart and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on one or more computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that can provide specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result (e.g., including employing ML and/or AI techniques to determine the intermediate results), etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to: sensors, antennae, audio and/or visual output devices, other devices, etc.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches, and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a game table system comprising one or more player devices physically coupled to a game table, wherein the one or more player devices respectively provide a player user interface for playing a game at the game table that involves live dealer interaction with one or more tangible game pieces at the game table;
   at least one memory that stores computer executable components; and
   at least one processor that executes the computer executable components stored in the memory, wherein the computer executable components comprise:
      a remote access component that facilitates remotely accessing a player device of the one or more player devices by a remote player device via a network and presenting a remote player user interface at the remote player device for remotely playing the game at the game table by a remote player; and
      a player control component that receives remote player input commands via the remote player user interface that control remote player game moves in association with remotely playing the game.

2. The system of claim 1, wherein the game involves exchange of a reward between a player account for the remote player and a dealer account for the live dealer in response to winning game events and losing game events that occur in association with remotely playing the game, and wherein the computer executable components further comprise:
   a game management component that tracks the remote player game moves; and
   a reward management component that transfers the reward from the player account to the dealer account in response to a remote player game loss event and transfers the reward from the dealer account to the player account in response to a remote player game win event.

3. The system of claim 2, wherein the remote player game moves comprise placing bets with the reward on a chance of occurrence of the remote player game win event and wherein the remote player game win event is determined based on the live dealer interaction with the one or more tangible game pieces at the game table.

4. The system of claim 2, wherein the reward comprises a monetary reward or virtual chips having a monetary value.

5. The system of claim 4, wherein the computer executable components further comprise:
   a finance linking component that facilitates linking a financial account associated with the remote player to the player account.

6. The system of claim 5, wherein the computer executable components further comprise:
   a withdrawal component that withdrawals a monetary amount from the financial account for transfer to the player account; and
   a reward conversion component that converts the monetary amount into an amount of virtual chips having a value corresponding to the monetary amount and adds the virtual chips to the player account.

7. The system of claim 5, wherein the computer executable components further comprise:
a reward conversion component that converts an amount of the virtual chips transferred from the dealer account to the player account into a monetary amount corresponding to a value of the amount of virtual chips; and
a deposit component that transfers the monetary amount to the financial account.

8. The system of claim 4, wherein the computer executable components further comprise:
a reward conversion component that converts an amount of the virtual chips transferred from the player account to the dealer account into a monetary amount corresponding to a value of the amount of virtual chips; and
a deposit component that transfers the monetary amount to a financial account linked to the dealer account.

9. The system of claim 1, wherein the computer executable components further comprise:
a table game system interface component that receives a request from the remote player device to remotely play the game at the game table, the request comprising player identifier information identifying the remote player; and
an authorization component that authorizes the request based on determination that the remote player is authorized to remotely play the game at the game table, wherein based on authorization of the request, the table game system interface component activates the remote player user interface for remotely playing the game.

10. The system of claim 9, wherein the computer executable components further comprise:
a game selection component that facilitates selecting the game table system from amongst a plurality of different game table systems respectively comprising game tables at which table games are played; and
a live game tracking component that tracks usage of player devices physically coupled to the game tables and generates status information regarding availability status of the player devices, and wherein the table game system interface component receives the request in response to selection of the game table system and the player device based on the player device having an available status.

11. The system of claim 9, wherein the computer executable components further comprise:
a player interface component that renders a remote player visualization at the player device indicating the player device is in-use by the remote player in response to activation of the remote player user interface.

12. The system of claim 9, wherein the authorization component accesses an accounting system comprising player account information based on reception of the request and determines that the remote player is authorized to remotely play the game at the game table based on a determination that the remote player has a player account with the accounting system and the verification of the remote player's identity using the player identifier information.

13. The system of claim 12, wherein the player identifier information comprises facial image data of the remote player and wherein the authorization component employs facial recognition technology to verify the player's identity.

14. The system of claim 9, wherein the game involves exchange of virtual chips between a player account for the remote player and a dealer account for the live dealer in response to winning game events and losing game events that occur in association with remotely playing the game, and wherein the authorization component further determines that the remote player is authorized to remotely play the game based on the player account comprising a minimum amount of the virtual chips.

15. The system of claim 1, wherein the remote player user interface comprises live video of the live dealer interaction with the one or more tangible game pieces at the game table.

16. The system of claim 1, wherein the remote player user interface comprises a virtual reality environment of the game table system.

17. The system of claim 1, wherein the computer executable components further comprise:
a live streaming gaming component that facilitates live streaming video and audio communication between the remote player and at least one of, the live dealer or an in-person player of the game table.

18. The system of claim 1, wherein the computer executable components further comprise:
a game selection component that facilitates selecting the game table system from amongst a plurality of different game table systems respectively comprising game tables at which table games are played.

19. The system of claim 18, wherein the computer executable further components comprise:
a live game tracking component that tracks usage of player devices physically coupled to the different game table units and generates status information regarding availability status of the player devices, wherein the game selection component restricts selection of game table systems for remotely playing based on the availability status of the player devices.

20. The system of claim 19, wherein the usage includes in-person usage of players with the respective player devices and remote usage of remote players with the respective player devices.

21. The system of claim 18, wherein the live game tracking component determines the availability status based on whether a player device is currently in use by an in-person player or a remote player and one or more current conditions of games being played at respective game tables associated with the different game table units.

22. The system of claim 18, wherein the computer executable components comprise:
a social activity component that tracks player usage information regarding identities of players currently using respective player devices physically coupled to the different game table units and generates social activity information regarding the identities of the players, and wherein the game selection component provides the social activity information to the remote player device.

23. The system of claim 1, wherein the computer executable components comprise:
a search component that facilitates searching for game table systems for remotely playing from amongst a plurality of different game table systems based on availability status of player devices physically coupled to the respective game tables of the different game table systems.

24. The system of claim 23, wherein the search component further facilitates the searching based on identities of players currently using unavailable player devices of the player devices.

25. The system of claim 23, wherein the search component further facilitates the searching based on one or more criterion selected from the group consisting of: game type, betting minimum, game status, dealer identity, active player status, active player identity, and number of active players at a game table unit.

26. The system of claim 1, wherein the game table system comprises one game table system included amongst a plurality of different game table systems respectively comprising game tables at which table games are played, and wherein the computer executable components comprise:
a live game tracking component that tracks information regarding current availability status of player devices physically coupled to the different game table units, identities of active players, active player status, game status, identities of active dealers, betting minimums and number of active players at the different game table units.

27. The system of claim 26, wherein the computer executable components further comprise:
a notification component that generates and provides the remote player device with one or more notifications regarding occurrence of a defined event reflected in the information and defined event notification criteria provided in a player account for the remote player.

28. The system of claim 1, wherein the game comprises a card game and the one or more tangible game pieces comprise cards.

29. A method, comprising:
connecting, by a system operatively coupled to a processor, a remote player device to a game table system comprising a game table at which a table game is played that involves live dealer interaction with one or more tangible game pieces at the game table;
facilitating rendering, by the system, a remote player user interface at the remote player device that displays the live dealer interaction with the one or more tangible game pieces and provides one or more input controls that control remote player game moves in association with remotely playing the table game by a remote player;
receiving, by the system, the remote player game moves via the remote player user interface;
receiving, by the system, a request from the remote player device to remotely play the table game at the game table, the request comprising player identifier information identifying the remote player;
authorizing, by the system, the request based on a determination that the remote player is authorized to remotely play the game at the game table; and
activating, by the system, the remote player user interface for remotely playing the game based on the authorizing.

30. The method of claim 29, wherein the remote player game moves comprise placing bets for a reward on a chance of occurrence of a player game win event, wherein the player game win event is determined based on the player game moves and the live dealer interaction with the one or more tangible game pieces at the game table.

31. The method of claim 30, wherein the operations further comprise:
transferring, by the system, the reward from a player account for the remote player to a dealer account for the live dealer in response to failure of occurrence of the player game win event; and
transferring, by the system, the reward from the dealer account to the player account in response to occurrence of the game win event.

32. The method of claim 29, wherein the game table system is included amongst a plurality of different game table systems respectively comprising game tables at which table games are played, wherein the game table systems respectively comprise player devices physically coupled to the game tables, and wherein the receiving the request is responsive to selection of a player device physically coupled to the game table system that has an available status.

33. The method of claim 32, further compromising:
tracking, by the system, usage of the player devices, the usage including in-person usage of players with the player devices and remote usage of remote players with the player devices;
generating, by the system, status information regarding availability status of the player devices based on the tracking; and
providing, by the system, the status information to the remote player device.

34. The method of claim 29, wherein the authorizing comprises:
accessing, by the system, an accounting system comprising player account information based on reception of the request; and
determining, by the system, that the remote player is authorized to remotely play the table game at the game table based on the player account information comprising a player account for the remote player and the verification of the remote player's identity using the player identifier information.

35. The method of claim 34, wherein the player identifier information comprises facial image data of the remote player and wherein the method further comprises employing, by the system, facial recognition technology to verify the player's identity.

36. The method of claim 34, wherein the game involves exchange of virtual chips between a player account for the remote player and a dealer account for the live dealer in response to winning game events and losing game events that occur in association with remotely playing the game, and wherein the authorizing further comprises authorizing the request based on the player account comprising a minimum amount of the virtual chips.

37. The method of claim 29, wherein the remote player user interface comprises live video of the live dealer interaction with the one or more tangible game pieces at the game table.

38. A non-transitory machine-readable storage medium, comprising executable instructions that, when executed by a processor, facilitate performance of operations, comprising:
connecting a remote player device to a game table system comprising a game table at which a table game is played that involves live dealer interaction with one or more tangible game pieces at the game table;
facilitating rendering a remote player user interface at the remote player device that displays the live dealer interaction with the one or more tangible game pieces and provides one or more input controls for controlling remote player game moves in association with remotely playing the table game by a remote player;
receiving the remote player game moves via the remote player user interface
receiving a request from the remote player device to remotely play the table game at the game table, the request comprising player identifier information identifying the remote player;

authorizing the request based on a determination that the remote player is authorized to remotely play the game at the game table; and activating the remote player user interface for remotely playing the game based on the authorizing.

39. The non-transitory machine-readable storage medium of claim 38, wherein the remote player game moves comprise placing bets for a reward on a chance of occurrence of a player game win event, wherein the player game win event is determined based on the player game moves and the live dealer interaction with the one or more tangible game pieces at the game table, and wherein the operations further comprise:

transferring the reward from a player account for the remote player to a dealer account for the live dealer in response to failure of occurrence of the player game win event; and transferring the reward from the dealer account to the player account in response to occurrence of the game win event.

40. The non-transitory machine-readable storage medium of claim 38, wherein the authorizing comprises:

accessing an accounting system comprising player account information based on reception of the request; and determining that the remote player is authorized to remotely play the table game at the game table based on the player account information comprising a player account for the remote player and the verification of the remote player's identity using the player identifier information.

* * * * *